(12) United States Patent
Opalinski

(10) Patent No.: US 12,077,027 B2
(45) Date of Patent: Sep. 3, 2024

(54) PERSONAL AUTO-CRAFT HAVING AUTOMOBILE AND VERTICAL TAKE-OFF CONFIGURATIONS

(71) Applicant: Everon Corporation, Orlando, FL (US)

(72) Inventor: Lukasz Opalinski, Orlando, FL (US)

(73) Assignee: Everon Corporation, Orlando, FL (US)

( * ) Notice: Subject to any disclaimer, the term of this patent is extended or adjusted under 35 U.S.C. 154(b) by 742 days.

(21) Appl. No.: 17/174,660

(22) Filed: Feb. 12, 2021

(65) Prior Publication Data

US 2021/0229512 A1     Jul. 29, 2021

Related U.S. Application Data

(63) Continuation of application No. PCT/US2019/046554, filed on Aug. 14, 2019.

(60) Provisional application No. 62/831,333, filed on Apr. 9, 2019, provisional application No. 62/793,322, filed on
(Continued)

(51) Int. Cl.
    *B60F 5/02*        (2006.01)
    *B60F 5/00*        (2006.01)
    *B64C 37/00*      (2006.01)

(52) U.S. Cl.
    CPC .............. *B60F 5/02* (2013.01); *B60F 5/003* (2013.01); *B64C 37/00* (2013.01)

(58) Field of Classification Search
    CPC ........ B64C 37/00; B64U 10/70; B64U 60/60; B64U 60/70; B60F 5/003; B60F 5/02
    See application file for complete search history.

(56) References Cited

U.S. PATENT DOCUMENTS

| 2,966,317 A | 12/1960 | Ramniceann |
| 4,505,346 A | 3/1985 | Mueller |
| 6,517,026 B1 | 2/2003 | Smith |

(Continued)

FOREIGN PATENT DOCUMENTS

| AU | 2013273446 B2 | 10/2017 |
| CA | 2875745 A1 | 12/2013 |

(Continued)

OTHER PUBLICATIONS

Huang, Wenjia. CN 107719652 A "Express Box" Feb. 23, 2018. Machine translation from Espacenet. (Year: 2018).*

(Continued)

*Primary Examiner* — Richard Green
(74) *Attorney, Agent, or Firm* — Greenberg Traurig, LLP; Roman Fayerberg; Jaime Burke

(57) ABSTRACT

The present disclosure discusses a transportation vehicle configured for transforming between a drive mode and a flight mode. The vehicle includes a chassis with a body coupled thereto and a plurality of fenders coupled to the body. Each of the fenders includes a rim comprising spokes and a tire configured to rotate during drive mode and a suspension configured to pivot the plurality of fenders from a substantially vertical orientation during drive mode to a substantially horizontal orientation during flight mode. Each of the fender also includes a propulsion mechanism configured to rotate independently of the rim to generate lift during flight mode and a motor configured to independently provide rotational force to the tire built into the rim during drive mode and rotational force to the propulsion mechanism during flight mode.

8 Claims, 76 Drawing Sheets

Related U.S. Application Data on Jan. 16, 2019, provisional application No. 62/718,611, filed on Aug. 14, 2018.

(56) References Cited

U.S. PATENT DOCUMENTS

| | | | |
|---|---|---|---|
| 7,472,863 B2 | 1/2009 | Pak | |
| 7,959,104 B2 | 6/2011 | Kuntz | |
| 8,376,263 B2 | 2/2013 | Eames | |
| 8,794,564 B2 * | 8/2014 | Hutson | B64U 10/70 244/50 |
| 8,794,566 B2 | 8/2014 | Hutson | |
| 8,827,200 B2 | 9/2014 | Radu | |
| 8,991,740 B2 | 3/2015 | Olm et al. | |
| 9,045,226 B2 | 6/2015 | Piasecki et al. | |
| 9,145,207 B2 | 9/2015 | Moschetta et al. | |
| 9,364,766 B2 | 6/2016 | Mielniczek | |
| 9,393,847 B2 | 7/2016 | Piasecki et al. | |
| 9,610,817 B1 | 4/2017 | Piasecki et al. | |
| 9,630,710 B2 | 4/2017 | Hutson | |
| 9,688,400 B2 | 6/2017 | Hutson | |
| 9,776,715 B2 | 10/2017 | Zhou et al. | |
| 9,789,415 B2 | 10/2017 | Mielniczek | |
| 9,944,389 B2 | 4/2018 | Piasecki et al. | |
| 10,081,424 B2 | 9/2018 | Radu | |
| 10,124,891 B2 | 11/2018 | Chang et al. | |
| 10,189,565 B2 | 1/2019 | Patterson et al. | |
| 10,322,796 B2 * | 6/2019 | Lee | B64U 10/14 |
| 10,745,125 B2 | 8/2020 | Kondo | |
| 11,673,663 B2 * | 6/2023 | Benedict | B64C 37/00 244/17.23 |
| 2005/0247819 A1 | 11/2005 | Caruso | |
| 2008/0048065 A1 | 2/2008 | Kuntz | |
| 2009/0145107 A1 | 6/2009 | Nicholson | |
| 2009/0186535 A1 | 7/2009 | Sullivan | |
| 2010/0181414 A1 | 7/2010 | Lopez, Jr. | |
| 2011/0042507 A1 | 2/2011 | Seiford, Sr. | |
| 2012/0024216 A1 | 2/2012 | Schroder | |
| 2014/0061362 A1 | 3/2014 | Olm et al. | |
| 2015/0102155 A1 | 4/2015 | Krastev | |
| 2016/0176514 A1 | 6/2016 | Lavagen et al. | |
| 2016/0207368 A1 | 7/2016 | Gaonjur | |
| 2017/0029103 A1 | 2/2017 | Chang et al. | |
| 2017/0073070 A1 | 3/2017 | Xing | |
| 2017/0210468 A1 | 7/2017 | Jacob et al. | |
| 2017/0300051 A1 | 10/2017 | Zhou et al. | |
| 2018/0029431 A1 | 2/2018 | Tang et al. | |
| 2018/0056743 A1 | 3/2018 | Zhou et al. | |

FOREIGN PATENT DOCUMENTS

| | | |
|---|---|---|
| CN | 102137768 A | 7/2011 |
| CN | 103213466 A | 7/2013 |
| CN | 103459250 A | 12/2013 |
| CN | 103522855 A | 1/2014 |
| CN | 104369635 A | 2/2015 |
| CN | 204172626 U | 2/2015 |
| CN | 104385846 A | 3/2015 |
| CN | 104470601 A | 3/2015 |
| CN | 104859392 A | 8/2015 |
| CN | 103213466 B | 12/2015 |
| CN | 105291737 A | 2/2016 |
| CN | 105329056 A | 2/2016 |
| CN | 105711824 A | 6/2016 |
| CN | 105946484 A | 9/2016 |
| CN | 105984298 A | 10/2016 |
| CN | 104470601 B | 11/2016 |
| CN | 106114099 A | 11/2016 |
| CN | 106143870 A | 11/2016 |
| CN | 106155080 A | 11/2016 |
| CN | 106240262 A | 12/2016 |
| CN | 106347049 A | 1/2017 |
| CN | 206012247 U | 3/2017 |
| CN | 206277908 U | 6/2017 |
| CN | 107054636 A | 8/2017 |
| CN | 107139664 A * | 9/2017 |
| CN | 107215158 A | 9/2017 |
| CN | 104369635 B | 11/2017 |
| CN | 107719652 A | 2/2018 |
| EP | 1810735 A1 | 7/2007 |
| EP | 3037349 A1 | 6/2016 |
| EP | 2691299 B1 | 7/2016 |
| EP | 2858730 B1 | 8/2016 |
| EP | 3335935 A1 | 6/2018 |
| FR | 1017697 A | 12/1952 |
| FR | 3030451 A1 | 6/2016 |
| IN | 2014MU02446 A | 7/2014 |
| IN | 201941051143 A | 12/2019 |
| JP | H06343799 A | 6/1993 |
| JP | 2015123918 A | 7/2015 |
| JP | 2015523933 A | 8/2015 |
| JP | 5837032 B2 | 12/2015 |
| JP | 5902338 B1 | 4/2016 |
| JP | 2016120907 A | 7/2016 |
| JP | 2016222216 A | 12/2016 |
| JP | 6343799 B2 | 6/2018 |
| JP | 6425323 B1 | 11/2018 |
| KR | 20170092068 A | 2/2016 |
| KR | 20180007196 A | 7/2016 |
| KR | 20160093242 A | 8/2016 |
| KR | 20160122096 A | 10/2016 |
| KR | 20170054896 A | 5/2017 |
| KR | 101747593 B1 | 6/2017 |
| KR | 101753598 B1 | 7/2017 |
| KR | 20170087573 A | 7/2017 |
| KR | 101775922 B1 | 9/2017 |
| KR | 101778618 B1 | 9/2017 |
| KR | 101795677 B1 | 11/2017 |
| KR | 101806040 B1 | 12/2017 |
| KR | 101837585 B1 | 3/2018 |
| KR | 101845416 B1 | 4/2018 |
| KR | 20180127868 A | 11/2018 |
| KR | 20180127869 A | 11/2018 |
| RS | 55498 B1 | 5/2017 |
| RU | 2013144664 A | 5/2015 |
| TW | I610850 B | 1/2018 |
| WO | WO-0244006 A1 | 6/2002 |
| WO | WO-2011146349 A2 | 11/2011 |
| WO | WO-2012102698 A1 | 8/2012 |
| WO | WO-2012130856 A1 | 10/2012 |
| WO | WO-2013182708 A1 | 12/2013 |
| WO | WO-2014062275 A2 | 4/2014 |
| WO | WO-2014062276 A2 | 4/2014 |
| WO | WO-2015149000 A1 | 10/2015 |
| WO | WO-2016069167 | 5/2016 |
| WO | WO-2016069169 A1 | 5/2016 |
| WO | WO-2017126820 A1 | 7/2017 |
| WO | WO-2018056501 A1 | 3/2018 |
| WO | WO-2018122842 A2 | 7/2018 |
| WO | WO-2018154592 A1 | 8/2018 |
| WO | WO-2018213836 A1 | 11/2018 |
| WO | WO-2018216825 A1 | 11/2018 |
| WO | WO-2019021521 A1 | 1/2019 |

OTHER PUBLICATIONS

International Search Report; PCT/US2019/046554; Date: Apr. 9, 2020; Authorized Officer: Lee Young.
European Search Report; EP19884455; Apr. 19, 2022.
U.S. Appl. No. 17/933,370, filed Sep. 19, 2022, Hubless Propulsion Unit.

* cited by examiner

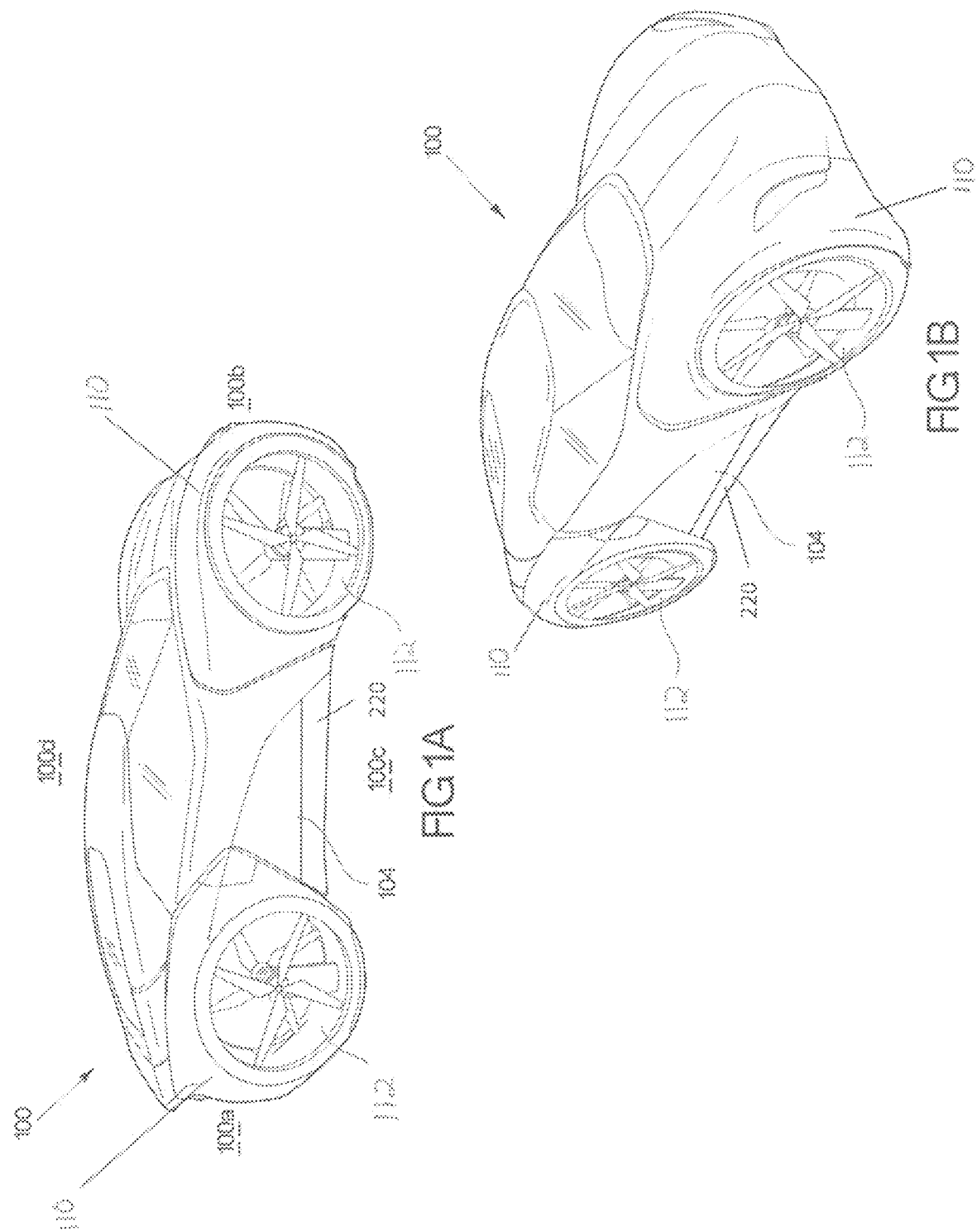

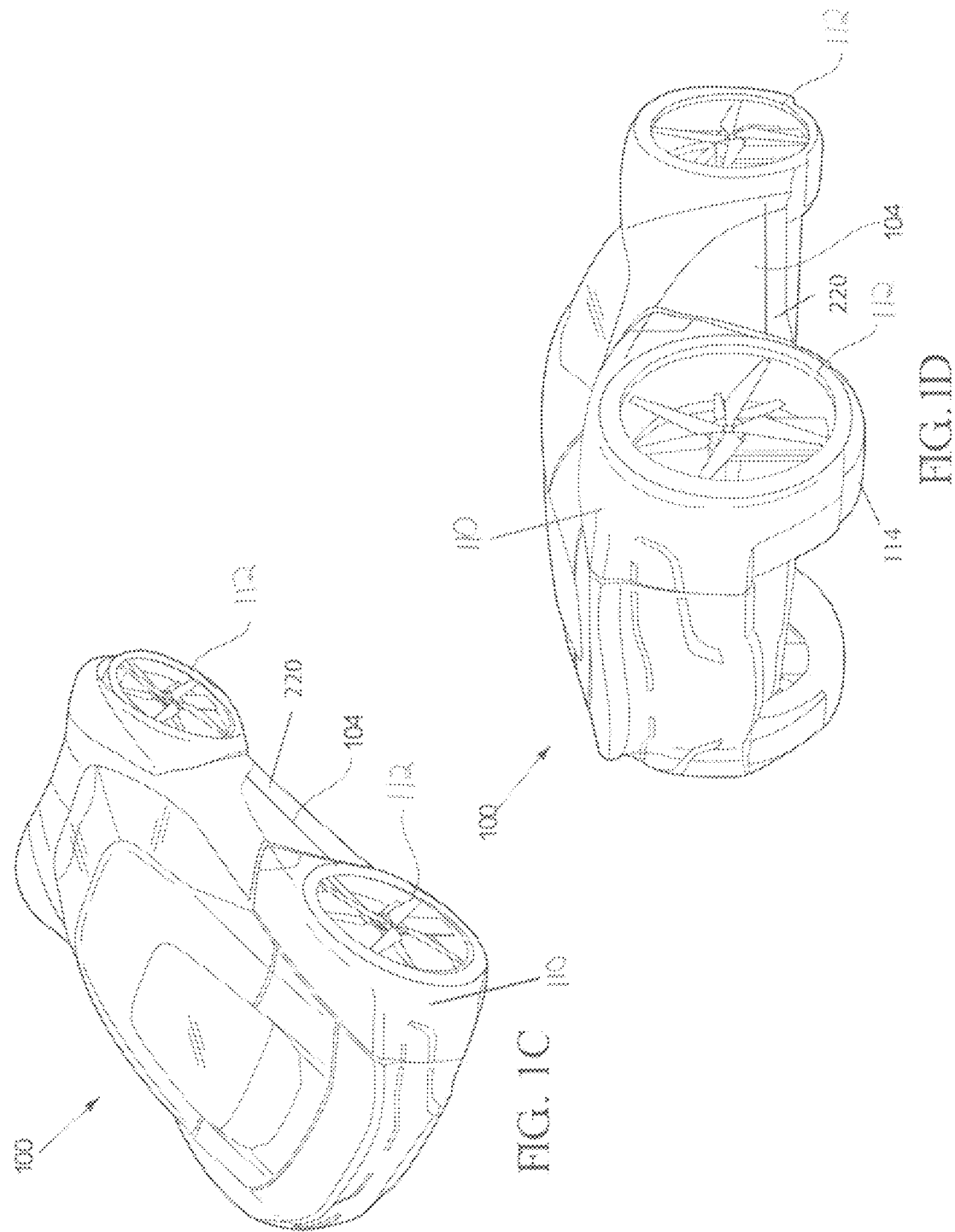

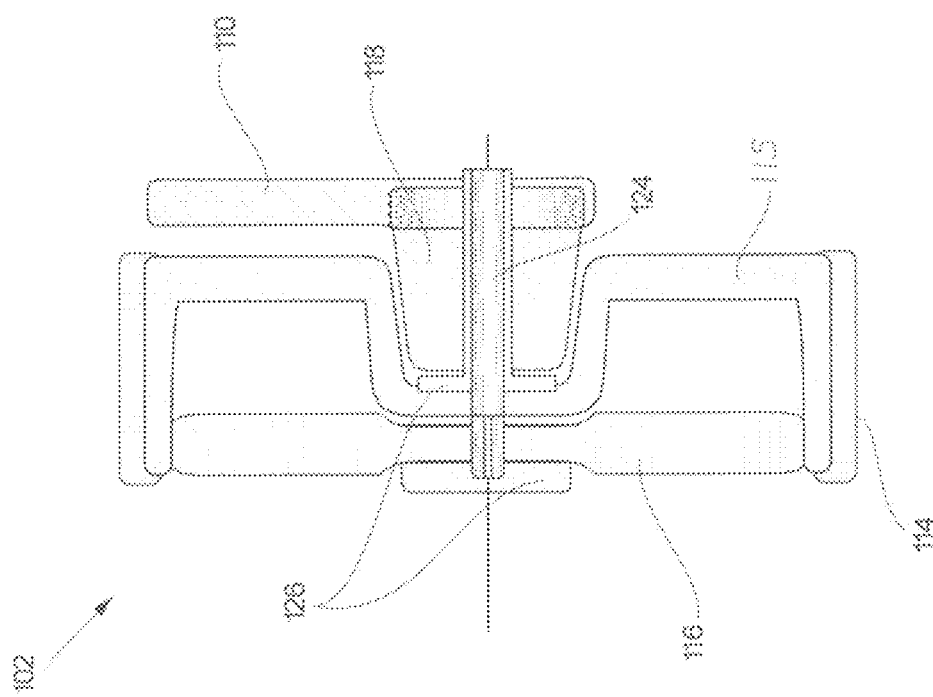

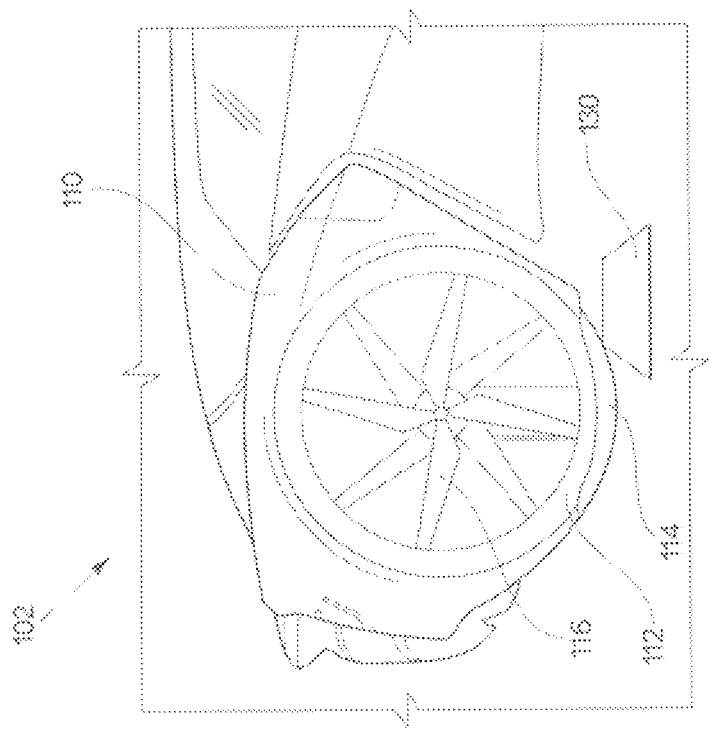
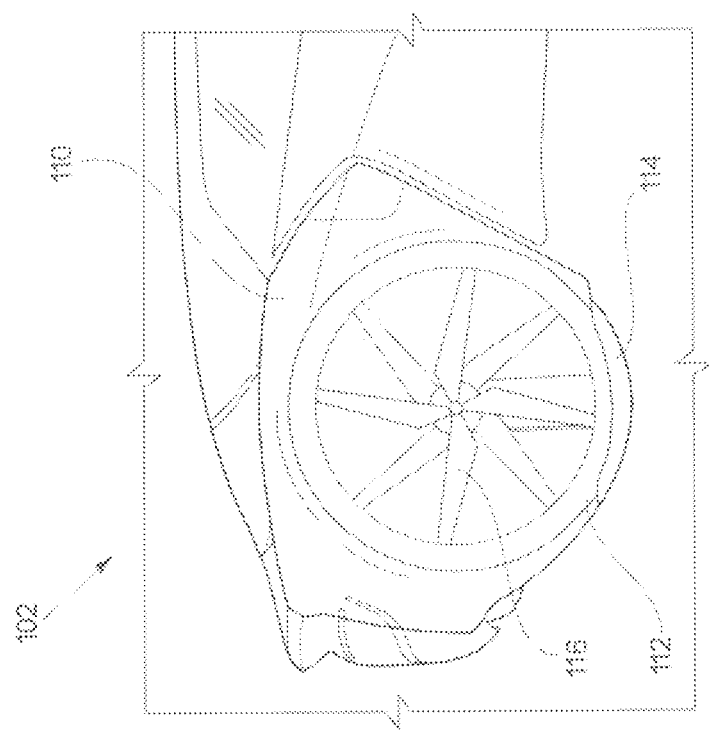

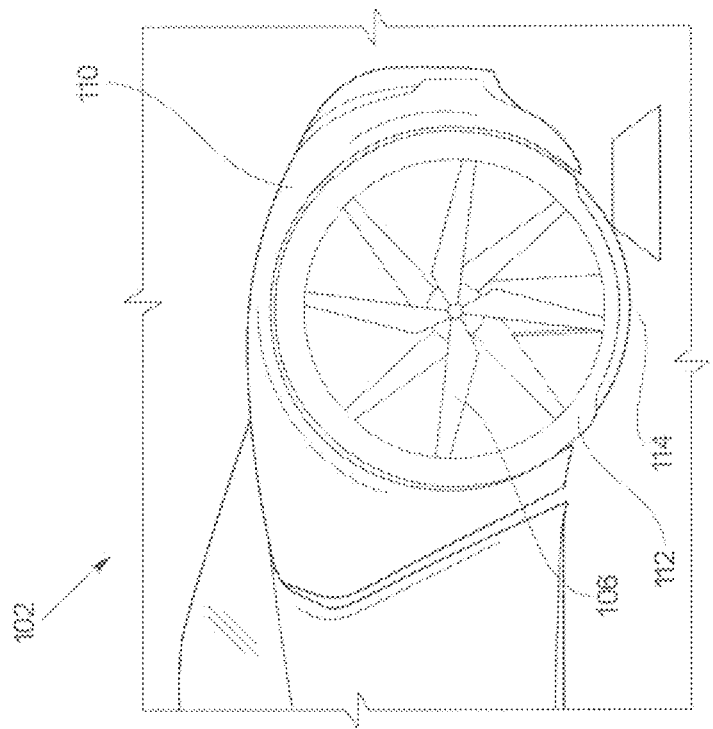
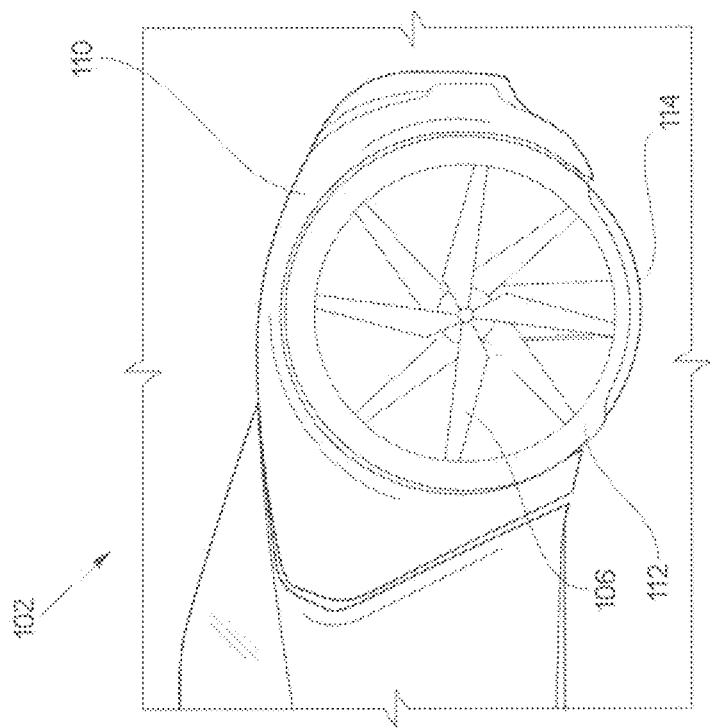

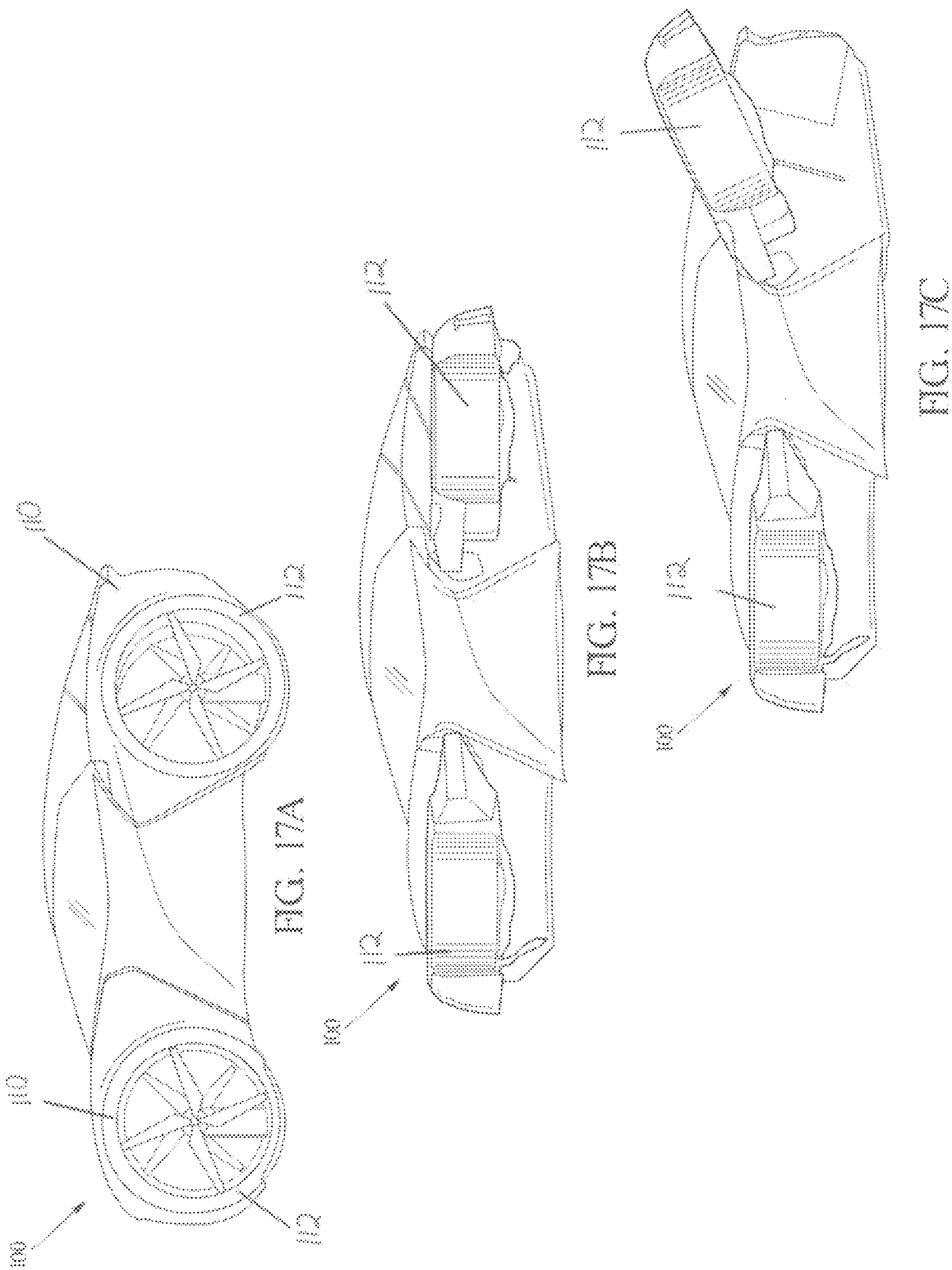

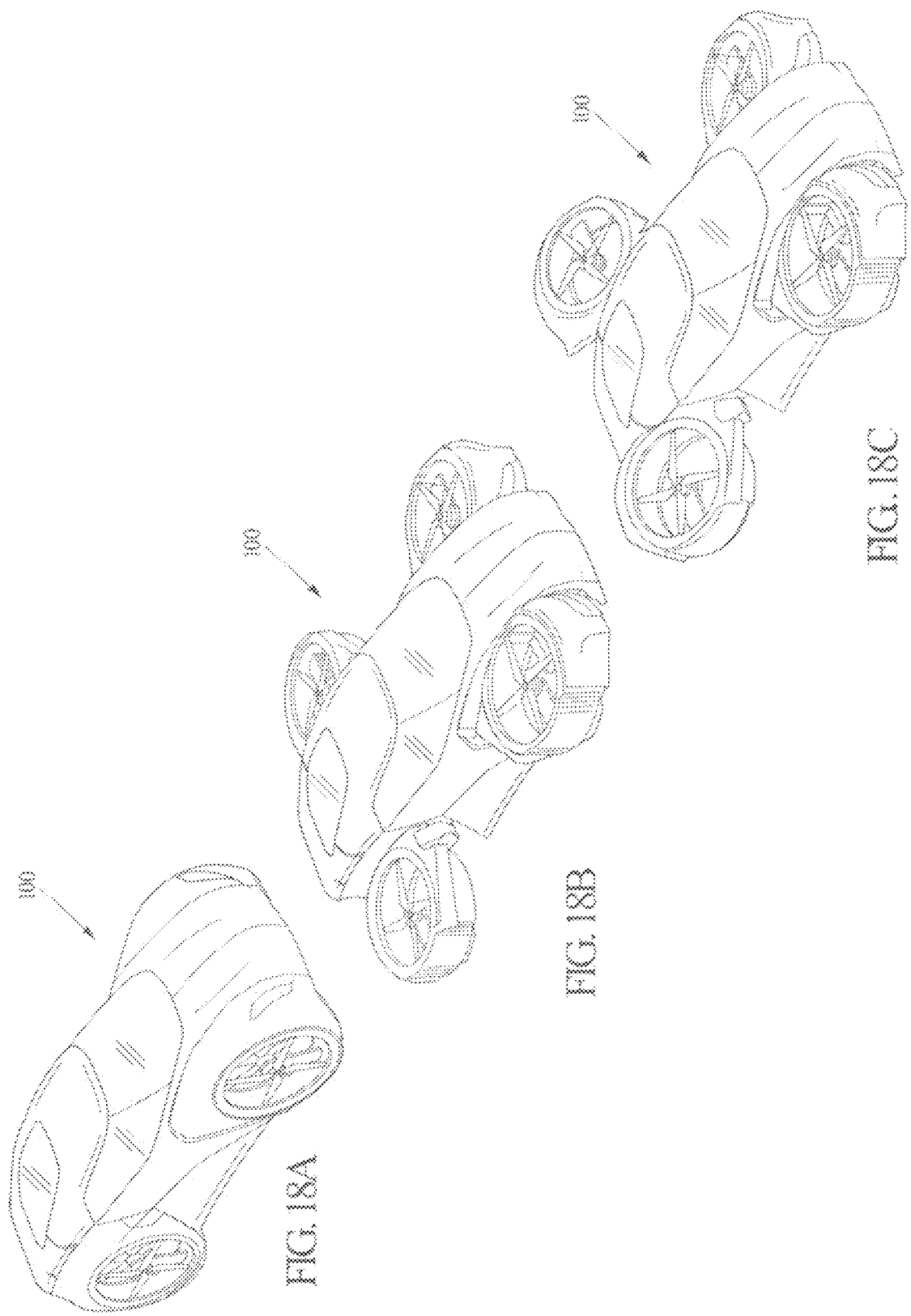

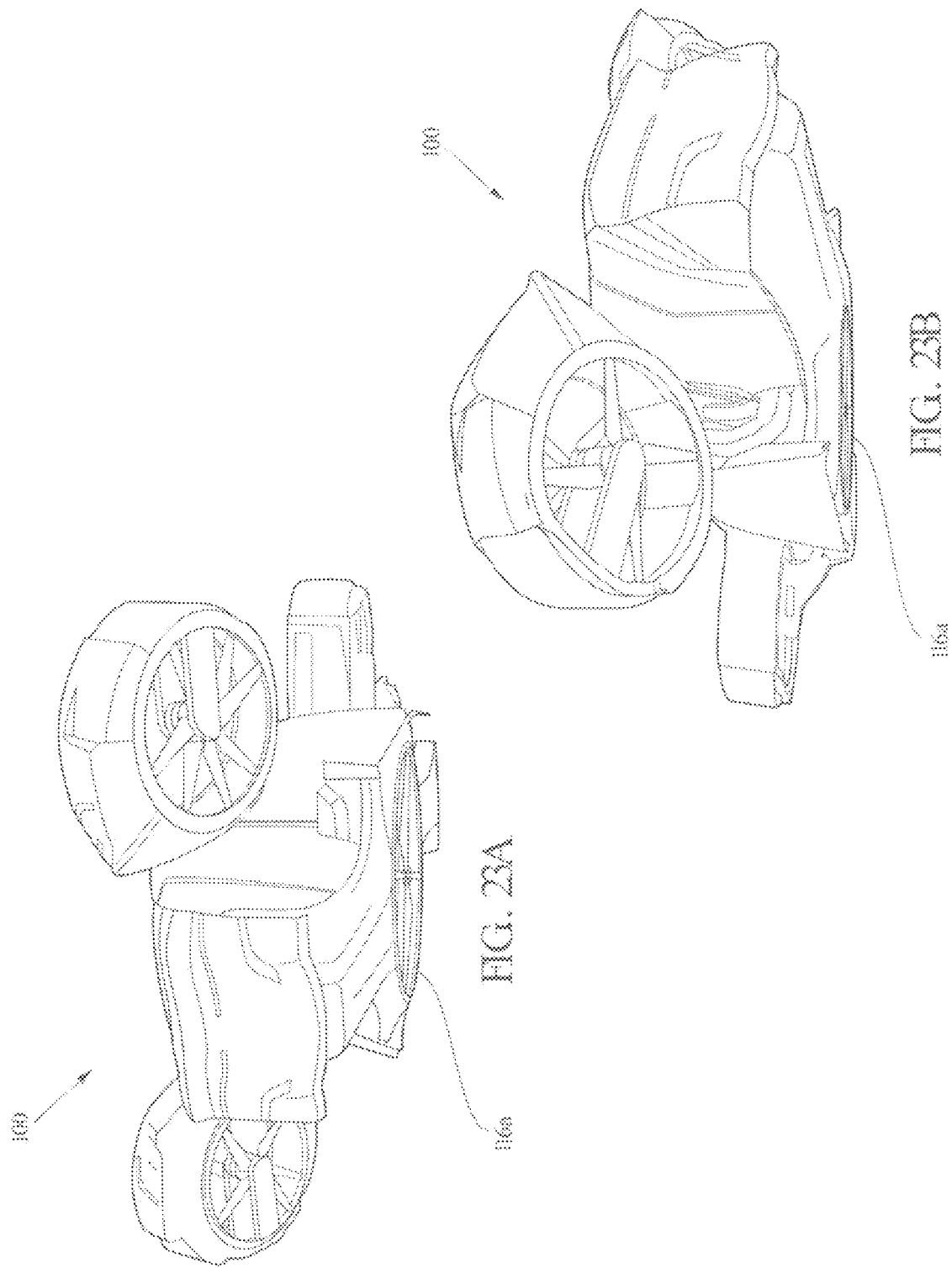

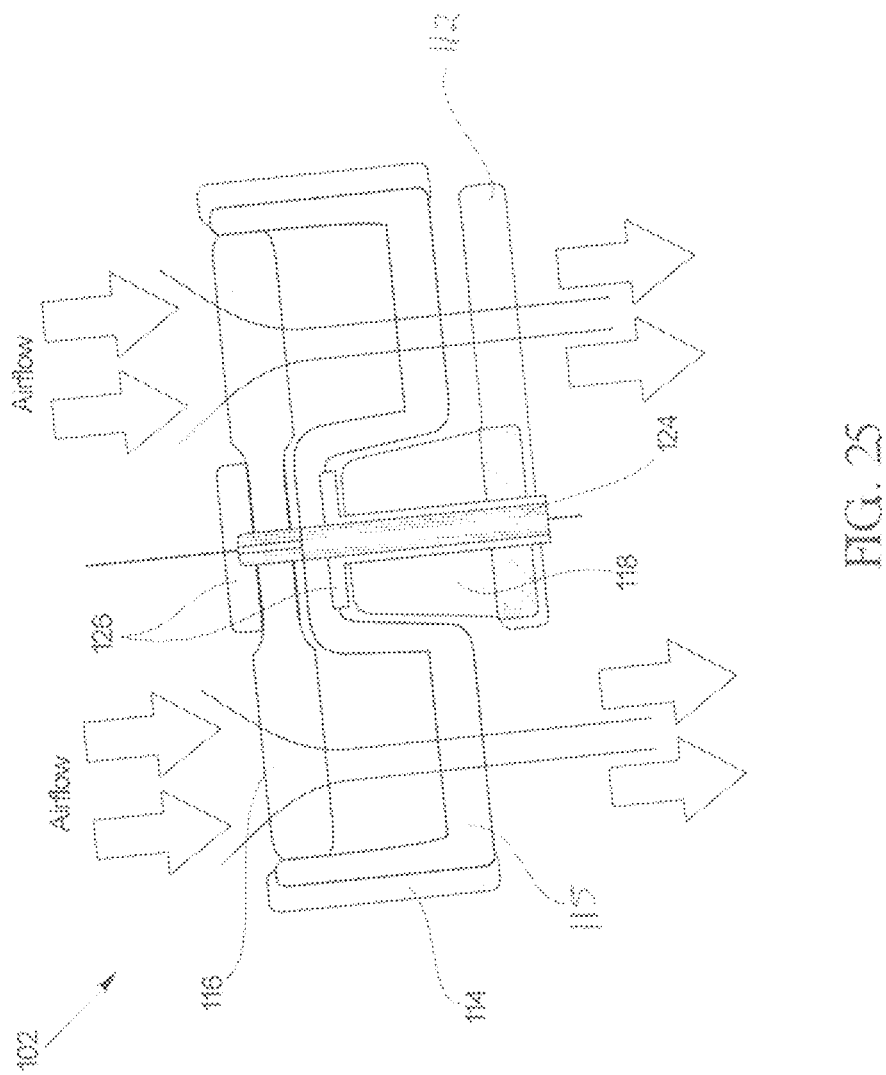

FIG. 31

| EVERON - Weight Goals | | | | |
|---|---|---|---|---|
| | Qty | Unit Weight | Total Weight | % |
| Fuselage | 1 | 175 | 175.0 | 15% |
| Wings | 1 | 100 | 100.0 | 8% |
| Nacelle | 4 | 15 | 60.0 | 5% |
| Interior Components | 2 | 10 | 20.0 | 2% |
| Structure | | | 355 | 30% |
| Motor | 4 | 25 | 100.0 | 8% |
| Variable Ducted fan | 4 | 18 | 72.0 | 6% |
| Electric Speed Controller | 4 | 5 | 20.0 | 2% |
| Motors Cooling System | 1 | 20 | 20.0 | 2% |
| Battery Management System | 1 | 8 | 8.0 | 1% |
| Propulsion | | | 220.0 | 18% |
| Avionics | 1 | 10 | 10.0 | 1% |
| Communication | 1 | 5 | 5.0 | 0% |
| Avionics & Communication | | | 15.0 | 1% |
| Electrical System | 1 | 20 | 20.0 | 2% |
| Wiring | 1 | 60 | 60.0 | 5% |
| Steering | 2 | 5 | 10.0 | 1% |
| Power Management System | 1 | 10 | 10.0 | 1% |
| Tilt Motor System | 4 | 15 | 60.0 | 5% |
| Wheel + Suspension | 4 | 5 | 20.0 | 2% |
| Systems | | | 180.0 | 15% |
| Empty Weight | | | 770.0 | 64% |
| Payload | 2 | 90 | 180.0 | 15% |
| Batteries | 1 | 250 | 250.0 | 21% |
| MTOW | | | 1200 | 100% |
| Useful Weight | | | 430 | 36% |

PERSONAL AUTO-CRAFT HAVING AUTOMOBILE AND VERTICAL TAKE-OFF CONFIGURATIONS

CROSS-REFERENCE TO RELATED APPLICATION(S)

This application is a continuation patent application of PCT International Patent Application No. PCT/US2019/046554, filed Aug. 14, 2019, which claims the benefit of and priority to U.S. Provisional Patent Application No. 62/718,611 filed Aug. 14, 2018, U.S. Provisional Patent Application No. 62/793,322 filed Jan. 16, 2019 and U.S. Provisional Patent Application No. 62/831,333 filed Apr. 9, 2019, each of which are incorporated herein by reference it their entireties.

FIELD

The present disclosure relates to a Personal Air Vehicle (PAV) or Personal Vertical Take-Off vehicle (PIVITOL) that is drivable and flyable enabling the movement of people and goods. In particular, the present disclosure relates to a vehicle that operates as a conventional automobile and is configured to transform into a PIVITOL for personal, public or leased flight transportation. Additionally, it can be adapted for specialized services, like emergency medical services.

BACKGROUND

Generally, people commute using a variety of transportation means including driving and different public transportation methods. Examples of transportation methods available to the general population include walking, bicycles, motorcycles, automobiles, trains, buses, etc. Unfortunately, roads and public transportation systems are not designed or maintained well enough to cope with peak commute demands and large metropolitan areas. These factors have resulted in increased average commute times, traffic congestion, and pollution. There is a need for improvements for personal transportation of the general population that is cost effective, decreases traffic congestion, and reduces pollution emissions.

According to the United Nations report, around 2.5 billion more people will be living in cities by 2050 and two out of every three people are likely to be living in cities or other urban centers, highlighting the need for more sustainable urban planning and public services. By 2030, it is estimated that cities that have more than 10 million inhabitants around the world could increase from 31 to 43, with most of increase occurring in developing countries. These swelling populations will place extra demands on both resources and services in urban areas, including transportation infrastructure and vehicles.

SUMMARY

The present disclosure is directed toward further solutions to address this need, in addition to having other desirable characteristics. Specifically, the present disclosure is directed to a vehicle configured to drive on conventional roadways that is also capable of transforming into a PIVITOL for in air transportation.

In accordance with example embodiments of the present invention, a vehicle is provided. The vehicle includes (1) a chassis with a body coupled thereto, the chassis defining (a) a vehicle roll axis extending from a front of the chassis to a rear of the chassis, (b) a vehicle pitch axis extending from a first side of the chassis to a second side of the chassis, wherein the vehicle pitch axis is perpendicular to the vehicle roll axis, and (c) a vehicle yaw axis extending from a top of the chassis to a bottom of the chassis, wherein the vehicle yaw axis is perpendicular to the vehicle roll axis and is perpendicular to the vehicle pitch axis. The vehicle also includes (2) at least two wheel assemblies coupled to the chassis. Each of the wheel assemblies includes (a) a fender defining a wheel rotational axis, wherein the fender is selectively movable between (i) a drive position wherein the wheel rotational axis is parallel to the vehicle pitch axis and (ii) a flight position wherein the wheel rotational axis is parallel to the vehicle yaw axis, (b) a drive element positioned within the fender and configured to rotate with respect to the fender about the wheel rotational axis, and (c) a tire positioned within the fender and configured to rotate with respect to the fender about the wheel rotational axis. When the fender is positioned in the drive position such that the wheel rotational axis is parallel to the vehicle pitch axis, the tire is positioned so as to contact a road surface such that rotation of the tire about the wheel rotational axis drives the vehicle along the road surface. When the fender is positioned in the drive position, the drive element is configured to engage the tire such that rotation of the drive element about the wheel rotational axis drives corresponding rotation of the tire about the wheel rotational axis. When the fender is positioned in the flight position such that the wheel rotational axis is parallel to the vehicle yaw axis, the drive element is configured such that rotation of the drive element about the wheel rotational axis with respect to the fender generates a thrust along the vehicle yaw axis. The vehicle further includes (3) at least one motor configured to drive rotation of the drive element of each of the at least two wheel assemblies.

In accordance with aspects of the present invention, the at least one motor includes at least one electric motor. The at least one motor can include at least one internal combustion engine. The at least one electric motor can include at least two electric motors, wherein each of the at least two electric motors correspond to a corresponding one of the at least two wheel assemblies, and wherein each of the at least two electric motors is configured to drive rotation of the drive element of the corresponding one of the at least two wheel assemblies. The drive element can include at least one of a propeller or a turbine.

In accordance with aspects of the present invention, the vehicle can further include a suspension configured to absorb impact when the at least one wishbone of each of the at least two wheel assemblies is positioned in the first position of the at least one wishbone. The suspension can include at least one of a front suspension, a rear suspension, or both. At least one of the at least two wheel assemblies can be a rear wheel assembly, such that when the fender of the rear wheel assembly is oriented in the flight position, the rear wheel assembly is configured to be selectively rotated about the vehicle pitch axis between at least (1) a hover orientation, wherein the thrust generated by the drive element of the rear wheel assembly is directed along the vehicle yaw axis, and (2) a forward thrust orientation, wherein the thrust generated by the drive element of the rear wheel assembly is directed at least partially toward the rear of the chassis so as to propel the vehicle in a forward direction. The body can include a plurality of seats. The plurality of seats can include at least two seats. The plurality of seats can include at least four seats. The body can include a cargo compartment.

In accordance with example embodiments of the present invention, a vehicle is provided. The vehicle includes (1) a chassis with a body coupled thereto, the chassis defining (a) a vehicle roll axis extending from a front of the chassis to a rear of the chassis, (b) a vehicle pitch axis extending from a first side of the chassis to a second side of the chassis, wherein the vehicle pitch axis is perpendicular to the vehicle roll axis, and (c) a vehicle yaw axis extending from a top of the chassis to a bottom of the chassis, wherein the vehicle yaw axis is perpendicular to the vehicle roll axis and is perpendicular to the vehicle pitch axis. The vehicle also includes (2) at least two wheel assemblies coupled to the chassis. Each of the wheel assemblies include (a) at least one wishbone having a central portion coupled to the chassis, a first free end extending away from the central portion in a first direction, and a second free end extending away from the central portion in a second direction opposite the first direction, the first free end of the at least one wishbone and the second free end of the at least one wishbone defining an axis of rotation. The at least one wishbone is configured to be movable with respect to the chassis between at least a first position and a second position so as to result in motion of the axis of rotation of the at least one wishbone with respect to the chassis between at least a first position and a second position. The axis of rotation in the first position is parallel to the axis of rotation in the second position and is perpendicular to the vehicle roll axis. The vehicle also includes (b) a fender defining a wheel rotational axis, wherein the fender is attached to the at least one wishbone such that the fender is configured to be rotatable about the axis of rotation of the at least one wishbone and such that the axis of rotation of the at least one wishbone is perpendicular to the wheel rotational axis. The fender is configured such that, when the wishbone is moved between the first position and the second position, the fender is caused to correspondingly rotate about the axis of rotation of the at least one of the at least one wishbone between a first orientation and a second orientation. The wheel rotational axis is parallel to the vehicle pitch axis when the fender is in the first orientation. The wheel rotational axis is parallel to the vehicle yaw axis when the fender is in the second orientation. The vehicle further includes (c) a rim positioned within the fender and rotatable with respect to the fender about the wheel rotational axis. The rim is configured to rotate with the fender when the fender rotates about the axis of rotation of the at least one wishbone. The vehicle also includes (d) a tire secured to the rim. The tire is configured to rotate with the fender when the fender rotates about the axis of rotation of the at least one wishbone. When the fender is positioned in the first orientation such that the wheel rotational axis is parallel to the vehicle pitch axis, the tire is positioned so as to contact a road surface such that rotation of the tire about the wheel rotational axis drives the vehicle along the road surface. The vehicle also includes (e) a drive element positioned within the fender and rotatable with respect to the fender about the wheel rotational axis. The drive element is configured to rotate with the fender when the fender rotates about the axis of rotation of the at least one wishbone. The drive element is configured to be selectively operable in a selected one of (1) a drive mode in which the drive element is engaged with the rim such that rotation of the drive element about the wheel rotational axis drives corresponding rotation of the rim and of the tire about the wheel rotational axis, and (2) a flight mode in which rotation of the drive element about the wheel rotational axis generates a thrust along the wheel rotational axis. The drive element is configured to operate in the drive mode when the fender is in the first orientation and to operate in the flight mode when the fender is in the second orientation. The vehicle further includes (f) a motor configured to drive rotation of the drive element about the wheel rotational axis.

In accordance with aspects of the present invention, the drive element includes at least one of a propeller or a turbine. The vehicle can further include a suspension configured to absorb impact when the at least one wishbone of each of the at least two wheel assemblies is positioned in the first position of the at least one wishbone. The suspension can include at least one of a front suspension, a rear suspension, or both. At least one of the at least two wheel assemblies is a rear wheel assembly, such that, when the fender of the rear wheel assembly is oriented in the second orientation and the drive element of the rear wheel assembly is operating in the flight mode, the rear wheel assembly is configured to be selectively rotated about the vehicle pitch axis between at least (1) a hover orientation, wherein the thrust generated by the drive element of the rear wheel assembly is directed along the vehicle yaw axis, and (2) a forward thrust orientation, wherein the thrust generated by the drive element of the rear wheel assembly is directed at least partially toward the rear of the chassis so as to propel the vehicle in a forward direction.

In accordance with aspects of the present invention, the at least one wishbone of each of the at last two wheel assemblies includes a first wishbone and a second wishbone, such that the second wishbone is movable with respect to the first wishbone and with respect to the chassis between at least a first position and a second position, an the fender is configured such that, when the second wishbone is moved between the first position and the second position, the fender is caused to correspondingly rotate about the second axis of rotation between the first orientation and the second orientation.

The at least one wishbone of at least one of the at least two wheel assemblies can include an outer ring and an inner ring, such that the at least one of the at least two wheel assemblies includes a duct positioned within the fender, wherein the duct is rotatable with respect to the fender about the vehicle yaw axis, and wherein, when the duct is rotated with respect to the fender about the vehicle yaw axis, the rim and the tire are caused to rotate correspondingly with respect to the fender about the vehicle yaw axis. The outer ring is coupled to the fender of the at least one of the at two wheel assemblies. The inner ring is coupled to the duct of the at least one of the at least two wheel assemblies. When the fender of the at least one of the at least two wheel assemblies is oriented in the first orientation and the drive element of the at least one of the at least two wheel assemblies is operating in the drive mode, the inner ring is rotatable with respect to the outer ring about the vehicle yaw axis so as to rotate (1) the duct of the at least one of the at least two wheel assemblies, (2) the rim of the at least one of the at least two wheel assemblies, and (3) the tire of the at least one of the at least two wheel assemblies about the vehicle yaw axis, thereby enabling the vehicle to be steered.

In accordance with example embodiments of the present invention, a vehicle is provided. The vehicle includes (1) a chassis with a body coupled thereto, the chassis defining (a) a vehicle roll axis extending from a front of the chassis to a rear of the chassis, (b) a vehicle pitch axis extending from a first side of the chassis to a second side of the chassis, wherein the vehicle pitch axis is perpendicular to the vehicle roll axis, and (c) a vehicle yaw axis extending from a top of the chassis to a bottom of the chassis, wherein the vehicle yaw axis is perpendicular to the vehicle roll axis and is perpendicular to the vehicle pitch axis. The vehicle also concludes (2) a plurality of assemblies coupled to the chassis. Each of the wheel assemblies include (a) a first wishbone having a central portion coupled to the chassis, a first free end extending away from the central portion in a first direction, and a second free end extending away from the central portion in a second direction opposite the first direction, the first free end of the at least one wishbone and the second free end of the at least one wishbone defining a first axis of rotation. The axis of rotation is perpendicular to the vehicle roll axis and (b) a second wishbone having a central portion coupled to the chassis, a first free end extending away from the central portion in a first direction, and a second free end extending away from the central portion in a second direction opposite the first direction, the first free end of the at least one wishbone and the second free end of the at least one wishbone defining a second axis of rotation. The second wishbone is configured to be movable with respect to the chassis and with respect to the first wishbone between at least a first position and a second position so as to result in motion of the second axis of rotation with respect to the chassis between at least a first position and a second position. The second axis of rotation in the first position is parallel to (i) the second axis of rotation in the second position, (ii) the first axis of rotation, and (iii) the vehicle roll axis. The wheel assemblies also include (c) a fender defining a wheel rotational axis, wherein the fender is attached to the first wishbone and to the second wishbone such that the fender is (i) configured to be rotatable about the first axis of rotation, (ii) configured to be rotatable about the second axis of rotation, and (iii) configured such that the wheel rotational axis is perpendicular to the first axis of rotation and to the second axis of rotation. The fender is configured such that, when the second wishbone is moved between the first position and the second position, the fender is caused to correspondingly rotate about the second axis of rotation between a first orientation and a second orientation. The wheel rotational axis is parallel to the vehicle pitch axis when the fender is in the first orientation. The wheel rotational axis is parallel to the vehicle yaw axis when the fender is in the second orientation. The wheel assemblies also include (d) a rim positioned within the fender and rotatable with respect to the fender about the wheel rotational axis. The rim is configured to rotate with the fender when the fender rotates about the second axis of rotation. The wheel assemblies also include (e) a tire secured to the rim. The tire is configured to rotate with the fender when the fender rotates about the second axis of rotation. When the fender is positioned in the first orientation such that the wheel rotational axis is parallel to the vehicle pitch axis, the tire is positioned so as to contact a road surface such that rotation of the tire about the wheel rotational axis drives the vehicle along the road surface. The wheel assemblies also include (f) a drive element positioned within the fender and rotatable with respect to the fender about the wheel rotational axis. The drive element is configured to rotate with the fender when the fender rotates about the second axis of rotation. The drive element is configured to be selectively operable in a selected one of: (1) a drive mode in which the drive element is engaged with the rim such that rotation of the drive element about the wheel rotational axis drives corresponding rotation of the rim and of the tire about the wheel rotational axis, and (2) a flight mode in which rotation of the drive element about the wheel rotational axis generates a thrust along the wheel rotational axis. The drive element is configured to operate in the drive mode when the fender is in the first orientation and to operate in the flight mode when the fender is in the second orientation. The wheel assemblies also include further includes (g) a motor configured to drive rotation of the drive element about the wheel rotational axis.

BRIEF DESCRIPTION OF THE FIGURES

The present disclosure is further described in the detailed description which follows, in reference to the noted plurality of drawings by way of non-limiting examples of exemplary embodiments, in which like reference numerals represent similar parts throughout the several views of the drawings, and wherein:

FIGS. 1A, 1B, 1C, 1D, and 1E depict isometric exterior views a vehicle in drive mode, in accordance with the present invention:

FIG. 5 depicts a cross-sectional view of an example embodiment for a wheel of the vehicle, in accordance with the present invention:

FIGS. 11A and 11B depict isometric views of example embodiments for suspension of the vehicle, in accordance with the present invention:

FIGS. 12A and 12B depict isometric views of example embodiments for suspension of the vehicle, in accordance with the present invention:

FIGS. 17A, 17B and 17C depict side views of example embodiments of a vehicle transforming from drive mode to flight mode, in accordance with the present invention:

FIGS. 18A, 18B and 18C depict isometric views of example embodiments of a vehicle transforming from drive mode to flight mode, in accordance with the present invention:

FIGS. 23A and 23B depict isometric views of example embodiments of wheels in flight mode, in accordance with the present invention:

FIG. 25 depicts an isometric view of example embodiments of a wheel in flight mode, in accordance with the present invention:

FIG. 31 depicts initial weight goals and projected weight goals for the vehicle, in accordance with the present invention:

Figure 1E:
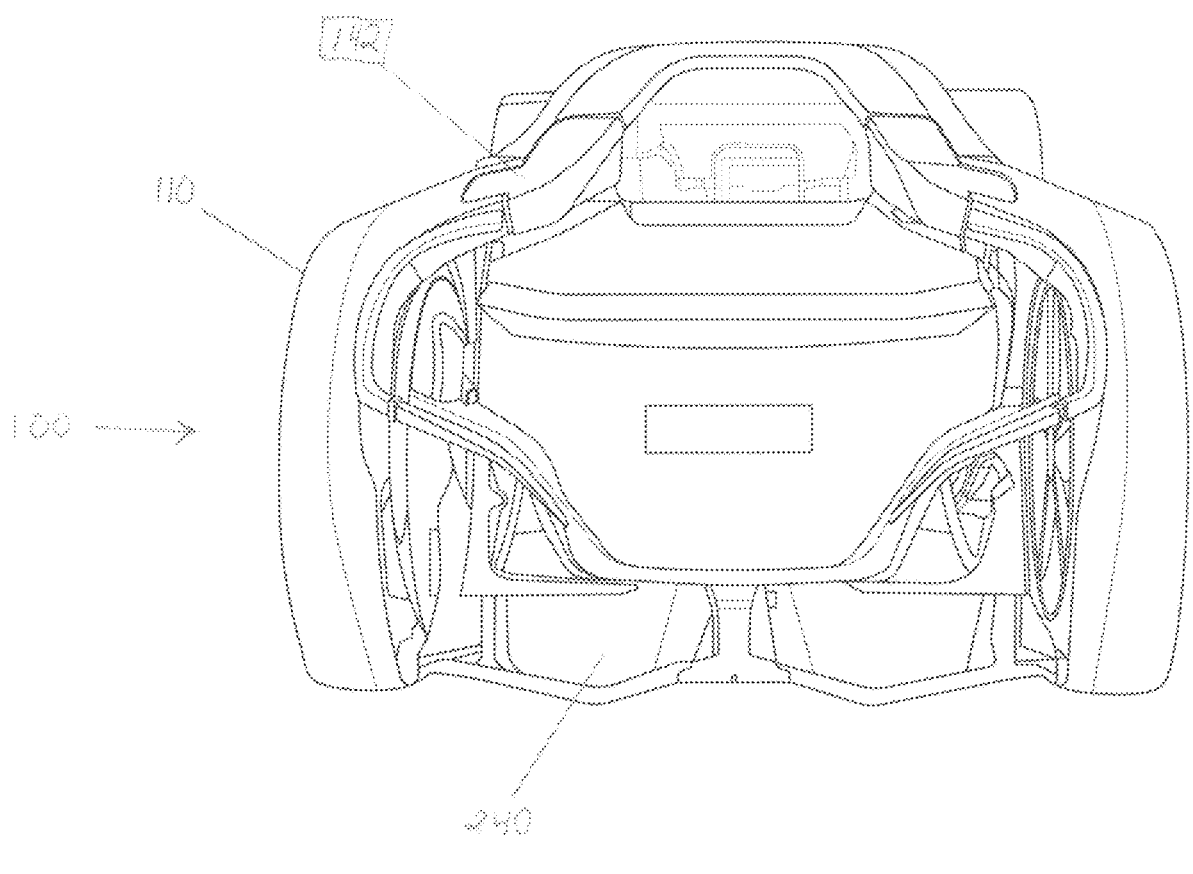

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to an automobile that is capable of transforming into a Personal Vertical Take Off vehicle (PIVITOL), air-car, personal aircraft, air vehicle, etc. Both the automobile configuration and PIVITOL configuration of the vehicle include features that are unique to the dual-purpose vehicle when compared to their respective counterparts. For example, the automobile configuration has a unique drivetrain, suspension, and overall design from conventional automobiles.

The vehicle of the present disclosure is designed to provide a user with duality of commuting options, including drive mode and flight mode. The vehicle can utilize a combination of components in a implementational to allows for seamless transformation from a four-wheeled vehicle (automobile) to an autonomous personal aerial craft, where the wheels serve also as ducted turbofans when pivoted into horizontal position. The aerial craft can operate in multiple different modes. For example, the craft can be operated in an airplane mode, with wings and tail fully extended and with rear thruster tilted forward. The craft can be operated in quadcopter mode with wings and tail retracted. The craft can be operated in drive mode with wings and tail retracted and with wheels/fenders 110 tilted vertically providing wheels for driving.

In some embodiments, the components can include tires for a drive mode, installed within a duct, casing, fender, etc. The components can also include individual motors for each wheel allow for equal power distribution and because of their compact nature they are built into the wheel and serve to power the tire when in drive mode as well as to power the turbofan when in flight mode while disengaging the tire. The components can further include front suspension is also built into already complex wheel allowing it to absorb vertical impact individually. The suspension frame also serves as a reinforcement allowing to securely mount the motor within the wheel. The rear suspension can be designed to absorb vertical impact using a swing arm. This allows for application of another unique solution. When the rear wheel is in horizontal position swing arm which serves purely as a suspension component when in drive mode becomes a software controlled tilt for the fan allowing it for forward propulsion.

For the purpose of this disclosure the term "automobile" means, a drivable and flyable vehicle, typically with two or more wheels, powered by an internal combustion engine and/or electric motor/other emerging alternate energy solutions and able to carry a small number of people.

For the purpose of this disclosure the term "PIVITOL" means, a personal aerial vehicle that is configured to hover, take off, and land vertically as an alternative to ground transportation. The PIVITOL can be enabled by unmanned aircraft technologies such as autonomous systems in accordance with government requirements.

For the purpose of this disclosure the term "drive mode" means, a vehicle with wheels making contact with and traversing over a surface (e.g., ground).

For the purpose of this disclosure the term "flight mode" means, a vehicle traversing within the air above and free from contact with a surface.

FIG. 1A through FIG. 36, wherein like parts are designated by like reference numerals throughout, illustrate some embodiments of operation of a transportation vehicle, according to the present disclosure. Although the present disclosure will be described with reference to the example embodiment or embodiments illustrated in the figures, it should be understood that many alternative forms can embody the present disclosure. One skilled in the art will additionally appreciate different ways to alter the parameters of the embodiment(s) disclosed, such as the size, shape, or type of elements or materials, in a manner still in keeping with the spirit and scope of the present disclosure.

FIGS. 1A-1D depict some illustrative isometric views of the automobile configuration of the vehicle 100. FIG. 1A depicts a side perspective isometric view of the vehicle 100, FIG. 1B depicts an elevated view of the vehicle 100 from above, FIG. 1C depicts an elevated, side view of the vehicle 100, and FIG. 1D depicts an elevated view of the vehicle 100 from the rear. The vehicle has a front end 100b, a rear end 100a, an undercarriage 100c, and a roof 100d, as depicted in FIG. 1A. Although not specifically labeled, the vehicle 100 of the present disclosure includes typical components as a convention automobile. For example, the vehicle has a passenger side, a driver side, passenger side door(s) 104, driver side door(s) 104, an interior cabin, etc. Unless specified otherwise, this also includes conventional parts, such as a windscreen, a trunk or hatchback, windows, fenders, bumpers/facias, lights, etc. In some embodiments, the vehicle is sized and dimensioned to be approximately the size of a compact sport utility vehicle (SUV) but with larger wheels 102 than a conventional automobile. For example, the wheels 102 can be approximately 1000-1200 millimeters in diameter.

The dimensions of the vehicle 100 can vary based on the mode that the vehicle 100 is in. For example, the vehicle 100 can be approximately 2-3 meters wide, 4-5 meters long, and 1-2 meters high when in drive mode and approximately 4-5 meters wide, 4-5 meters long, and 1-2 meters high when in flight mode. The wheels 102 of the vehicle 100 are larger to accommodate the lift generating propellers 116 or turbines located within the wheel duct 112. In some embodiments, the propellers 116 can be five bladed propellers with a diameter of approximately 900-1200 mm. When rotating, the propellers 116, and motors attached thereto, can be designed to generate sufficient lift to lift the vehicle and passengers/cargo therein. For example, the propellers 116 can use a combination of 8×100 kw motors to produce approximately 2000-3000 kg of thrust. The propellers 116 can be manufactured using any combination of strong lightweight materials, for example, carbon fiber. The terms propellers, rims, turbines, and thrusters are provided throughout the disclosure and can be used interchangeable to indicate drive elements that provide propulsion, without departing from the scope of the present disclosure. The vehicle 100 can be configured to weigh approximately 1200-2000 kilograms gross weight and carry a 250-500-kilogram payload for a net weight of 950-1500 kilograms. For example, the vehicle 100 can be designed to hold four passengers and their luggage or it can be adapted to transport a single passenger and larger payloads (e.g., packages) or adaptable for other specialized transportation services.

Referring to FIG. 1E, in some embodiments, the vehicle can include retractable wings 220 and retractable rear stabilizers 240. FIG. 1E shows a rear view of the vehicle 100 with the wings 220 and the rear stabilizers 240 in a retracted position. The wings 220 can include any combination of structure and components known in the art. For example, the wings 220 can be sized and shaped to generate lift for the vehicle 100 and can include any combination of ailerons, flaps, spoilers, winglets, etc. In some embodiments, the retractable rear stabilizers 240) can be retracted under the underside of the rear 100a of the vehicle, as shown in FIG. 1E. The retractable rear stabilizers 240 can include any combination of structure and components known in the art. For example, the rear stabilizers 240 can be sized and shaped to generate lift for the vehicle 100 and can include any combination of elevators, vertical stabilizer, rudder, etc.

With respect to FIGS. 2A-2D, in some embodiments, the vehicle 100 is a multi-passenger vehicle. For example, the vehicle can accommodate up to four passengers. To provide passenger access to the interior of the vehicle 100, the vehicle can have doors 104 and adjustable seating 106. FIGS. 2A-2D depict example isometric views of the vehicle 100. In particular, FIGS. 2A-2D show examples of the doors 104 and the seats 106. In some embodiments, the doors 104 are gullwing doors that lift vertically to allow a passenger to enter the vehicle 100 without obstruction. The gullwing doors can be configured using any combination of electro mechanical systems known in the art. For example, the gullwing doors 104 can be electrically powered to open and close with minimal user exertion. In some embodiments, the gullwing doors 104 can provide access to an interior cabin that includes four seats 106.

Figure 2A:
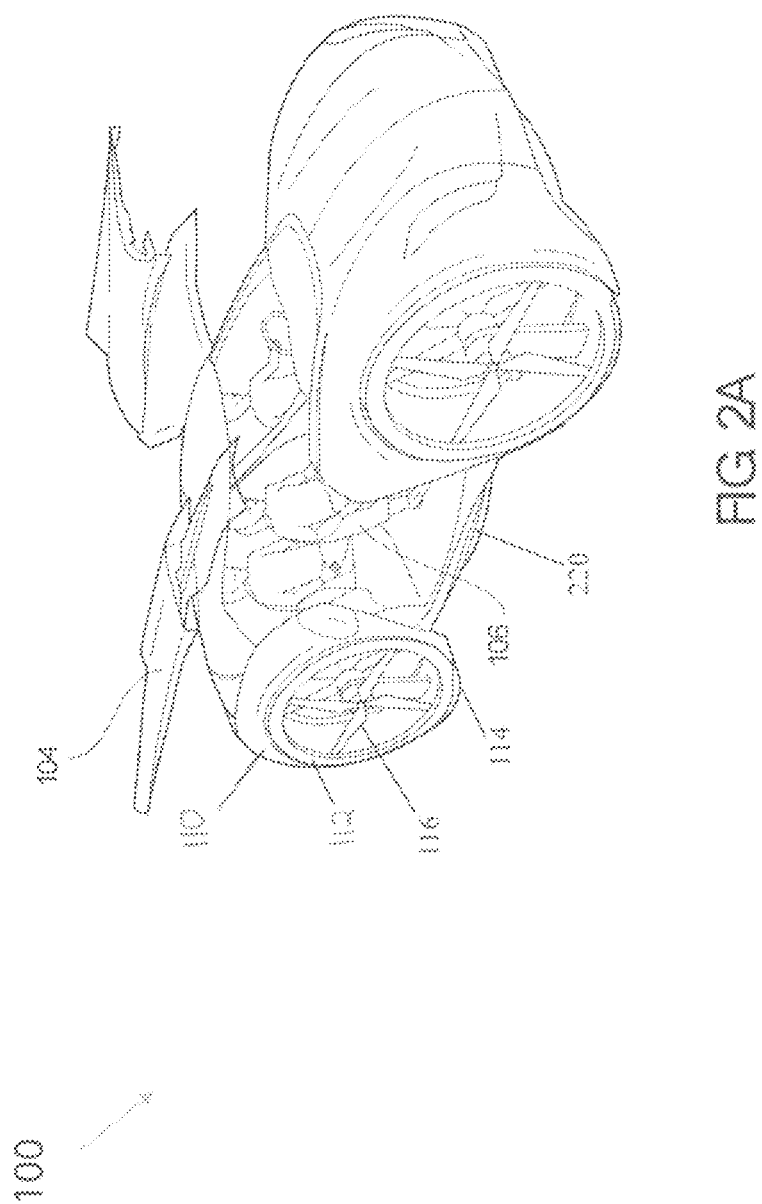
FIGS. 2A, 2B 2C, and 2D depict isometric interior views of the vehicle, in accordance with the present invention.
Figure 2B:
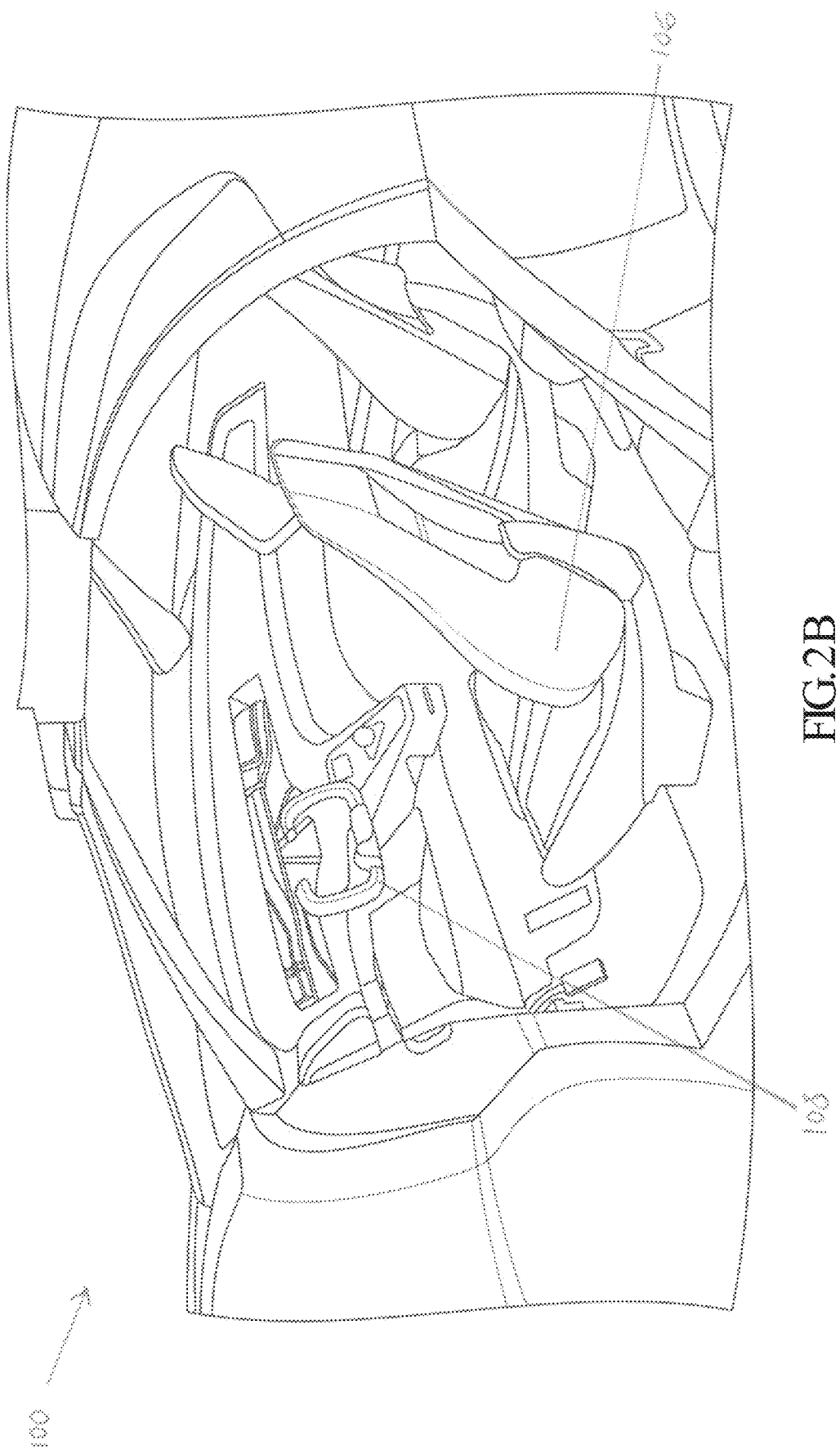

In FIGS. 2A and 2B the doors 104 are in an open position and the seats 106 are in the driving position (the position passengers will be in during transit within the vehicle 100). The interior of the vehicle 100 can include any combination of components that may be present in a ground based vehicle and a flight based vehicle. For example, as shown in FIG. 2B, the interior of the vehicle 100 can include information screen for displaying all information regarding systems, GPS, entertainment, built in cameras, mirrors, landing guidance, etc. In some embodiments, the steering wheel 108 can be collapsible and retract into the dash, away from sight, when the vehicle 100 transforms from drive mode to flight mode. For example, the steering wheel 108 can be retractable and collapse/disappear into the dash when the vehicle 100 enters flight mode. In some embodiments, the interior and interior components can be constructed from lightweight and strong materials, such as for example, carbon fiber, aluminum, and other light weight components.

Figure 2D:
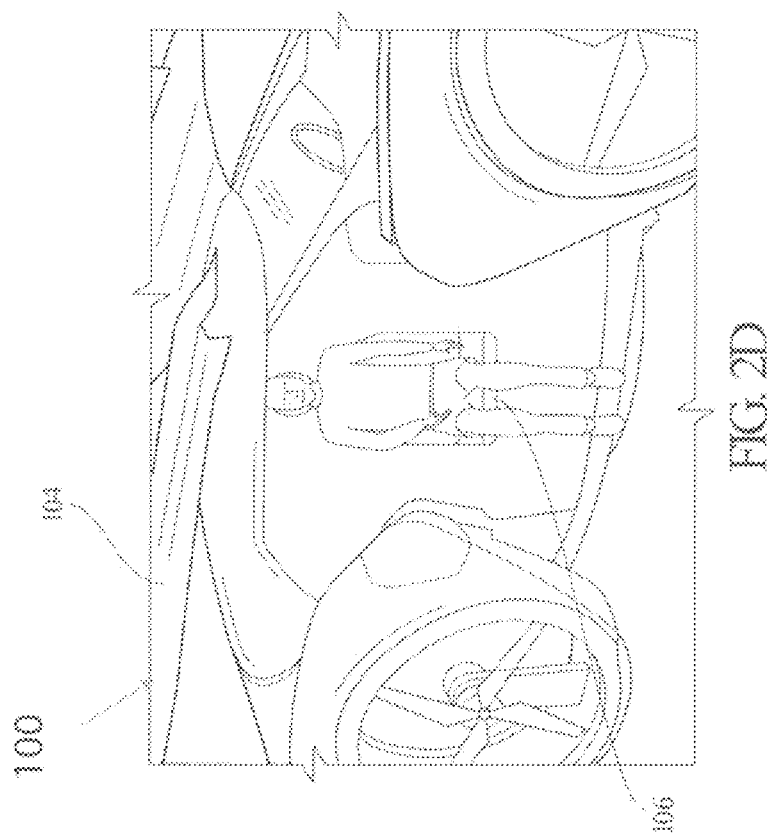
Figure 2C:
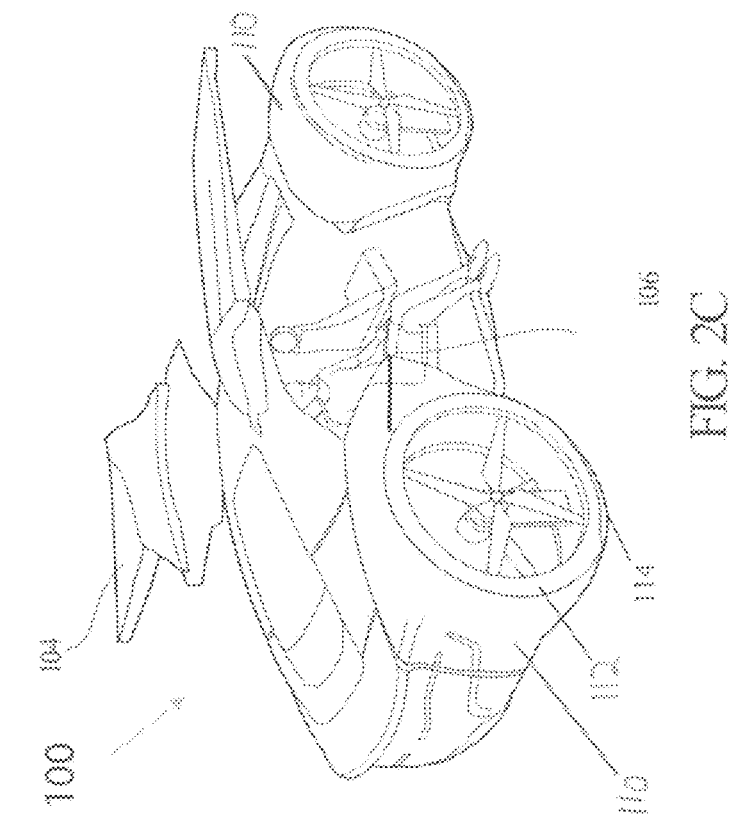

Referring to FIGS. 2C and 2D, in some embodiments, the interior of the vehicle 100 can include a seating mechanism that allows the seats 106 to rotate, pivot, etc. allowing rear passengers to disembark the vehicle from a seated position without having to climb behind the front seats. The seating mechanism can be a hinge mechanism or any combination of electromechanical systems that would enable a seat to rotate/pivot to a desired position. FIG. 2C depicts the doors 104 are in an open position and the seats 106 rotating/pivoting toward the door opening.

FIG. 2D depicts the doors 104 in an open position and the seats 106 being fully rotated/pivoted toward the door opening, allowing the passenger to exit the vehicle 100 with ease. The seats 106 can be configured to rotate/pivot in any combination of configurations within a 180-degree rotation. For example, the seats 106 can be configured to face the driving direction of the vehicle 100 while in transit and can pivot 90 degrees to the adjacent door opening when allowing a passenger to enter/exit the vehicle 100. The same mechanism can be applied to front/middle seats.

Figure 3A:
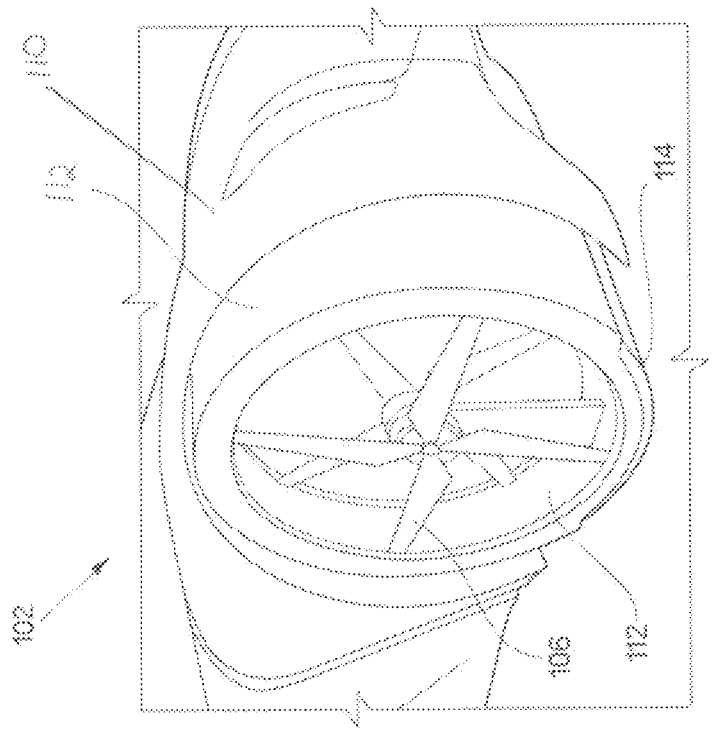
FIGS. 3A, 3B, 3C, 3D, and 3E depict isometric views of example embodiments for a fender/wheel of the vehicle, in accordance with the present invention.
Figure 3B:
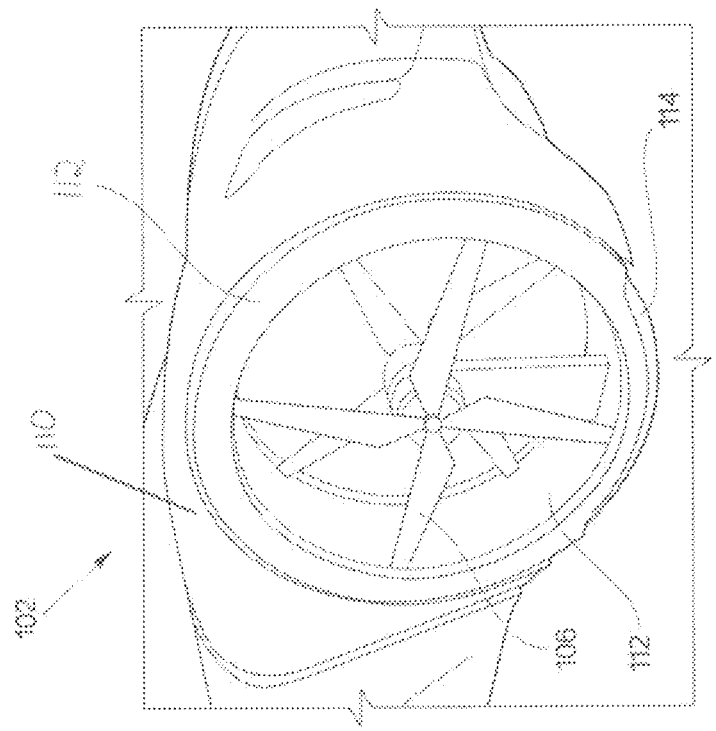

Referring to FIGS. 3A and 3B, in some embodiments, one or more of the wheels 102 can be encased in individual fenders 110 attached to the frame 200 of the vehicle 100. In some embodiments, each fender 110 (or casing) can include a combination of components of the wheel 102 construction. For example, the fenders 110 can include the duct 112, rims 115, tires 114, and one or more propellers 116 (or turbines 152). FIGS. 3A and 3B depict illustrative examples of the wheel 102 fenders 110 including the duct 112, rims 115, tires 114, and one or more propellers 116. In some embodiments, the rims 115 can include spokes, providing structural support in a similar manner to a conventional wheel, or the propellers 116 can function as and/or resemble the spokes of the rim 115. The ducts 112 can include part of the body structure of the car (e.g., body panels) as well as the mechanical structure of the vehicle 100 (e.g., duct 112, rims 115, tires 114, propellers 116, brakes 120, runners 122, suspension, etc.) as the overall structure of the wheels 102. The ducts 112 provides protection of the wheels 102 (and all the components thereof) during drive mode and during flight mode. In some embodiments, the ducts 112 can be configured to cover a majority of the rims 115/tires 114 to protect the propellers(s) 116 or turbines 152 during flight mode while still providing enough contact between the tires 114 and a driving surface during drive mode.

Figure 3C:
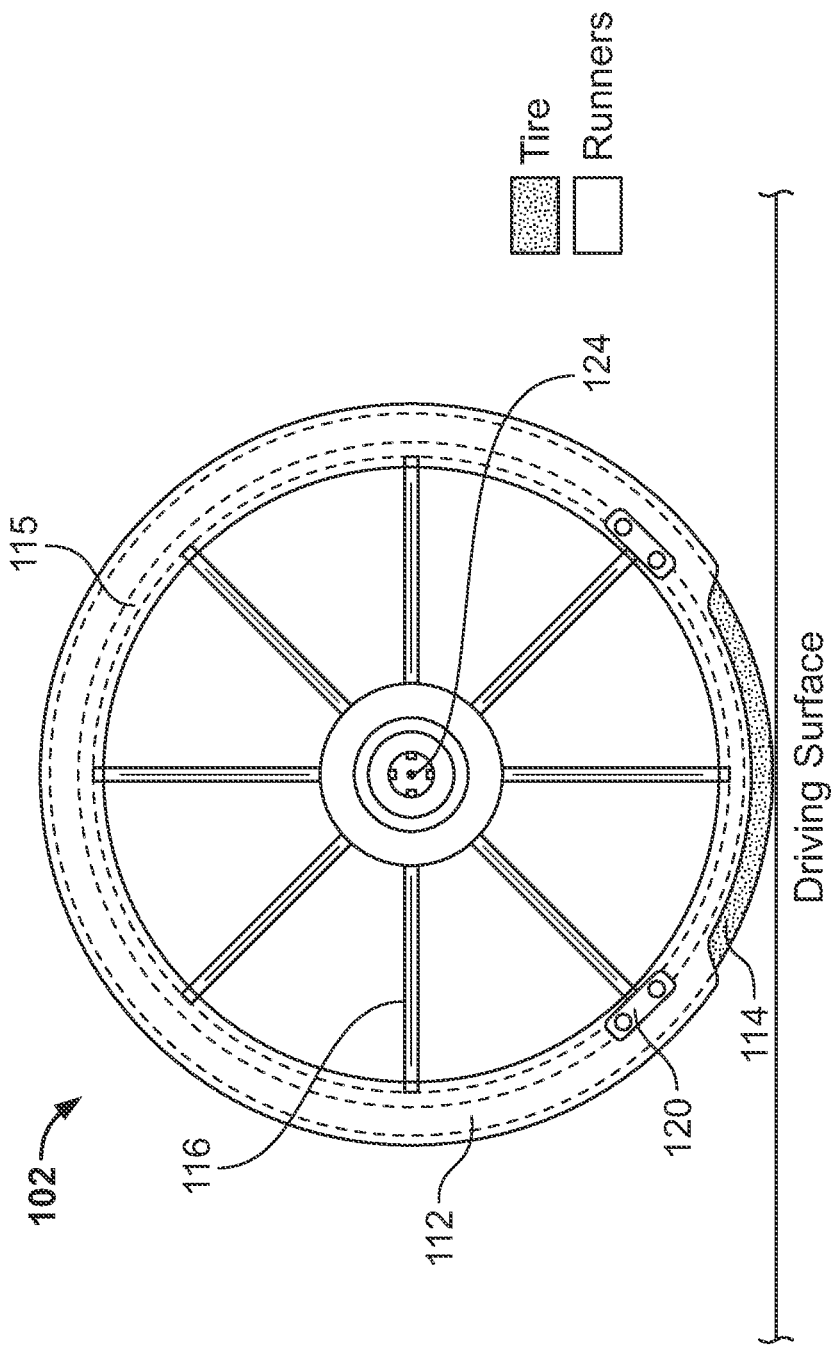

Referring to FIG. 3C, the fenders 110 can include a unique combination of components to enable the wheels 102 to operate by rotating the tires 114 in drive mode while enabling the propeller(s) 116 or turbines 152 to rotate in fly mode. In some embodiments, the driving motors 118, suspension, and brakes 120 can all be concealed inside the ducts 112 and/or fenders 110. For example, the brakes 120 can be electro-hydraulic brakes 120 that are electrically operated and built into runners 122 inside the fender 110 and/or ducts 112. The wheels 102 can include runners 122 grooved within the inner side of the ducts 112 with piston driven brakes 120 within the runners 122 to stop the vehicle 100 while in drive mode. The tires 114 can be solid or inflatable tires wrapped around the rims 115. For example, the tires 114 can be low profile non-inflatable tires wrapped around the rims 115 to provide grip, traction, and comfort. The rims 115 can be a conventional rim shape with the conventional spokes replaced with propellers 116 or turbines 152. The tires 114 can be configured to spin freely inside the ducts 112 powered by its own electromagnetic field also build into the ducts 112.

Continuing with FIG. 3C, in some embodiments, rotation of both the propellers 116 (or turbines 152) and the tires 114/rims 115 are controlled by a shaft mechanism 124. One end of the shaft 124 of the mechanism can be coupled to a driving motor 118 and the other end is configured to removably couple with the rim 115 (for rotation of the rim 115 and attached tire 114) and the propeller(s) 116 or turbine 152 via a sprocket or gear 126. When the sprocket or gear 126 is engaged with the rim 115, the motor will provide rotational power, through the shaft 124, to the rim 115 to spin the rim 115 and tire 114 to provide forward momentum of the vehicle 100 on a driving surface. The propeller(s) 116 or turbine(s) 152 can be configured to spin with the rims 115 or can remain stationary while the rims 115 spin. When the sprocket or gear 126 is engaged with the propeller(s) 116 or turbine(s) 152, the motor will provide rotational power, through the shaft 124, to the propeller(s) 116 or turbine(s) 152, providing vertical and horizontal thrust during takeoff, flight, and landing of the vehicle 100. In some embodiments, the propeller(s) 116 or turbine(s) 152 can be configured to spin within grooves in the ducts 112.

In some embodiments, the propeller(s) 116 or turbines 152 can be configured to removably attach to the ducts 112 and can transfer power from the driving motor(s) 118 to the rims 115/tires 114. In some embodiments, while in drive-mode, the one or more propellers 116 are locked in place with the ducts 112 such that the rotational output of the motor(s) coupled to the propellers 116 causes the propellers 116 to rotate and thus causes the rims 115/tires 114 to rotate. In some embodiments, the propellers 116 can include a freewheel that can be configured to stay in position while the wheel 102 spins or can spin along with the wheel 102 during drive mode. The propellers 116 can be removably attached to the ducts 112 using any combination of mechanisms known in the art. For example, the propellers 116 can spin inside the duct 112 with the tips of the blades aligned with grooves in the duct 112, to allow the propellers 116 or turbines 152 to spin freely.

Figure 3D:
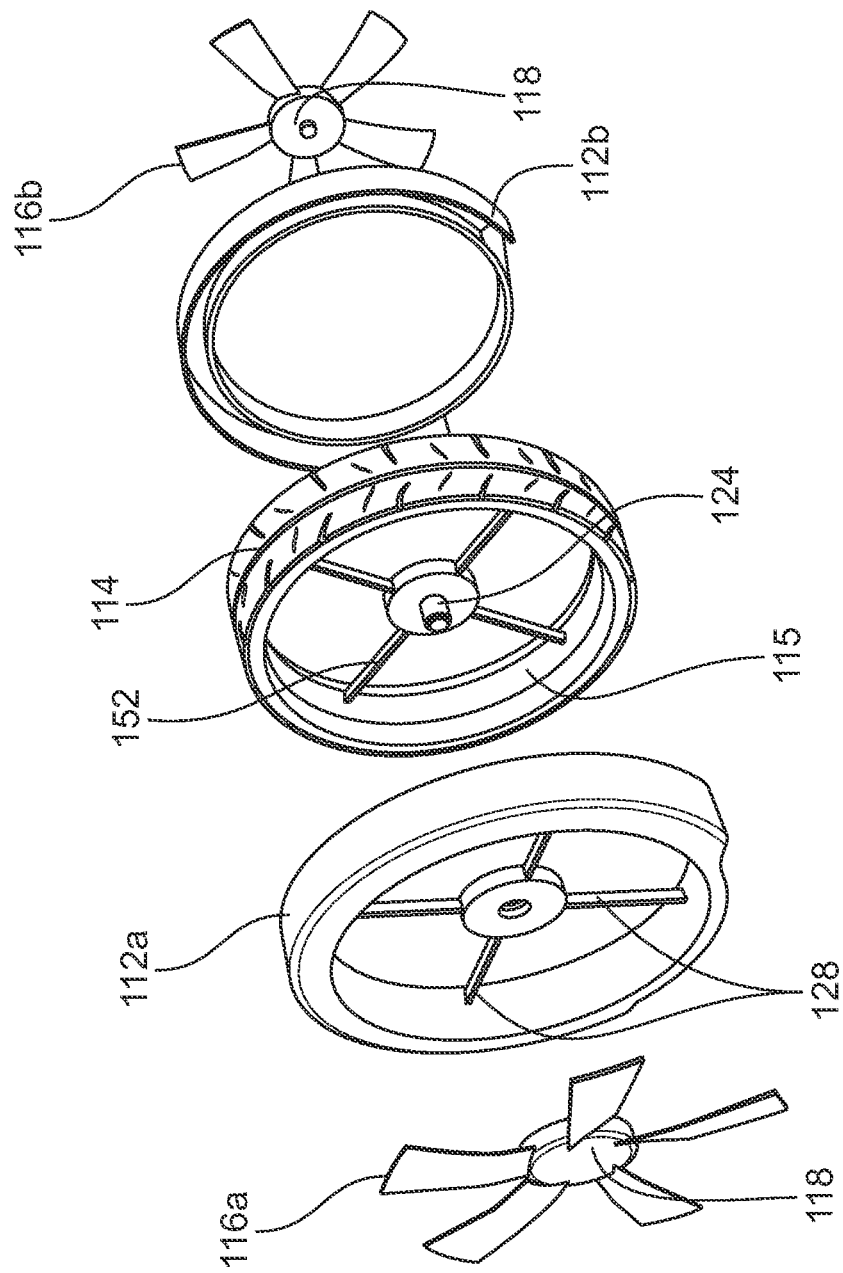
Figure 3E:
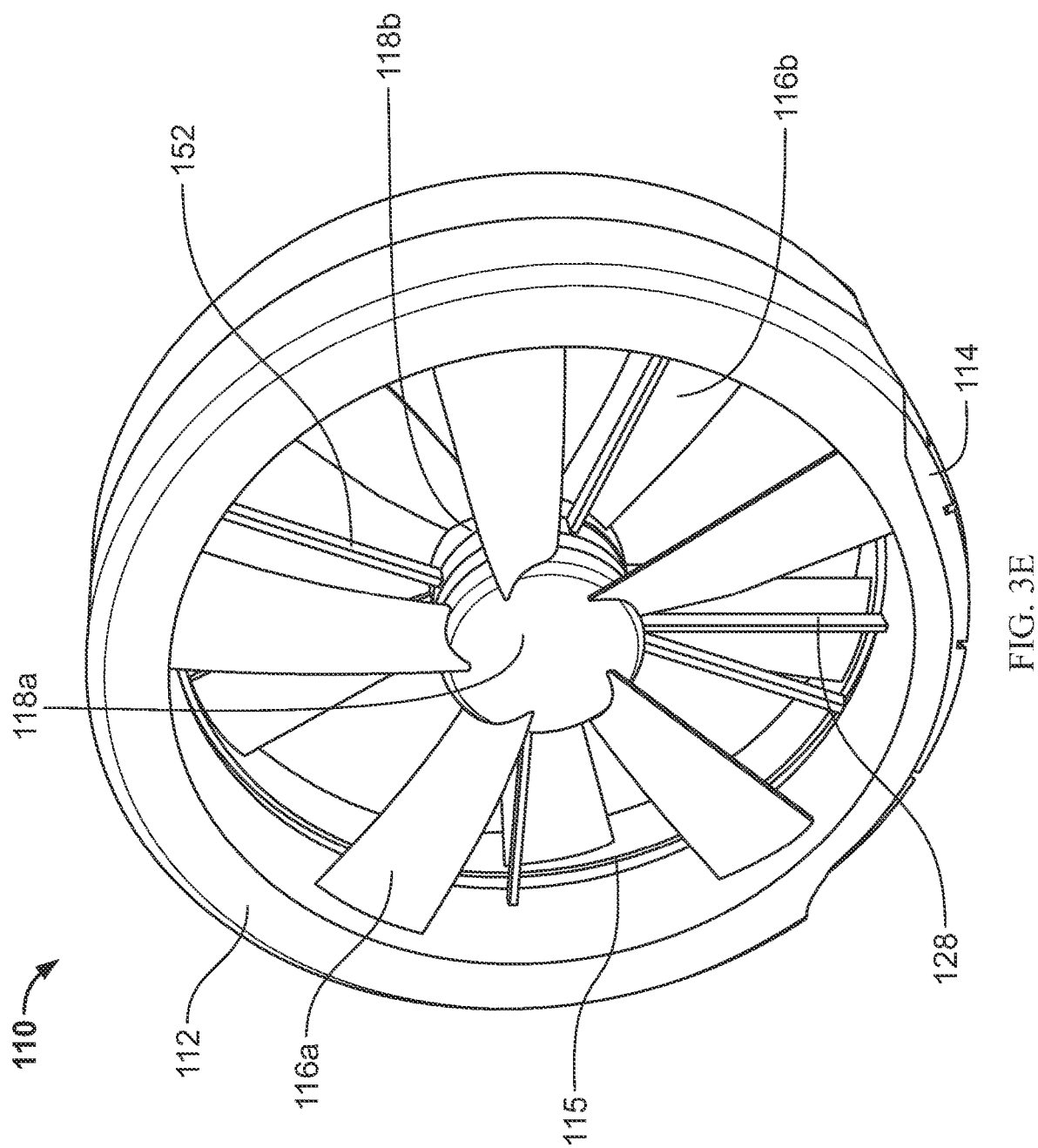

Referring to FIGS. 3D and 3E, in some embodiments, the fender 110 can include a dual propeller 116 configuration. FIG. 3D depicts an exploded view of the fender 110 with dual propellers 116. In particular, FIG. 3D depicts a fender 110 that includes a first propeller 116a, an outer duct 112a, an inner duct 112b, and a second propeller 116b. The propellers 116a, 116b can include any design propellers and can be configured in the manner discussed herein with respect to propeller 116. In some embodiments, the tire 114 can be wrapped around a rim (or tire support ring) 115 that includes a plurality of spokes 152 and has a centralized shaft 124 connected to a clutch mechanism. The outer duct 112a and the inner duct 112b can be combined to form the duct 112 by coupling together with the tire 114 and rim 115 positioned therebetween, as depicted in FIG. 3E. In some embodiments, the propellers 116a, 116b, can be positioned within the inner circumference of the ducts 112a. 112b, respectively, and can be mounted onto the shaft 124. FIG. 3E depicts an assembled view of the fender 110 with dual propellers 116.

In some embodiments, the propellers 116a, 116b can be counter rotating and can be individually powered by one or more driving motors 118 attached to the shaft 124. For example, in drive mode, the driving motor(s) 118 can deliver power to the tire 114 via the shaft 124 and set of spokes 152 mounted between the shaft 124 and the tire 114. In some embodiments, each fender 110 can include two driving motors 118 (totaling eight for vehicle 100), each mounted to the duct 112a via a motor mount 128. At least one of the driving motors 118 is designed to drive the tire 114 via the spokes 152 mounted to the tire 114 through inner wall of the duct 112. Those spokes 152 can be sized, shaped, and contracted to transfer power from the driving motor 118 to the tire 114.

In some embodiments, rim 115 can be encased between a gap created by the formation of the duct 112 (combining the outer duct 112a and the inner duct 112b) and the spokes 152 can extend through the inner wall of the assembled duct 112, as depicted in FIG. 3E. In some embodiments, when in drive mode, the propellers 116a, 116b can be disengaged from the driving motor(s) 118 using the shaft 124 clutch mechanism and, when in flight mode, the driving motor(s) 118 can deliver power to the propellers via shaft 124. Similarly, when inflight mode, the tire 114, the rim 115, along with the thin spokes 152 can be disengaged from the driving motor(s) 118 via the shaft 124 clutch mechanism leaving the propellers 116a. 116b to spin freely. A single propeller 116 implementation can be implemented in a similar manner without departing from the scope of the present invention.

Figures 4A, 4B, 4C:
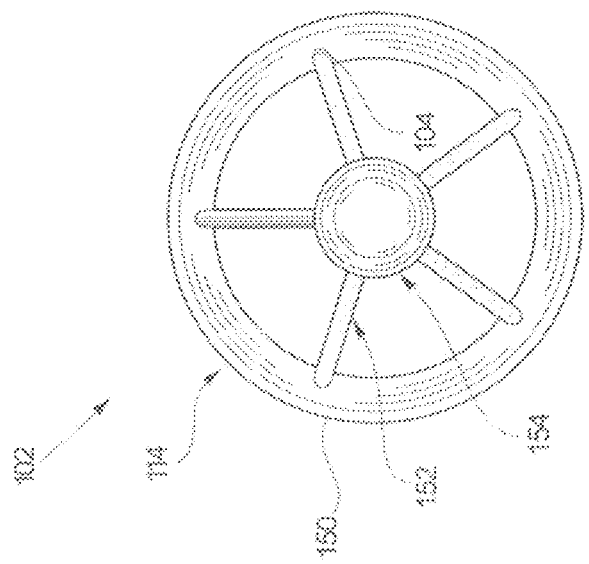
FIGS. 4A, 4B and 4C depict isometric views of example embodiments for a wheel of the vehicle, in accordance with the present invention.

Referring to FIGS. 4A-4C, in some embodiments, the wheels 102 can be road wheels 102 combined with a propeller 116 or turbine thruster. For example, thin spokes 152, air ducts of the turbine can form the spokes of the rim 112 of the wheel 102. FIGS. 4A-4C depict illustrative examples of this implementation. The turbine thruster can include the tire 114, a combined rim and air duct 150, airfoil spokes 152, and a motor housing 154. In some embodiments, each of the wheels 102 can include an individual wheel housing or a driveline from a centralized motor (e.g., to control the rims 115 and propeller(s) 116 or turbines associated with that wheel 102). The driving motors 118 can be any combination of electrical, mechanical, or electromechanical motors known in the art.

Referring to FIG. 5, in some embodiments, the vehicle 100 can be powered by any combination of electrical, mechanical, or electromechanical systems. In some embodiments, the vehicle 100 can have a plurality of driving motors 118, located within each fender 110, configured to provided power to the wheels 102 and propellers 116. For example, each propeller or pair of propellers 116 can be connected to a single driving motor 118 (e.g., a 200-horsepower electrical motor) installed within the respective fender 110. The driving motors 118 can be configured to provide power to the propellers 116 during normal drive mode as well as flight mode, as discussed in greater detail herein.

FIG. 5 provides an example schematic view of the wheel 102 configured for drive mode. In particular, FIG. 5 depicts the fender 110, which can be fixedly attached to the main frame of the vehicle, including a housing for the driving motor 118, the propeller(s) 116 connected to the driving motors 118 and the rim 115 (with spokes 152) and a tire 114 wrapping the rim 115. This configuration allows the driving motor 118 to individually drive the propeller(s) 116 or the rim 115 rotationally via the shaft 124. FIG. 5 depicts the wheel 102 in a substantially vertical orientation configured to propel the vehicle 100 along a driving surface by the motor providing rotational power to the rim 115/tire 114 via the shaft 124 and sprocket or gear 126 mechanism. In some embodiments, the driving motors 118 can be communicatively attached to a centralized managements system configured to properly adjust power and speed of the driving motors 118 when controlling the vehicle 100 in different modes. In some embodiments, the frame 200 can include a combination of structural components including a central support beam 202, side support mounts 204, rear fender mounts 206, and front fender supports 208. The frame 200, including each of the structural components 202, 204, 206, 208, 210 thereof, can be a single unibody frame structure or a multi-frame structure with each of the components fastened, welded, bolted to the central support beam 202.

Figure 6A:
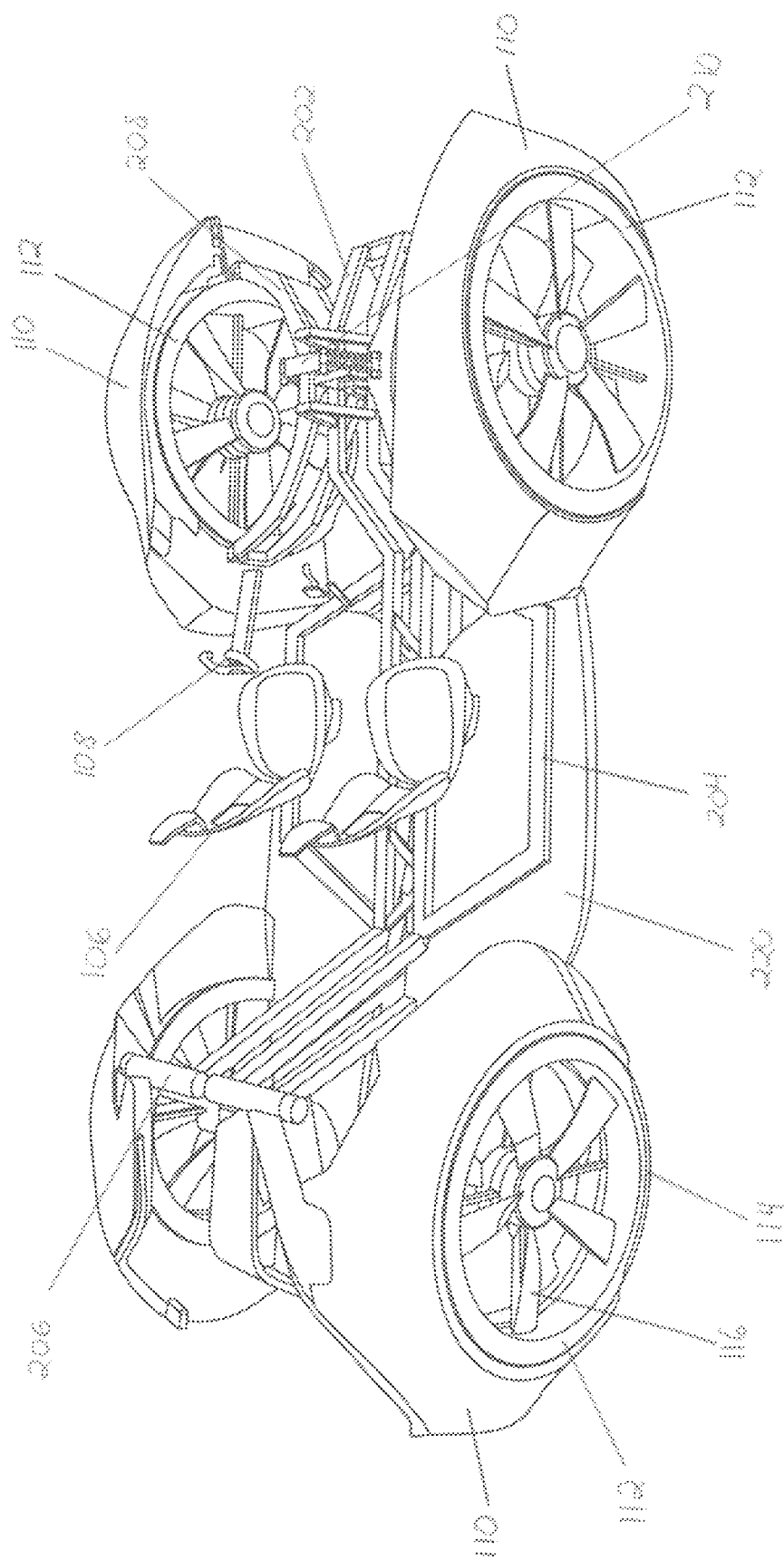
FIGS. 6A, 6B, and 6C depict isometric views of example embodiments for a frame of the vehicle, in accordance with the present invention.
Figure 6B:
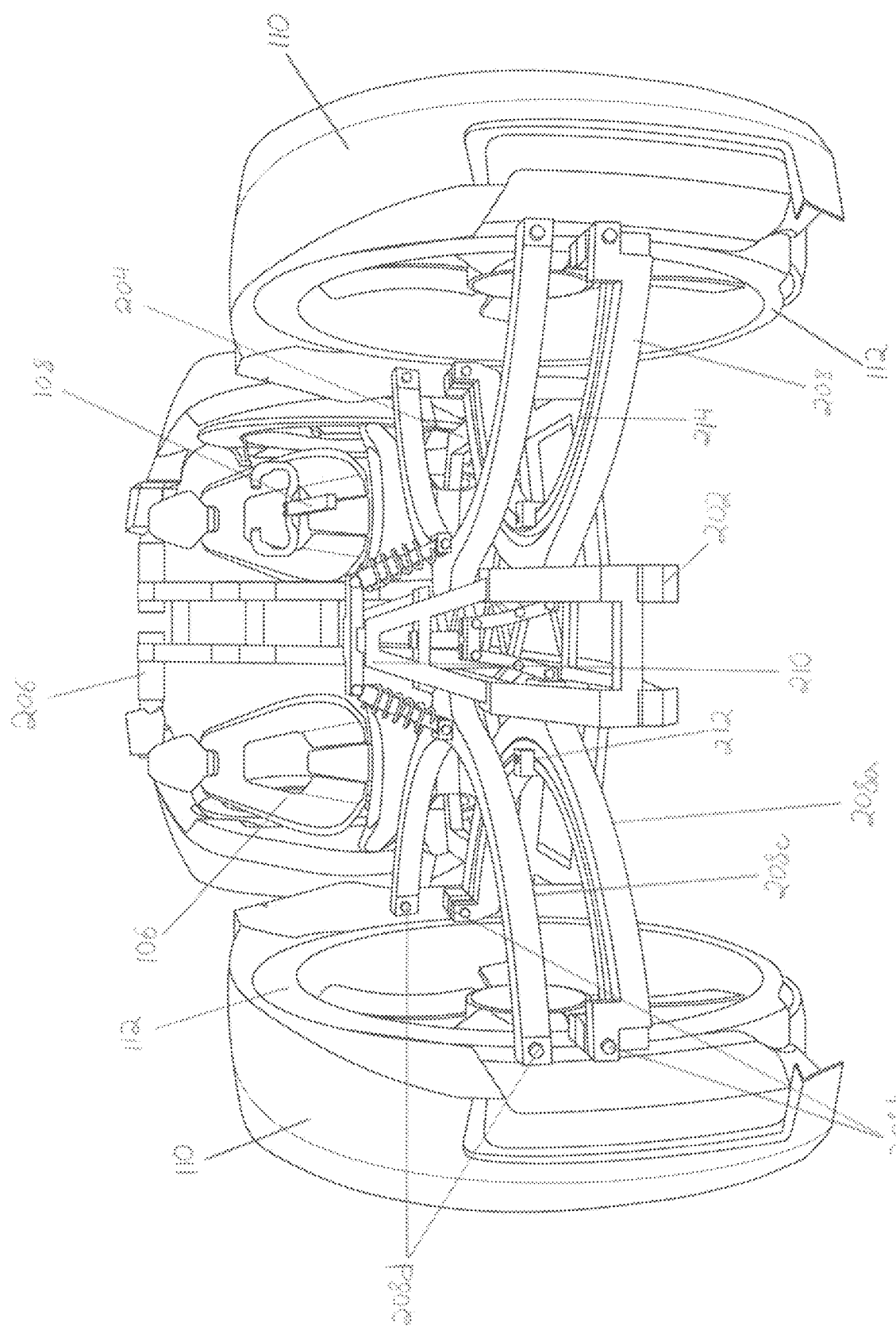
Figure 6C:
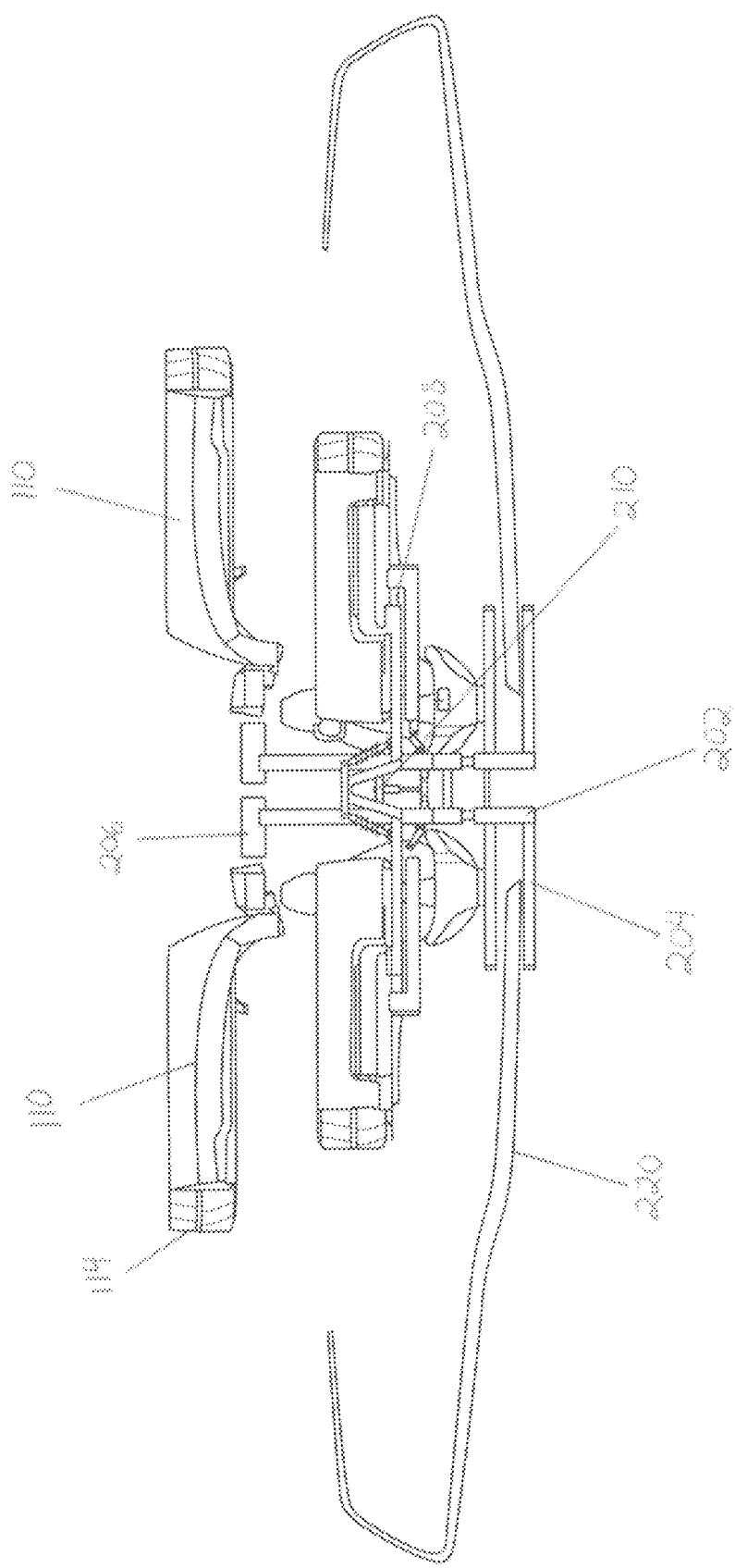

Referring to FIGS. 6A-6C, in some embodiments, the vehicle 100 can include a frame 200 providing the base structure for the different components for the vehicle 100. For example, the frame 200 can provide structural support for the entire vehicle 100 connecting through rear and front suspension to the wheel/thruster 102/116 and their respective fenders 110. The frame 200 can be built out of any combination of materials that are designed for light weight and structural integrity, for example, aluminum of composites with stainless steel reinforcements. In some embodiments, portions of the frame 200 can be reinforced, for example, at locations where there is extensive friction while in movement (e.g., any joints and hinge points).

Referring to FIG. 6A, an isometric side view of an example frame 200 for the vehicle 100 including components, shock/tilt assembly 210, rear fender mounts 206, and front fender supports 208 (e.g., tilt mechanisms) is depicted. Referring to FIG. 6B, an isometric front view of an example frame 200 for the vehicle 100 including components, shock/tilt assembly 210, rear fender mounts 206, and front fender supports 208 (e.g., tilt mechanisms) is depicted. In FIGS. 6A and 6B, the wheels 102 are vertically orientated as they would be during drive mode of the vehicle 100.

Figure 19A:
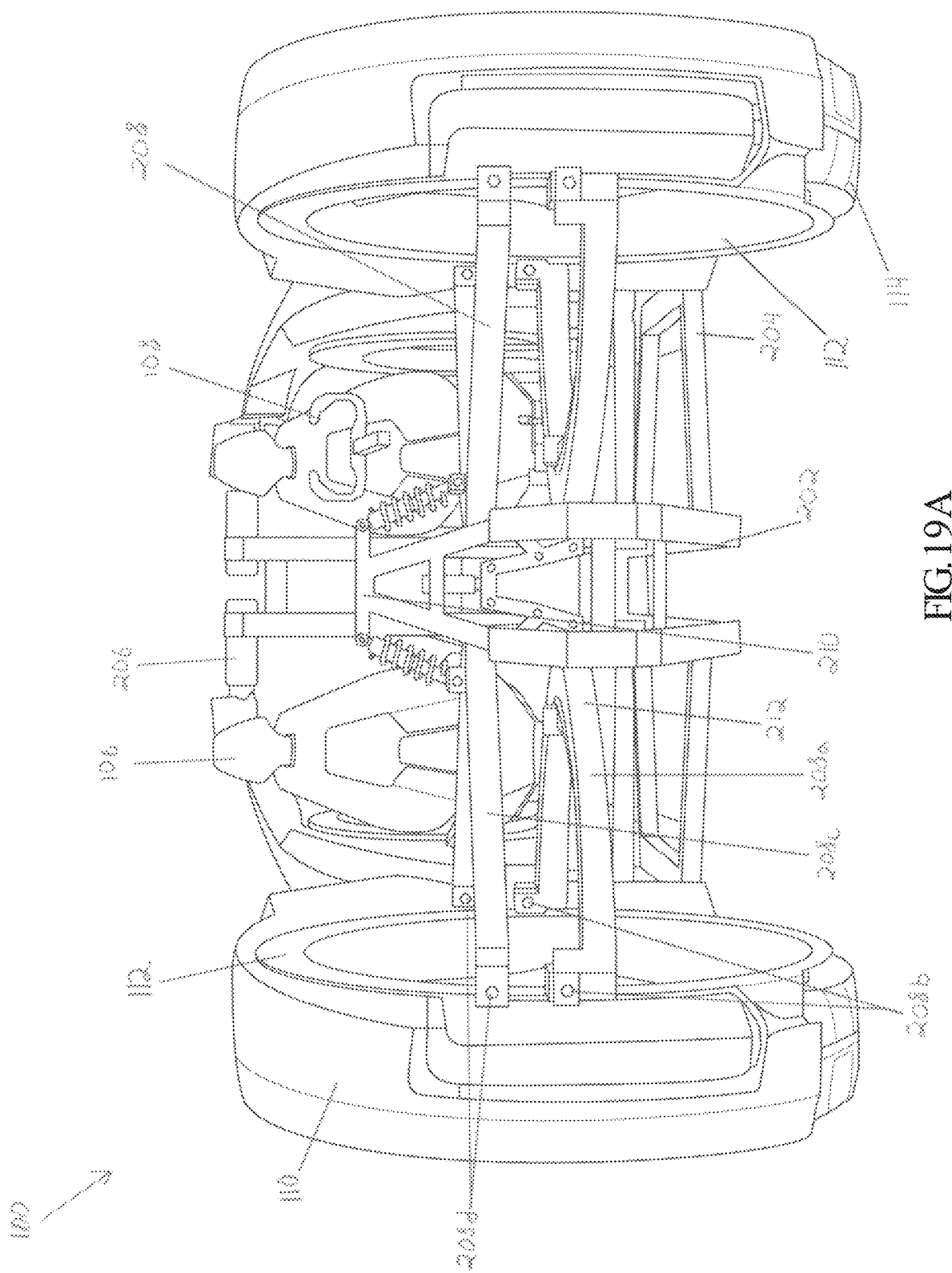
FIGS. 19A, 19B, and 19C depict isometric views of example embodiments for a lifting mechanism of the vehicle, in accordance with the present invention.
Figure 19B:
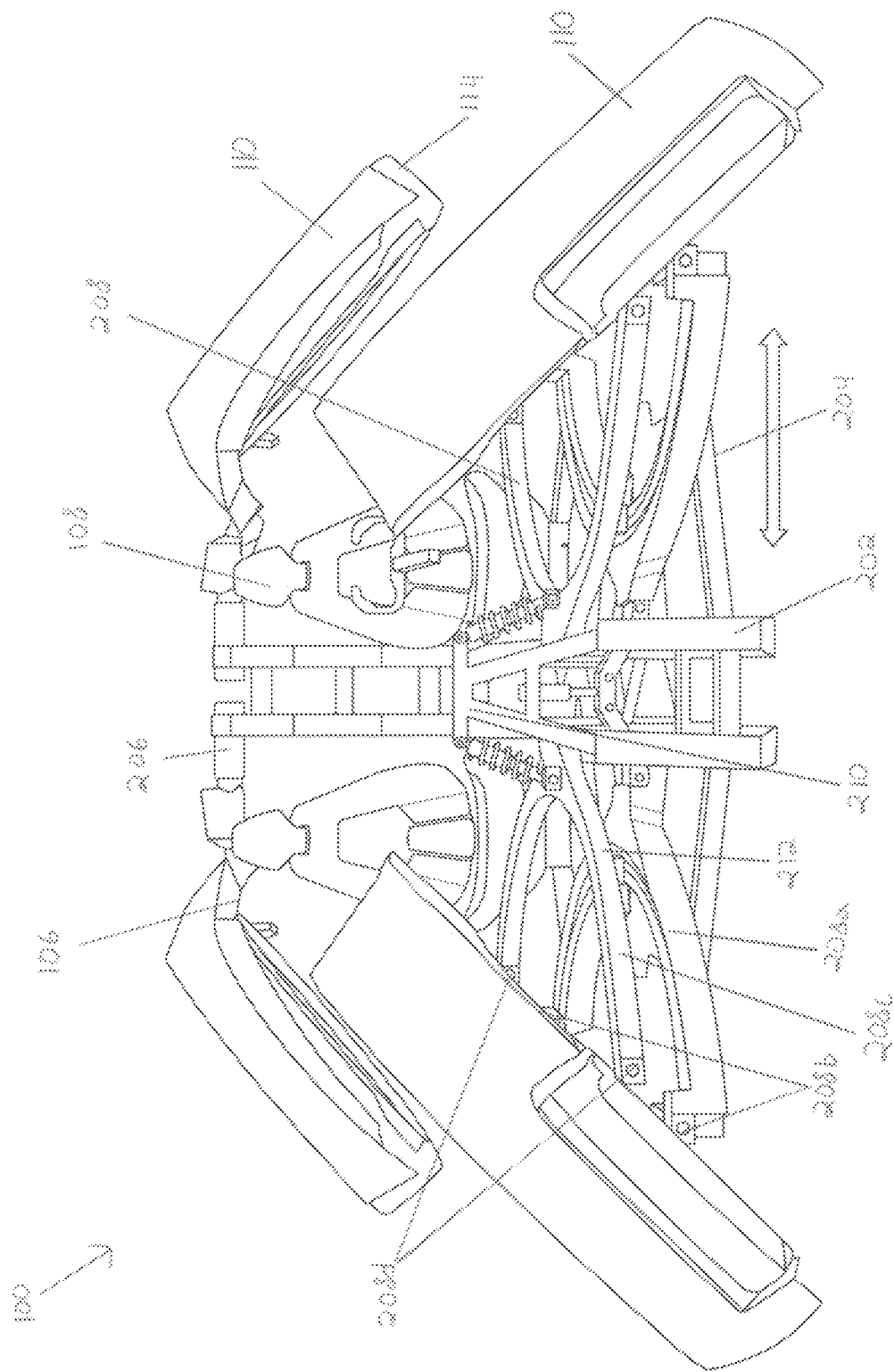
Figure 19C:
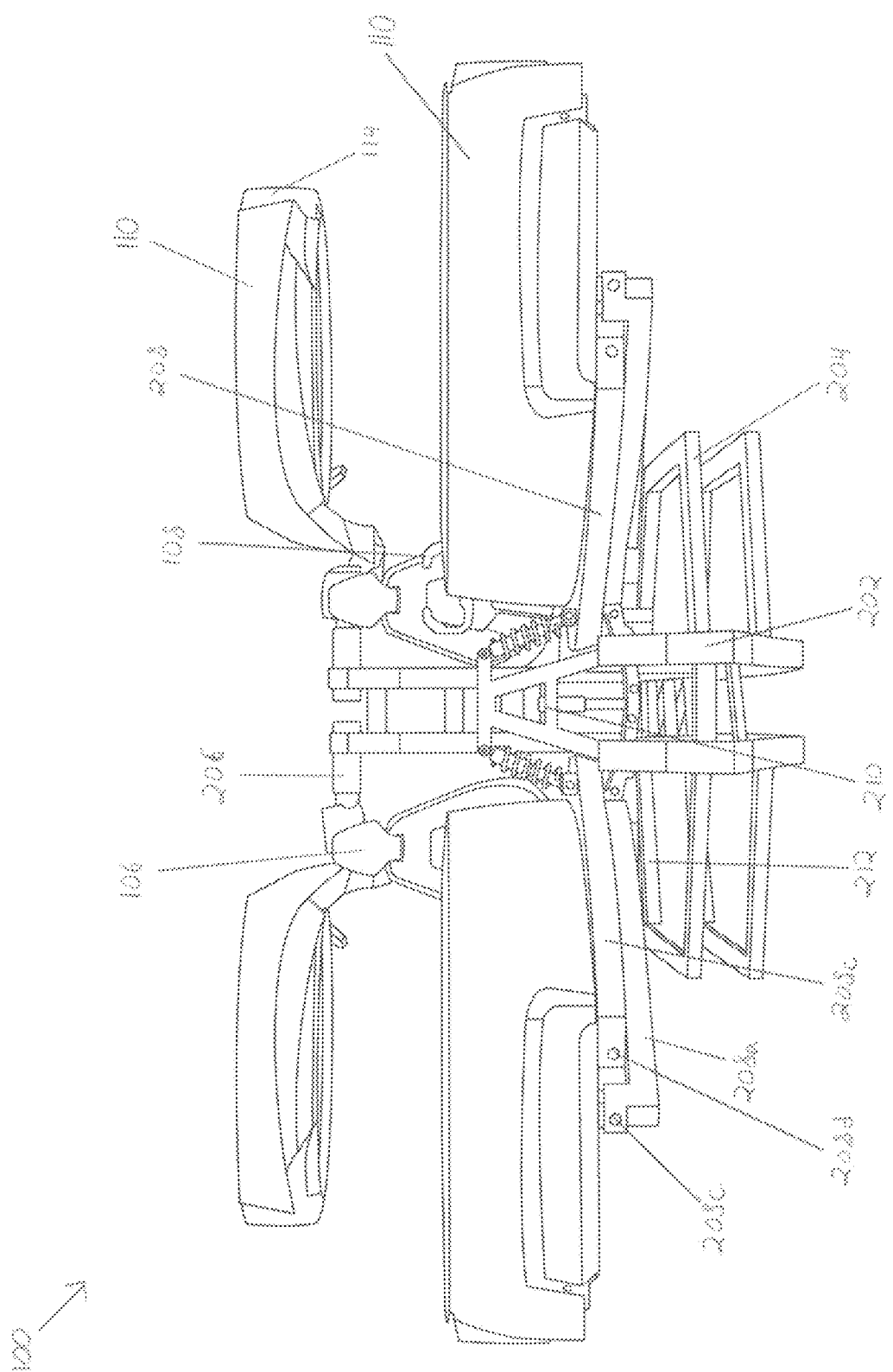

Referring to FIG. 6B, in some embodiments, the front fender supports 208 can include a lower wishbone arm 208a and an upper wishbone arm 208c. The upper wishbone arm 208c and lower wishbone arm 208a can be each be a substantially arc shaped structure that are positioning substantially parallel to one another. In some embodiments, the ends of the upper wishbone arm 208c and lower wishbone arm 208a can be coupled to the fender 110 via a lower pivot point 208b and an upper wishbone arm 208c coupled to the fender 110 via an upper pivot point 208d. For example, the wishbone arms 208a, 208c can be attached to the wheel fender 110 via pivot points 208b, 208d, respectively, on both ends of their respective arcs. The pivot points 208b allow the lower wishbone 208a to shift to allow the attached fender 110 to rotate about the pivot points 208b, as depicted in FIGS. 19A-19C. In some embodiments, the upper wishbone 208c does not rotate during transformation, it only moves up and down in drive mode to act as a part of the suspension.

In some embodiments, the midpoint of the arcs for the upper wishbone arm 208c and lower wishbone arm 208a can be fixedly or removably attached to the central support beam 202 of the frame 200. In some embodiments, the upper wishbone arm 208c and lower wishbone arm 208a can be attached to a shock/tilt assembly 210 that is attached to the central frame 200 structure. Being attached to the shock/tilt assembly 210 can enable the upper wishbone arm 208c and lower wishbone arm 208a to assist in routing the fenders 110 from a substantially vertical orientation (e.g., tires 114 on the ground) to a substantially horizontal orientation (e.g., tires 114 parallel to the ground), as discussed in greater detail with respect to FIGS. 19A-20B. The lower wishbone arm 208a and the upper wishbone arm 208c can be coupled to the fender 110, shock/tilt assembly 210, and/or fame 200 using any combination of mechanisms known in the art that will allow them to maintain structural integrity with the frame and enabling the fender to pivot via the lower pivot point 208b the upper pivot point 208d. For example, the lower wishbone arm 208a and the upper wishbone arm 208c can be mounted between the frame 200 and wheel fender 110 and hinged using loop, bolt and bearing on both ends.

The lower and upper wishbone arms 208a, 208c are responsible for providing structural support between the frame 200 and wheel fenders 110 while assuring vertical positioning of the wheels 102 while the vehicle 100 is driving on any surface when in drive mode. In some embodiments, the lower and upper arm pivot points 208b, 208d enable slight vertical movement of the wheel 102 during drive mode and can also enable the fender 110 to transition from a substantially vertical position to a substantially horizontal position when transforming from drive mode to flight mode, as discussed in greater detail herein. The lower and upper wishbone arms 208a, 208c and the lower and upper arm pivot points 208b, 208d can be manufactured from any combination of materials. For example, the lower and upper wishbone arms 208a, 208c and the lower and upper arm pivot points 208b, 208d can be made from stainless steel reinforced carbon fiber composites.

Continuing with FIG. 6B, in some embodiments, the front fender mounts 208 can be coupled to a shock/tilt assembly 210 at the central support beam 202. The front fender mounts 208 can be coupled to the shock/tilt assembly 210 using any combination of mechanisms. For example, the shock/tilt assembly 210 can be coupled to the upper wishbone arm 208c via pivotable junctions. In some embodiments, the shock/tilt assembly 210 can be mounted to the top of the front fender mounts 208 (e.g., at the center of the arc) to allow for the movement of shocks or other suspension mechanism when in drive mode. The shock/tilt assembly 210 can be designed to provide shock absorption, vibration suppression, and smooth operation when driving over obstacles while the vehicle 100 is traversing a surface in drive mode. The shock/tilt assembly 210 can include any combination of shocks, springs, compressors, etc.

In some embodiments, the front fender mounts 208 can include a combination of rings within the inner curve of the arced shape. For example, the lower wishbone arm 208a can be designed to receive one or more rings 214 within its inner arc shape. The one or more rings 214 can enable the fender 110 to rotated within the front fender mount 208 to direct the vehicle 100 in one direction or another, as discussed in greater detail herein. The one or more rings 214 can be manufactured from any combination of materials. For example, the one or more rings 214 can be made from stainless steel reinforced carbon fiber composites.

Referring to FIG. 6C, an isometric front view of an example frame 200 for the vehicle 100 including components, shock/tilt assembly 210, rear fender mounts 206, front fender supports 208 (e.g., tilt mechanisms), and deployed wings 220 is depicted. In FIG. 6C, the wheels 102 are horizontally orientated as they would be during flight mode of the vehicle 100. In some embodiments, the wings 220 can be pivotably coupled within the side support mounts 204 of the frame 200 (as shown in FIG. 6C) and will rest within the frame structure of the side support mounts 204 when retracted, as shown in FIG. 6A.

Figure 7A:
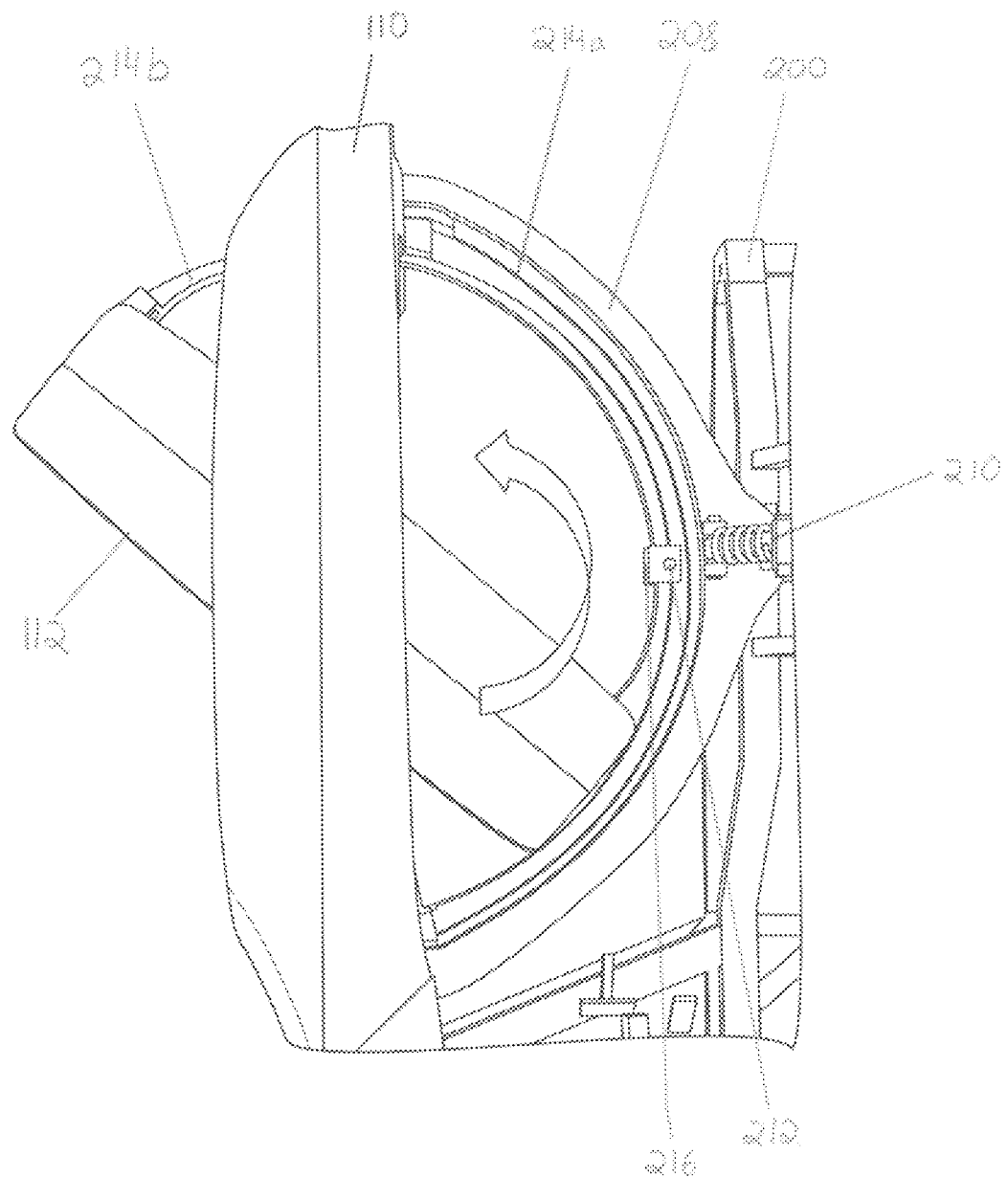
FIGS. 7A, 7B, 7C, and 7D depict isometric views of example embodiments for a turning mechanism of the vehicle, in accordance with the present invention.
Figure 7B:
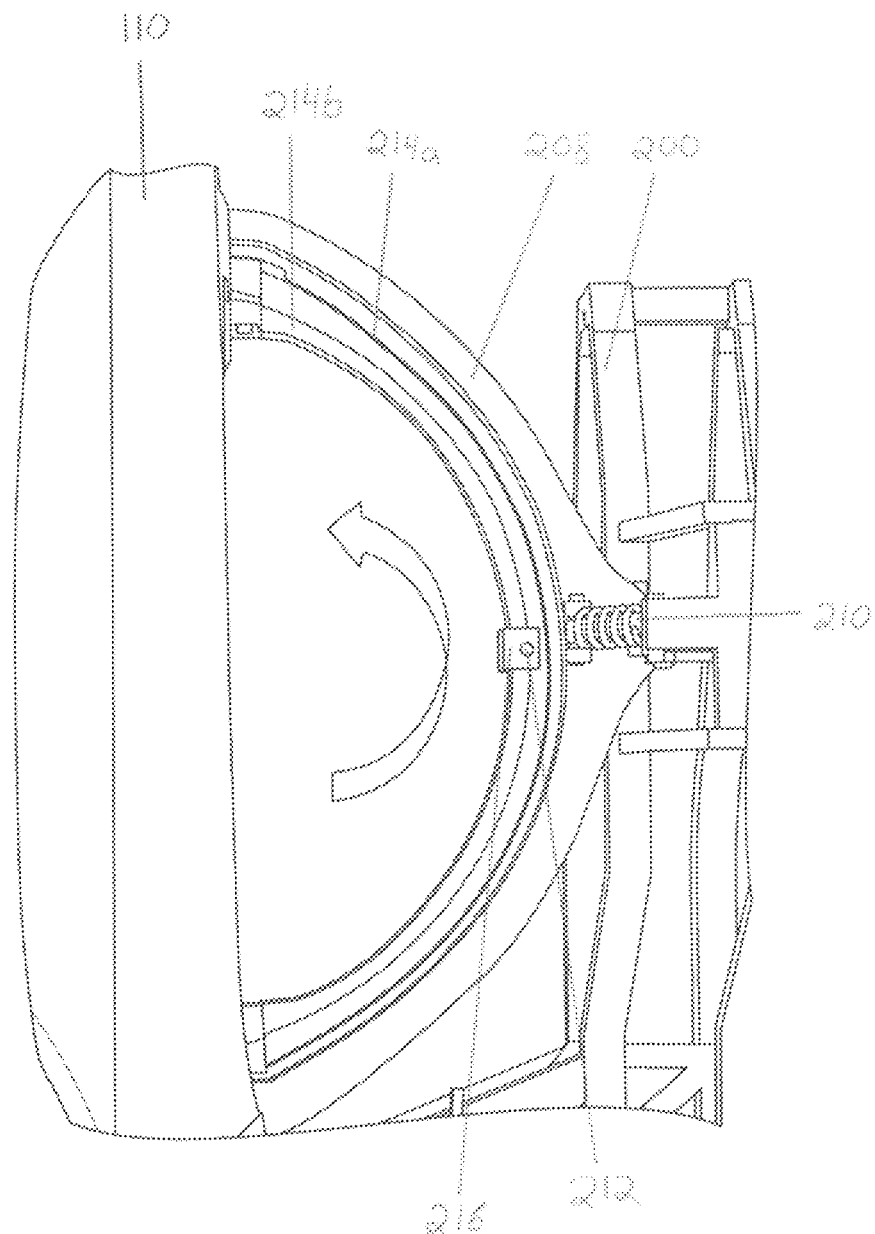
Figure 7C:
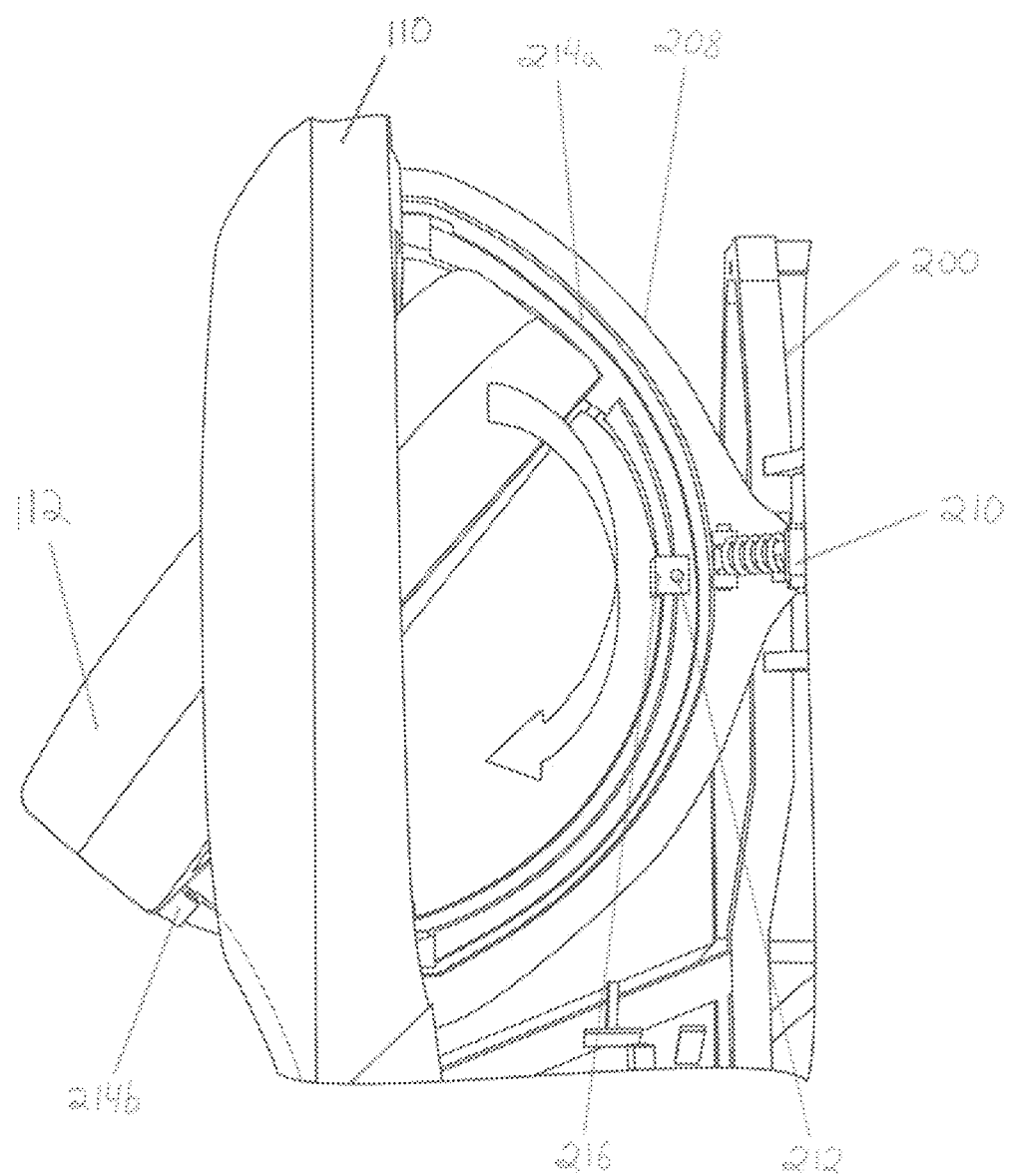

Referring to FIGS. 7A-7C, above perspective views of a wheel 102 fender 110 within a front fender mount 208 (e.g., a front left wheel) are depicted. FIG. 7A depicts a duct 112 that is turned in the left direction, FIG. 7B depicts a duct 112 in a straight direction, and FIG. 7C depicts a duct 112 that is turned in the right direction. When in drive mode, the direction of the fenders 110 will determine the direction that the vehicle 100 will travel and/or turn. In some embodiments, a motor casing 216 can include a combination of a steering motor 212 and a drive mechanism (e.g., gear, cog, etc.) to provide the mechanical force to turn the duct 112 within the front fender mounts 208 (e.g., the lower wishbone arm 208a). For example, the lower wishbone arm 208a can allows for integration of a steering motor 212 driving a cog and/or gear that can transfer power to the one or more rings 114 and move one or more of the rings 114 in rotational motion in relation to the front fender mounts 208. In this configuration, there can be one steering motor 212 for each front fender 110.

Figure 8A:
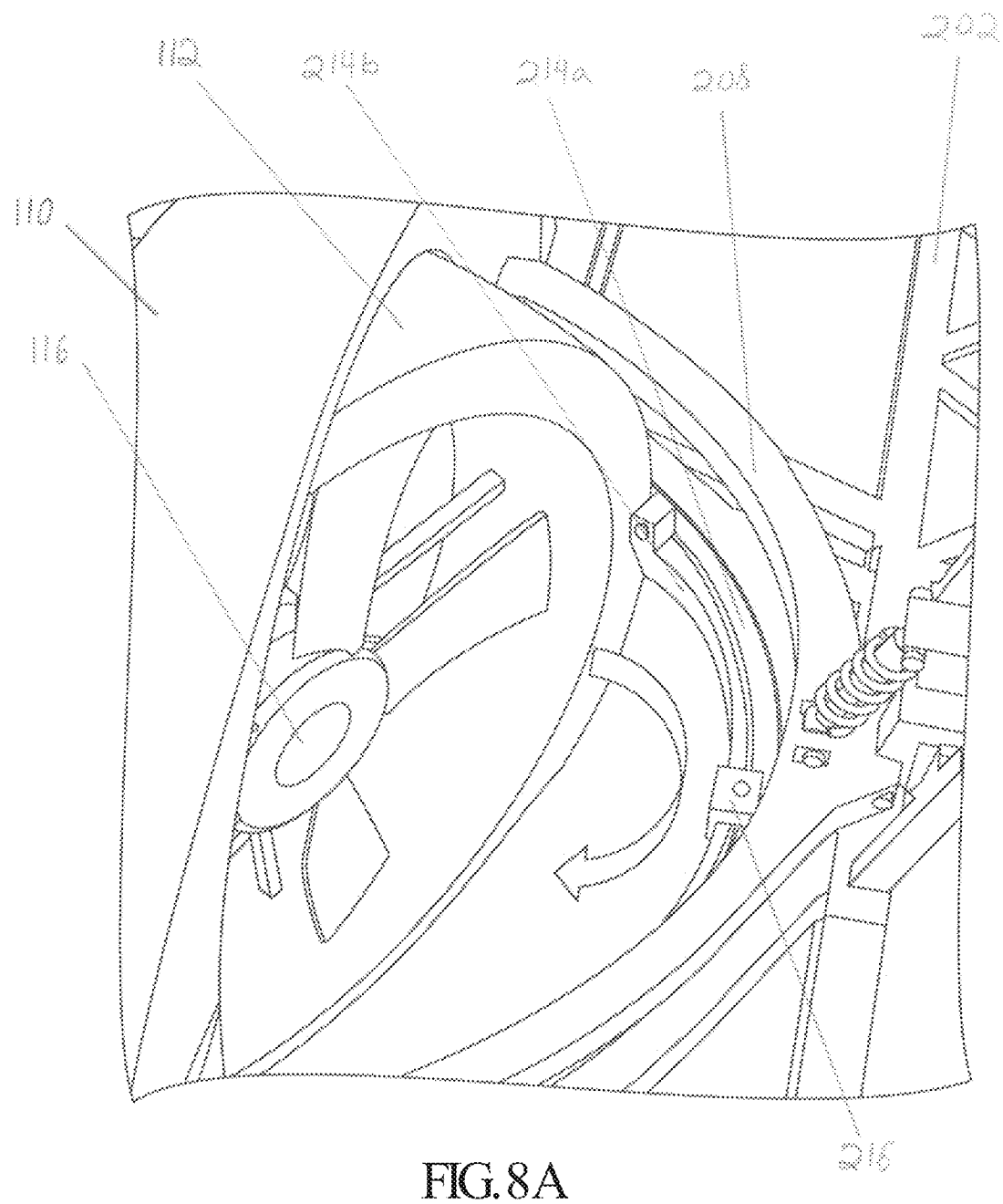
FIGS. 8A and 8B depict isometric views of example embodiments for a turning mechanism of the vehicle, in accordance with the present invention.
Figure 8B:
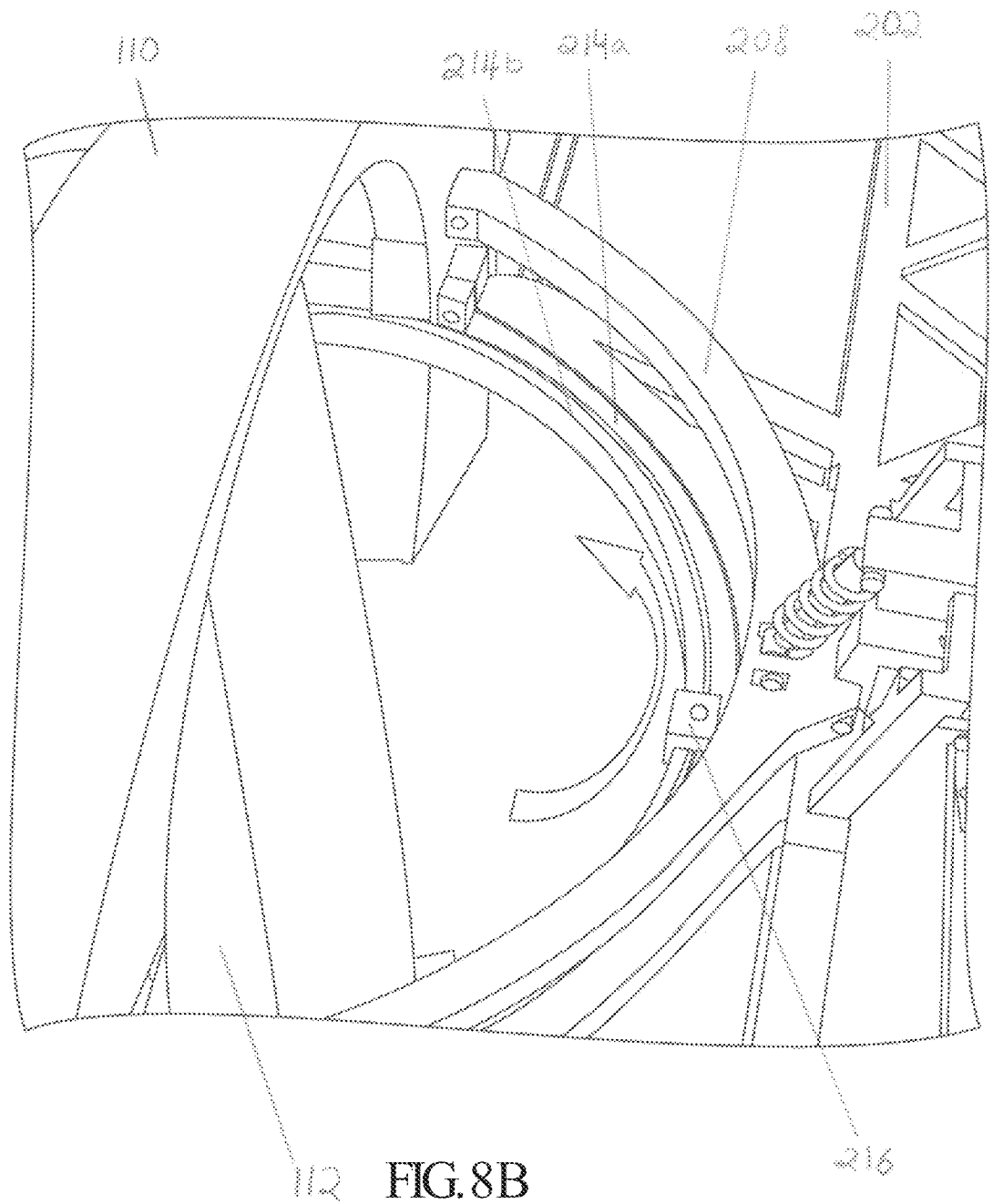

Referring to FIGS. 8A and 8B, in some embodiments, the front fender mounts 208 includes an outer ring 214a within the inner arc of the front fender mounts 208 and an inner ring 214b within the inner arc of the outer ring 214a. The outer ring 214a can be mounted via pivotably joint to the fender 110. The inner ring 214b can be mounted via pivotably joint to the duct 110 and via its outer circumference to the outer ring 214a using a bearing mechanism allowing for the inner ring 214b to rotate within the outer ring 214a to provide steering left to right during drive mode. In some embodiments, the motor casing 216 can be mounted to the outer ring 214a. In operation, the motor casing 216 can be designed to receive an electronic signal from the steering wheel 108 when the operator steers the steering wheel 108 to turn the vehicle, and as a result to activate the turning movement of the inner ring 214b. When turning, the motor casing 216, the outer ring 214a, and the front fender mount 208 can remain stationary while the inner ring 214b rotates within the outer ring 214a, causing the duct 112 attached thereto to rotate. In some embodiments, inner ring 214b can be mounted directly to the duct 112 to allow for the wheels 102 and duct 112 to turn left or right. The rings 214a. 214b can provide structural support between the duct 112 and the fender 110) while functioning together to provide turnability of the wheels 102.

Figure 7D:
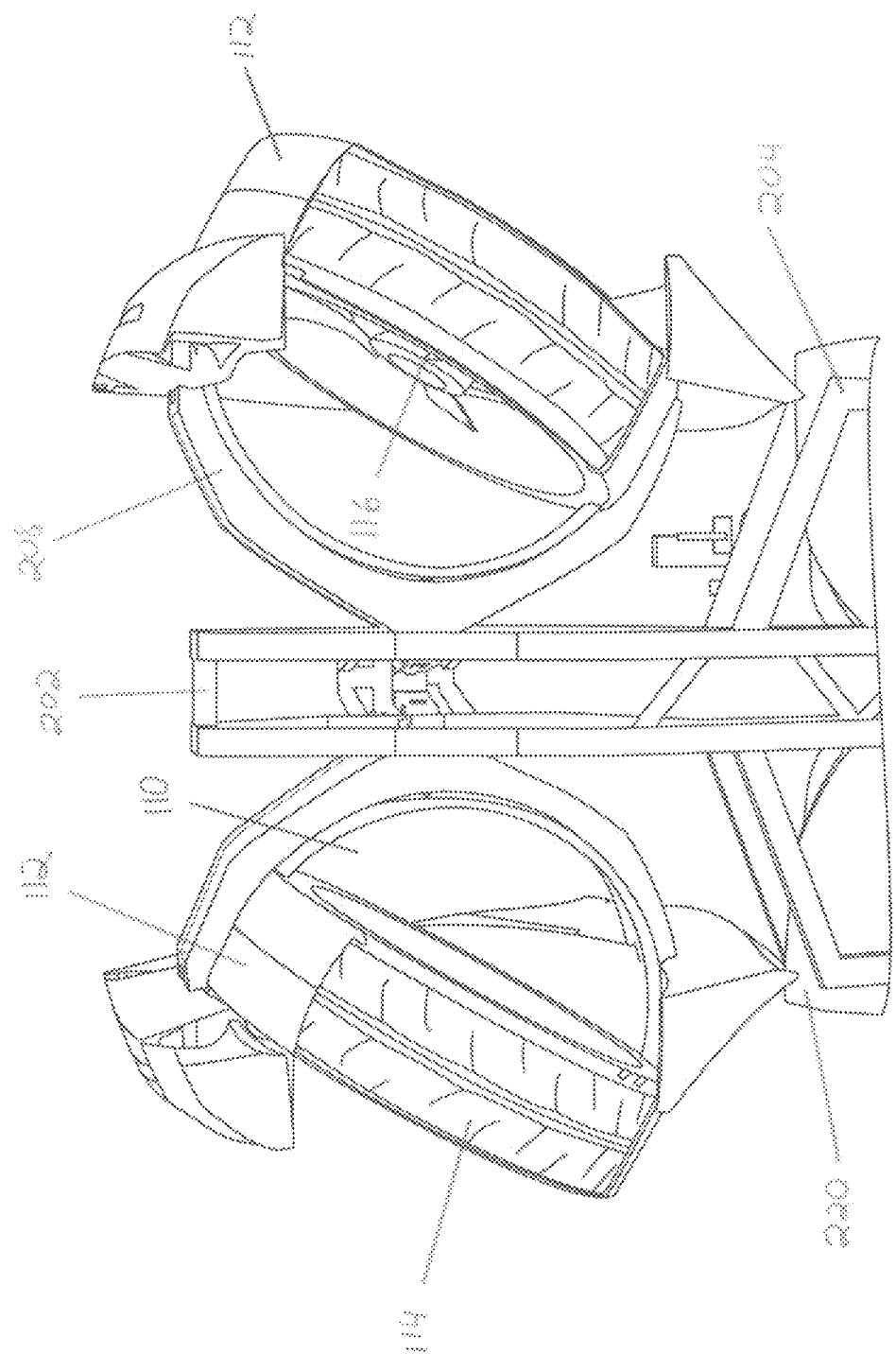

In some embodiments, the steering motor 212 is a small electric motor (e.g., 2-3 inches in diameter) built into the motor casing 216. The steering motor 212 can be coupled to the outer ring 214a, which remains stationary, to rotate the inner ring 214b with respect to the outer ring 214a. The steering motor 212 can be enclosed within the motor casing 216, which can provide protection to prevent foreign bodies like dirt and moisture from entering the turning mechanism. In some embodiments, the fender 110 can include a mounting pivot point (not depicted) bracket built directed above the duct 112 to allow the duct 112 to have an additional point of rotation when turning left and right in drive mode. Referring to FIG. 7D below, perspective views of a wheel 102 fender 110 within a front fender mount 208 are depicted. FIG. 7D depicts a fender 110 that is turned in the left direction.

Figure 9A:
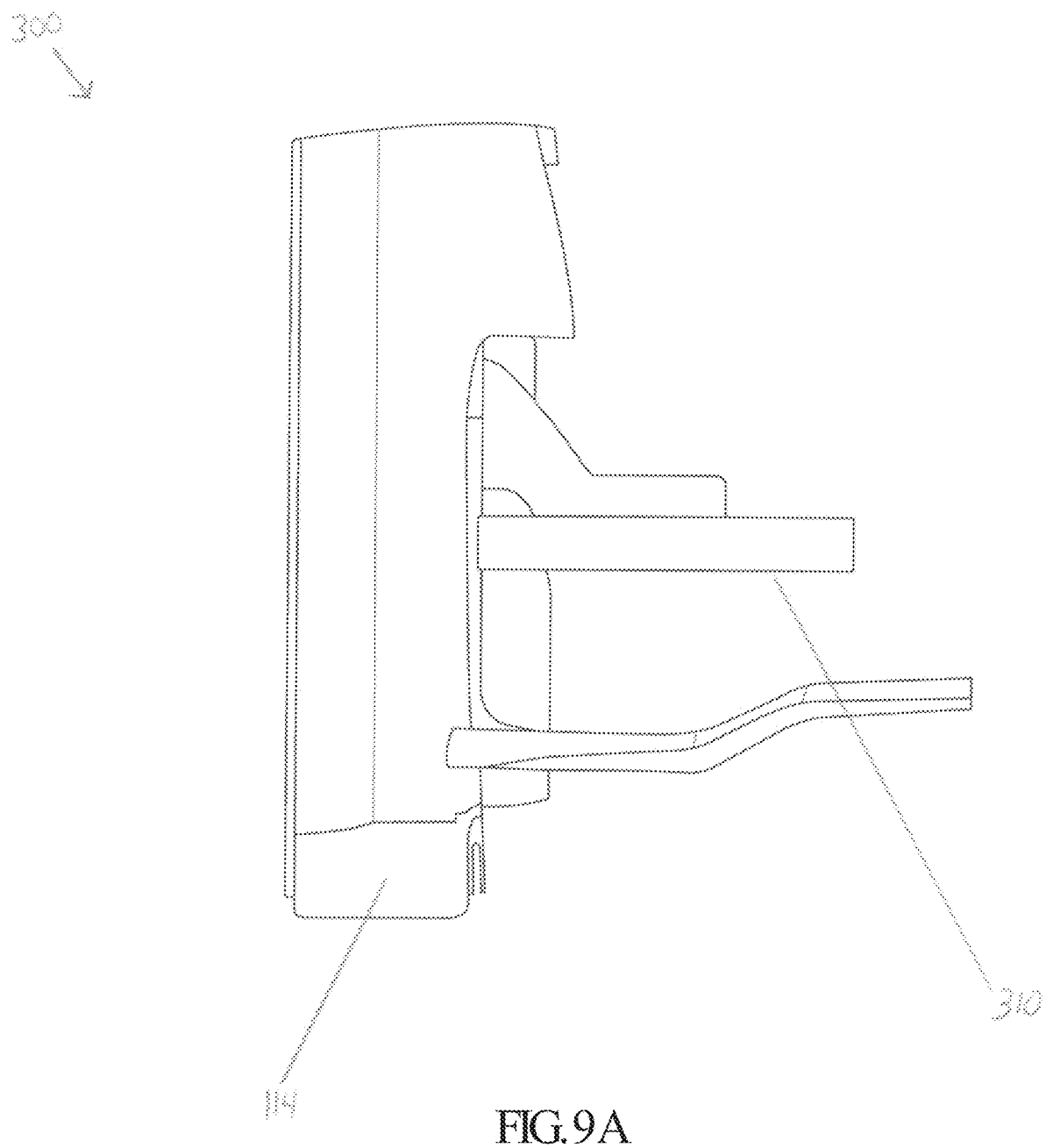
FIGS. 9A and 9B depict isometric views of example embodiments of a wheel assembly for the vehicle in a vertical position for drive mode, in accordance with the present invention.
Figure 9B:
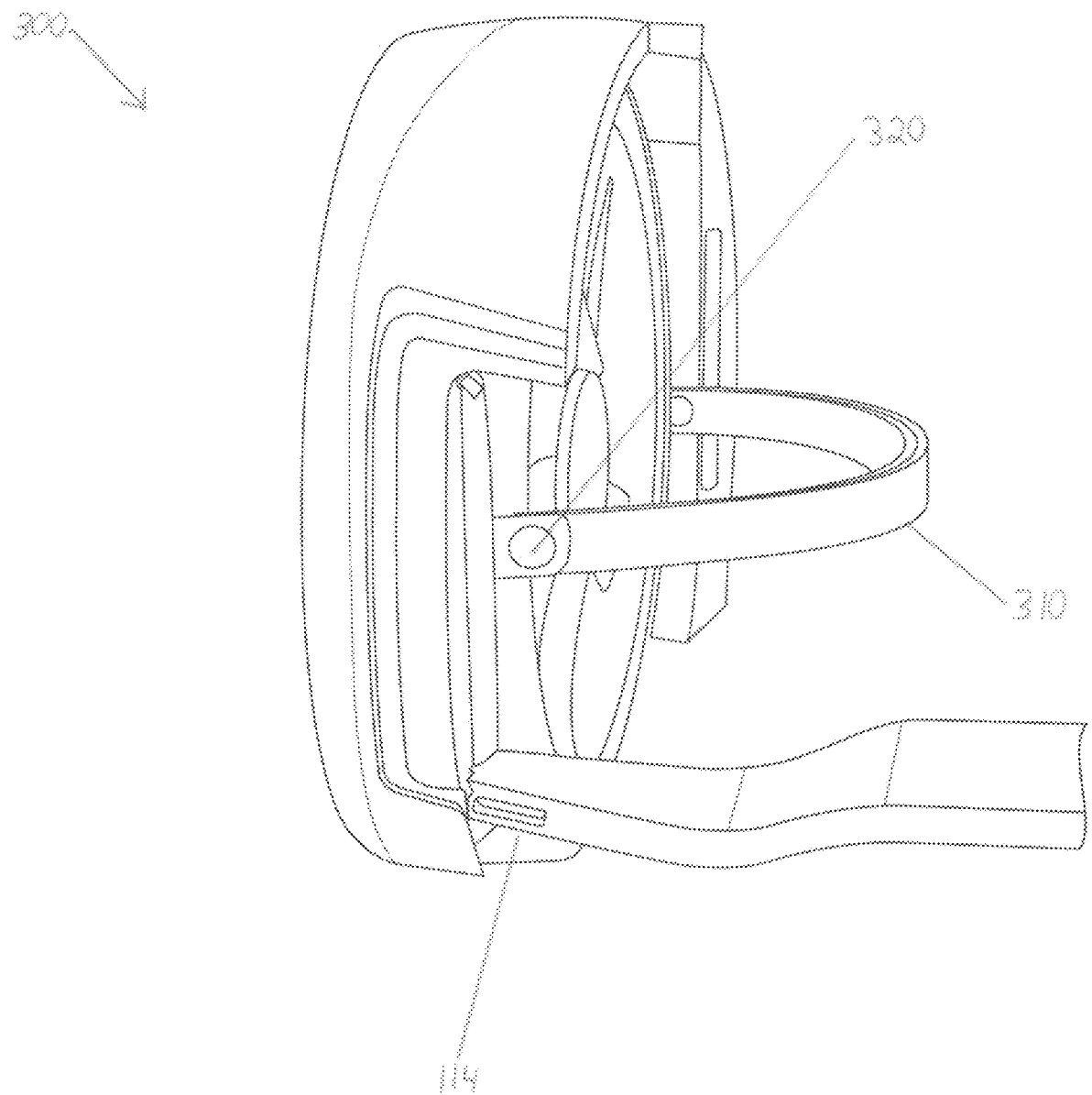

Referring to FIGS. 9A and 9B, in some embodiments, a wheel assembly 300 designed to allow turning of the wheel 102 and fender 110 while in a vertical position is depicted. The wheel assembly 300 can be coupled to the frame 200 via the fender mounts 206, 208 or directed to the frame 200 (e.g., via an arm). FIGS. 9A and 9B show exemplary embodiments of a front wheel assembly 300 in a vertical position for the vehicle 100 during drive mode. In some embodiments, each wheel assembly 300 can include a fender 110, a rim 112, a tire 114, one or more propellers 116, and a support mechanism 310. The support mechanism 310 can be configured for turning the wheel 102 left and right during drive mode. In some embodiments, the support mechanism 310 can be composed of two half rings, including an outer ring and an inner ring with built in bearings between each of the rings for smooth movement.

Figure 10A:
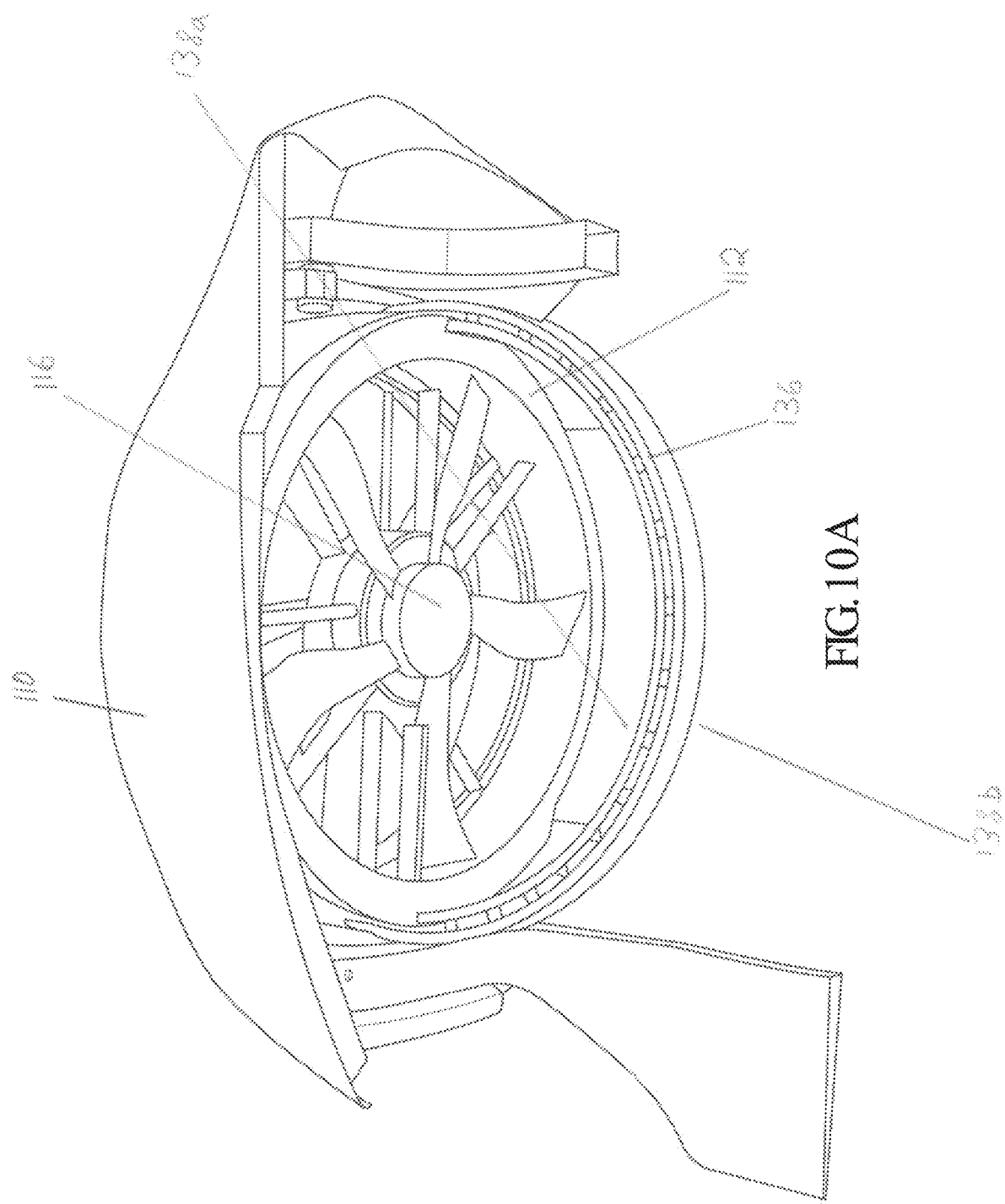
FIGS. 10A, 10B, and 10C depict isometric views of example embodiments for a turning mechanism of the vehicle, in accordance with the present invention.
Figure 10B:
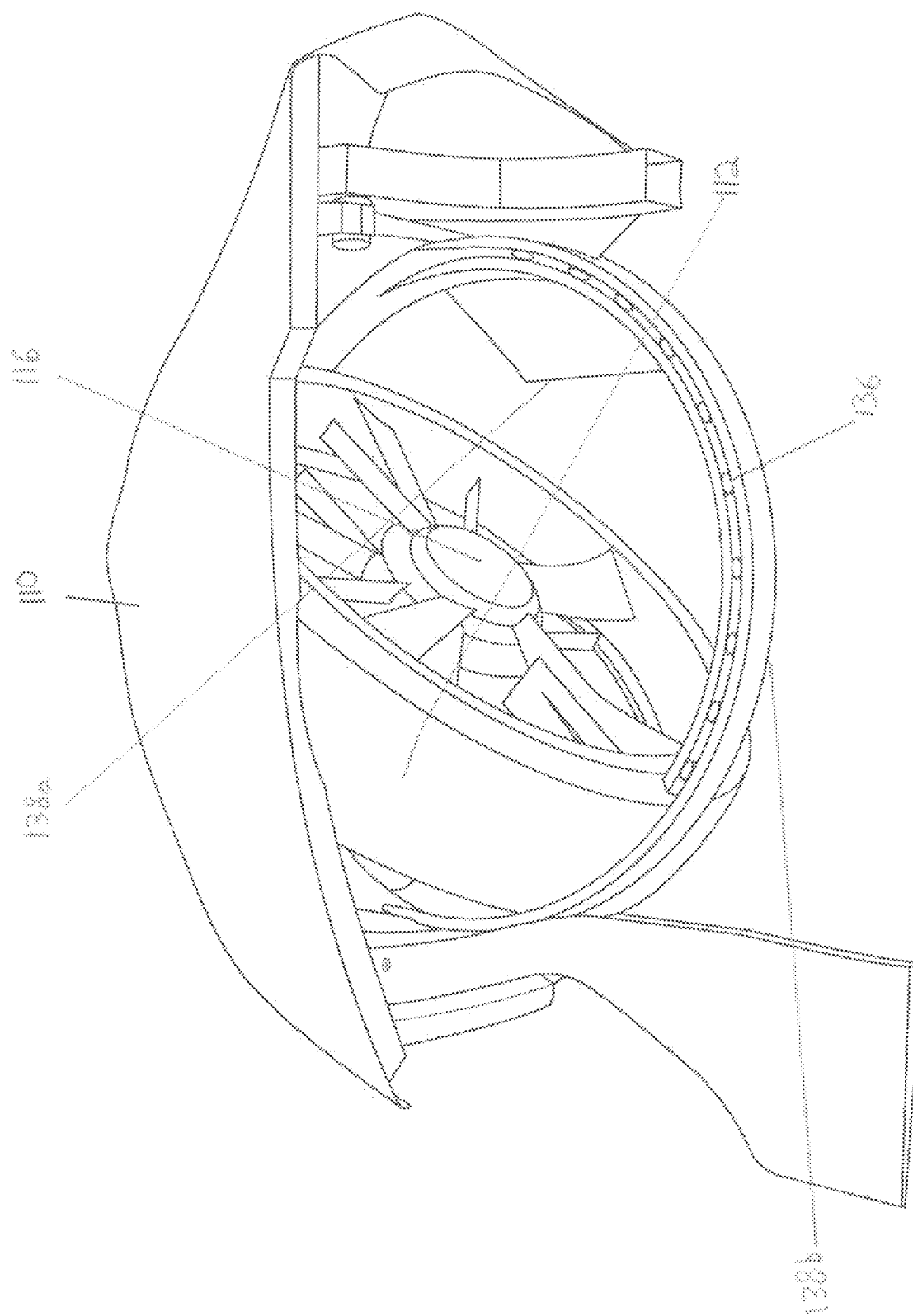

FIG. 10A depicts an isometric view of some embodiments of a front wheel for the vehicle in straight position during drive mode. FIG. 10B depicts an isometric view of example embodiments of a front wheel for the vehicle in turned position during drive mode. In some embodiments, both arms in front of the wheel 102 as well as the rear of the wheel 102 can be hard mounted into the fuselage. Rotation of the wheel fenders 110 from vertical to horizontal and vice versa can be activated via driving motors 118.

Figure 10C:
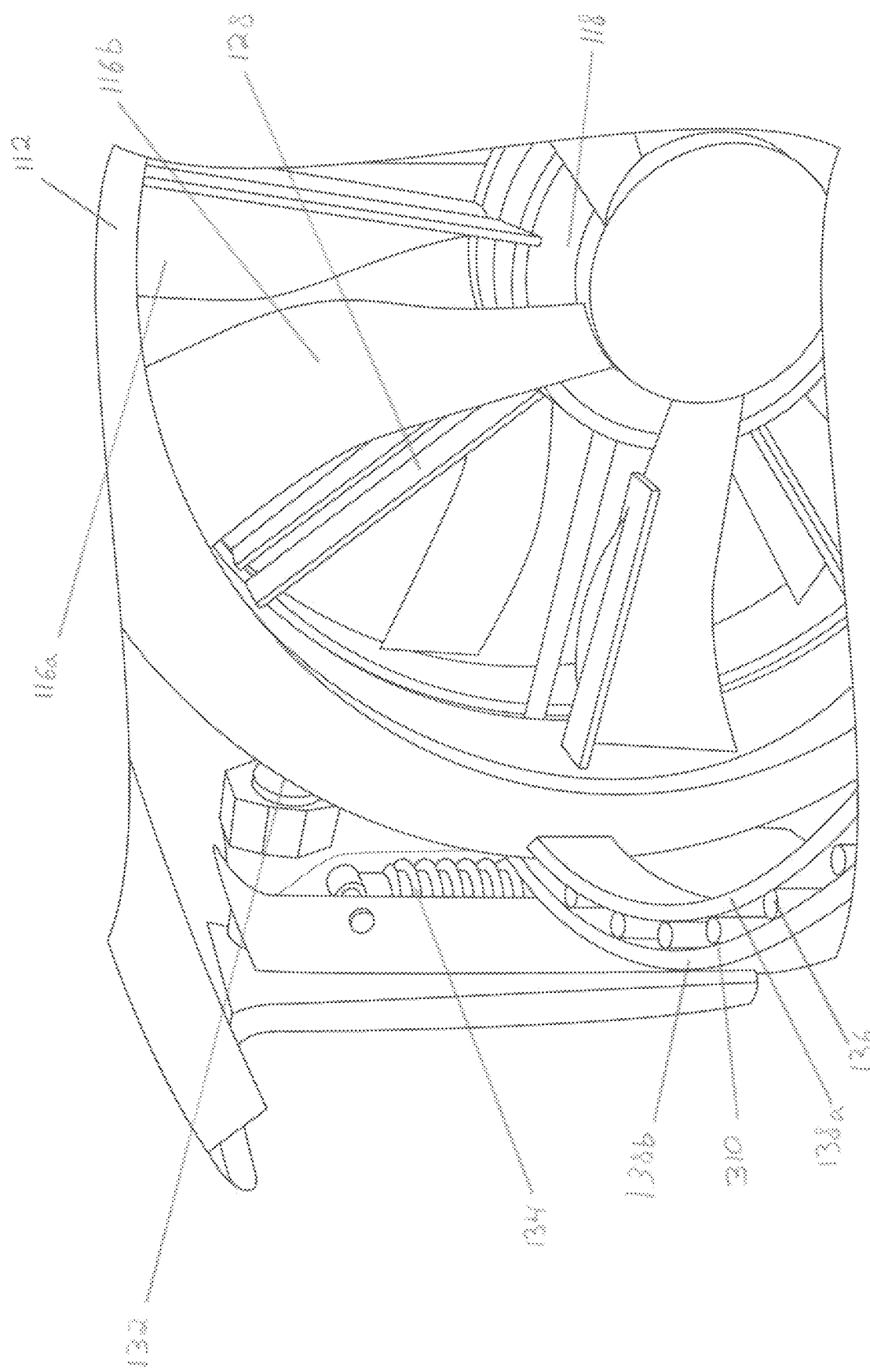

Referring to FIG. 10C, some embodiments of a wheel assembly 300 in a vertical position for the vehicle 100 during drive mode is depicted. The wheel assembly 300 can be used as part of the front and/or rear suspension for the rear wheels 102/fenders 110. FIG. 10C depicts the wheel assembly 300 including tires 114, the support mechanism 310 for enabling the turning of the wheel left and right during drive mode, a pivot point 132 as part of the hinge mechanism allowing for transformation from drive mode to flight mode, a first blade of propeller 116a, a second counteracting propeller 116b, driving motor 118, motor mounts 128, shock spring(s) 134 (or other suspension), and bearings 136 configured to enable smooth turning of the front wheel left and right. In some embodiments, the power for the wheel assembly 300 can be delivered to the driving motors 118 via wiring running through internal frame 200 the vehicle 100 body and as well as wheel 102. In some embodiments, the bearings 136 enable smooth turning of the wheel 102 from left to right and can be encased by an inner frame 138a and an outer frame 138b as part of the turning mechanism. The rotation of the support mechanism 310 via the pivot point 132 can be powered by its own electric driving motor 118 build into the joint bracket.

In some embodiments, as part of a rear suspension, the joint bracket can be mounted into the swing arm attached in a rotating spring-loaded axle into the vehicle 100. It can operate in drive mode under gravity based pressure to provide dampening and smoothing of uneven surface. For the flight mode, the bracket (swing arm) can be disconnected from the spring and can be activated via small electric motor. The electric motor can be activated when the vehicle 100 transforms from drive mode to flight mode. This same motor is later used in the quadcopter mode to stabilize the flight using angle adjustment of the fenders 110 (e.g., thrusters). The electric motor can also be activated when the vehicle 100 transforms from drive mode to flight mode. For example, both arms in front of the wheel 102 as well as the rear of the wheel 102 can hard mounted into the fuselage and rotation of the wheel fender from vertical to horizontal and in reverse can be activated via a small electric motor (not depicted).

Referring to FIGS. 11A and 11B, in some embodiments, the rear suspension can be configured with spring loaded swing arm (similar to a motorcycle) that allows for movement of entire wheel 102 along with the fender 110 to move vertically when absorbing objects or dips in a driving surface. The same arm can also be used to adjust an angle of the wheels 102 from a vertical driving position to a horizontal position when in flight mode. FIGS. 11A and 11B depict example orientation of the individual suspension of a rear wheel 102 adjusting to an object 130 on a driving surface. In particular, FIG. 11A shows the suspension on a flat driving surface and FIG. 11B shows the suspension absorbing impact from driving over an object 130 on the driving surface. The vehicle 100 can be designed such that, when in drive mode, any combination of the wheel 102, the duct 112, and the fender 110 can move up and down vertically when traversing over objects 130/dips in the driving surface.

Referring to FIGS. 12A and 12B, in some embodiments, each of the wheels (including the fenders 110, duct 112, tires 114, wheels 102, and one or more propellers 116) has its own independent suspension. The wheels 102 can have a built-in spring, shock, and/or coil that is combined with the fender 110 such that when the vehicle 100 drives over an object 130 or a dip in a driving surface, the entire wheel 102 construction, including the fender 110, will absorb the impact. The front suspension can be designed to work in a similar manner as a regular car with shock and spring but instead of a wishbone bracket, runners 122 can be included within the fender 110 that are utilized to provide a simple up and down motion. In some embodiments, the entire suspension/runner 122 mechanism is compacted into the wheel 102 structure and it is designed to move from vertical to horizontal position along with the wheel 102, as depicted in FIGS. 17A-17C. FIGS. 12A and 12B depict example orientation of the individual suspension of a front wheel 102 adjusting to an object 130 on a driving surface. In particular, FIG. 12A shows the front suspension on a flat driving surface and FIG. 12B shows the suspension absorbing impact from driving over an object 130 on the driving surface.

Figure 13A:
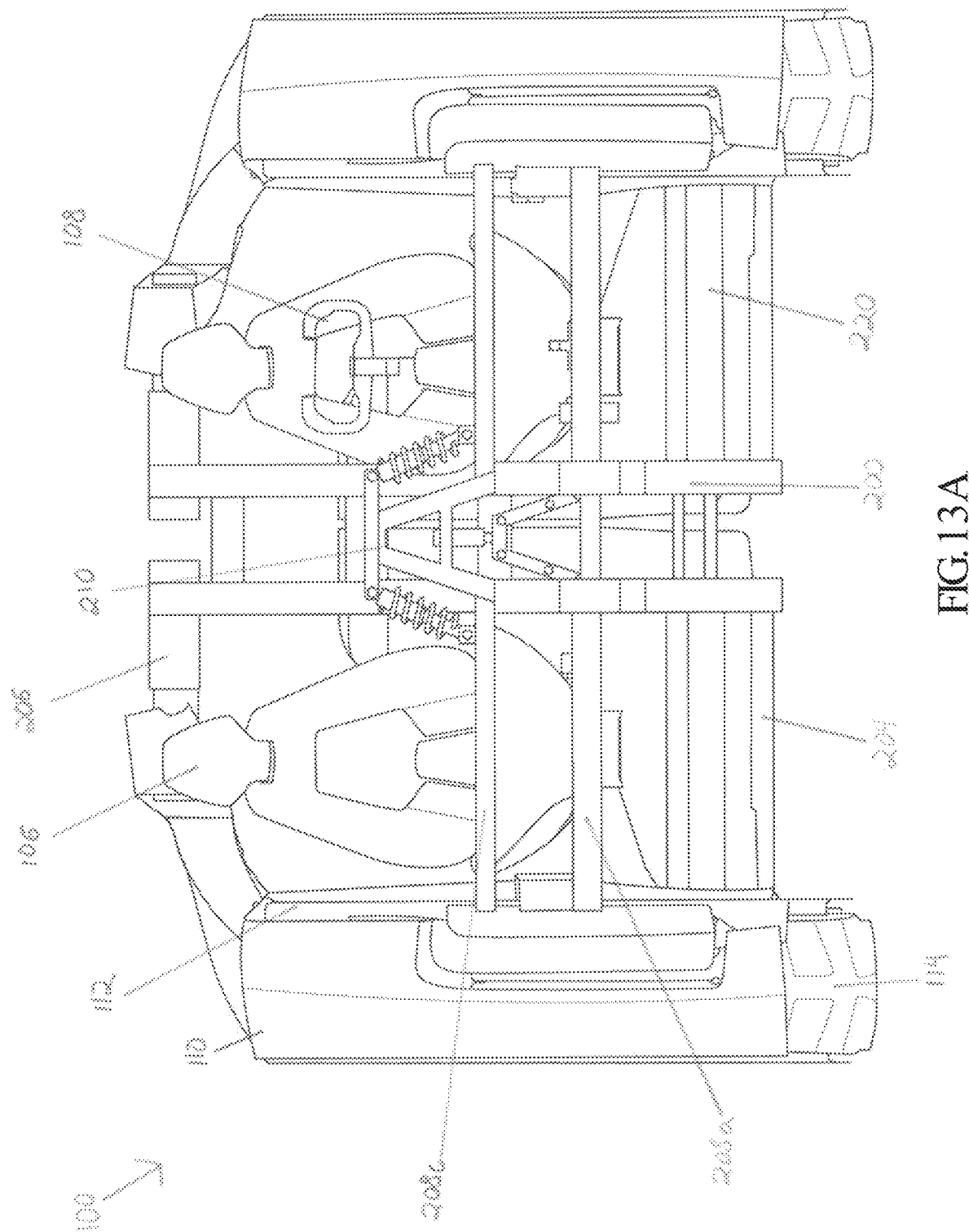
FIGS. 13A, 13B, 13C, 13D, and 13E depict isometric views of example embodiments for suspension of the vehicle, in accordance with the present invention.
Figure 13B:
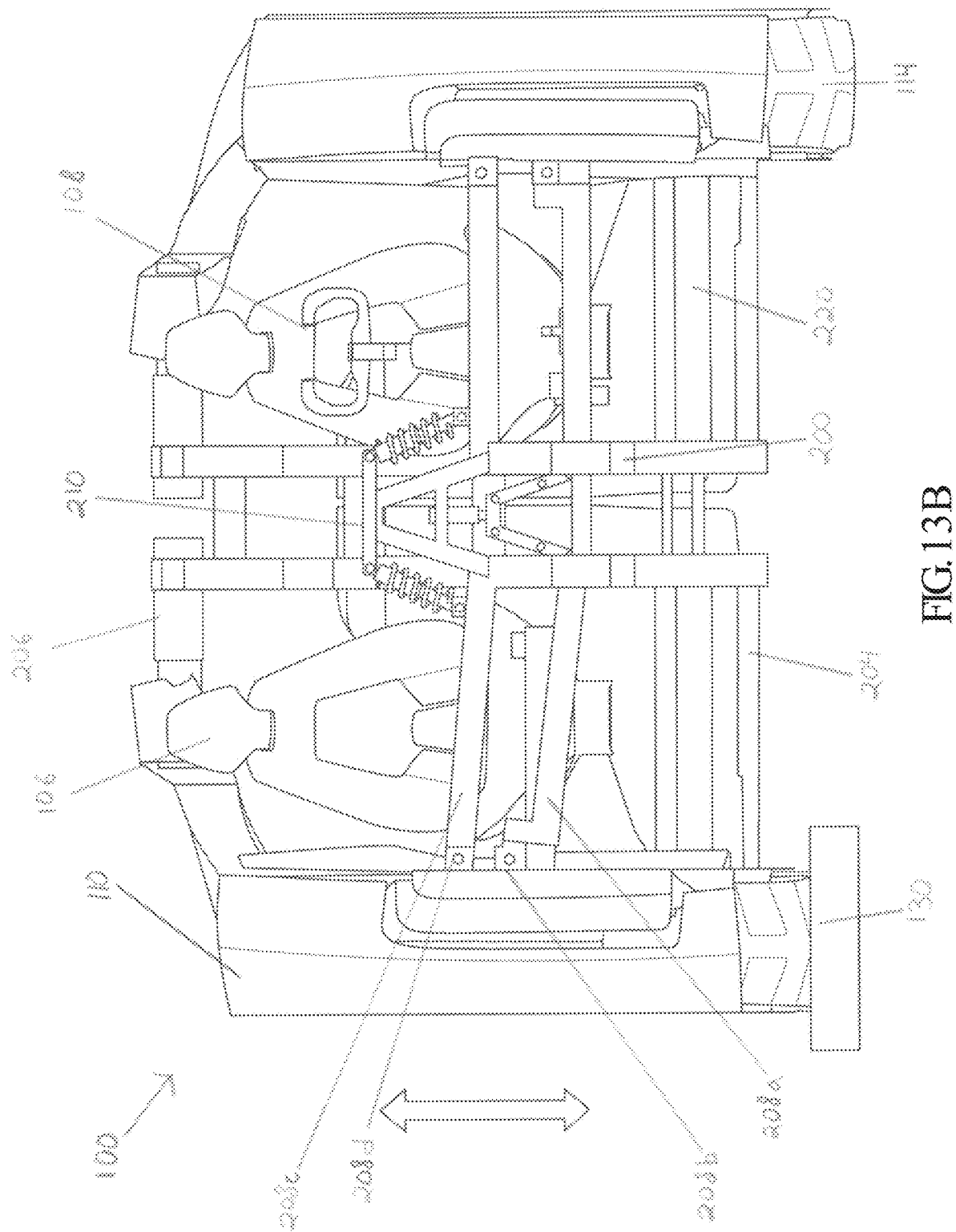

Referring to FIGS. 13A and 13B, in some embodiments, a centralized shock/tilt assembly 210 that provides suspension support for the front fender mounts 208 of the vehicle 100 is depicted. FIGS. 13A and 13B depicts an example embodiment of the fronts suspension outlining the way the front suspension works to absorb uneven surface. FIG. 13A shows the vehicle 100 in drive mode on a flat surface. FIG. 13B shows the vehicle 100 traversing over an object 130. As the front right wheel 102 of the vehicle 100 traverses over the object 130, the lower wishbone arm 208a and the upper wishbone arm 208c is tilted several degrees upwards allowing the vertical movement of the right front wheel 102 and its fender 110 to roll over an object 130 and the right side of the shock assembly 210 compresses to absorb the vertical movement.

Figure 13C:
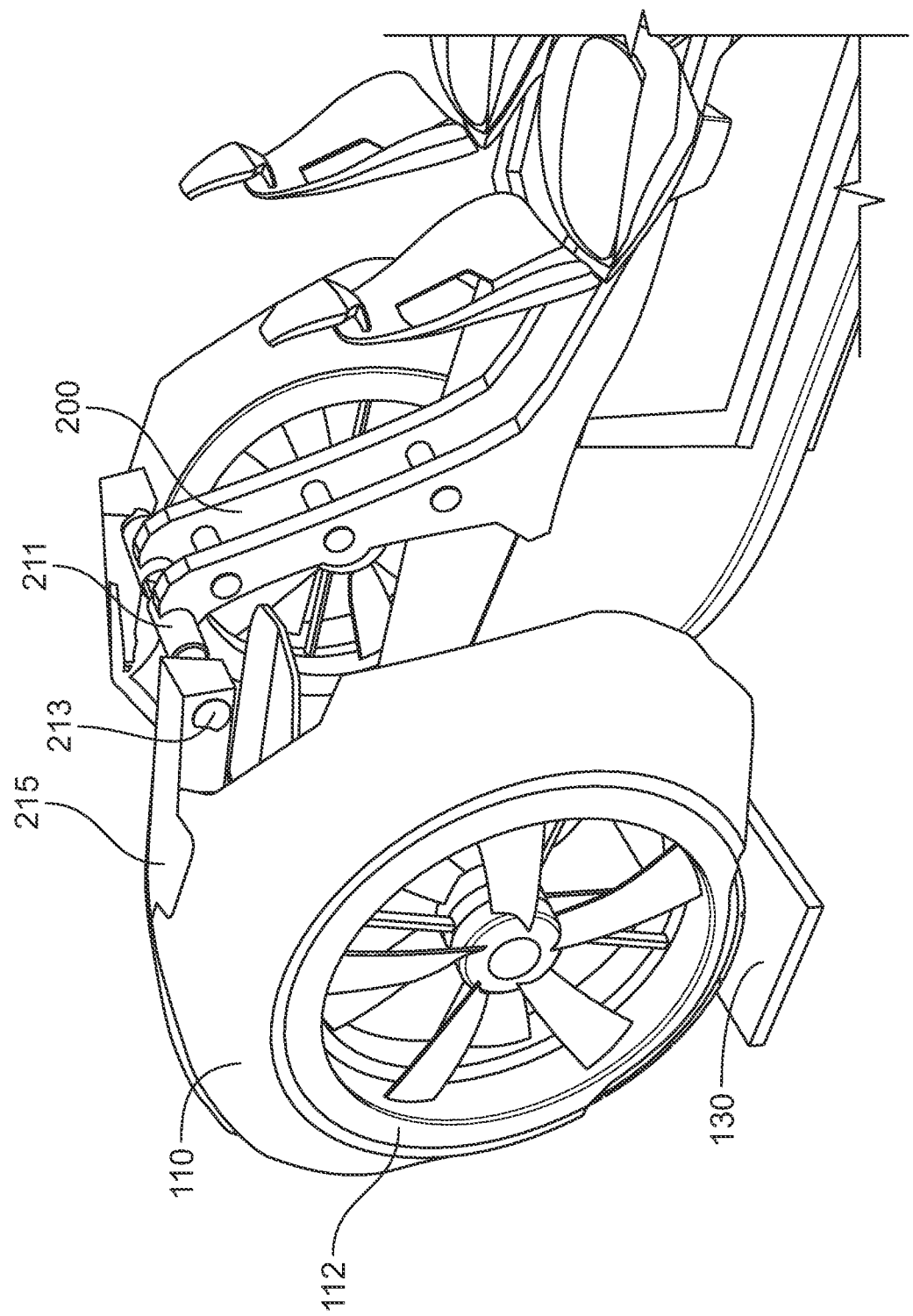

Referring to FIG. 13C, in some embodiments, the vehicle 100 can include a rear suspension including a spring-loaded mechanism 211, a pivot point 213, and a swing arm 215 for enabling the rear fenders 110 to move up and down during drive mode to traverse over objects and holes in the driving surface. In some embodiments, the spring-loaded mechanism 211 is attached to the frame 200 and includes a rod extending therethrough to a pivot point 213 in the rear body portion of the vehicle 100. The pivot point 213 can enable the spring-loaded mechanism 211 to absorb vertical movement from the rear fenders 110. In some embodiments, the rear suspension can include a swing arm 215 attached to the frame 200 and the spring-loaded mechanism 211 via the pivot point 213. In this configuration, when the vehicle 100 approaches an object 130 (e.g., an obstacle, divot, etc.) on a driving surface, the tire(s) 114 can roll over the object 130 and the wheel 102 pushes the swing arm 215 upwards allowing the wheel 102 and its fender 110 to absorb the uneven surface. In response to the vertical movement of the wheel 102, the spring-loaded mechanism 211 can push the wheel 102 and its fender 110 back to the ground for continuous rolling.

Figure 13D:
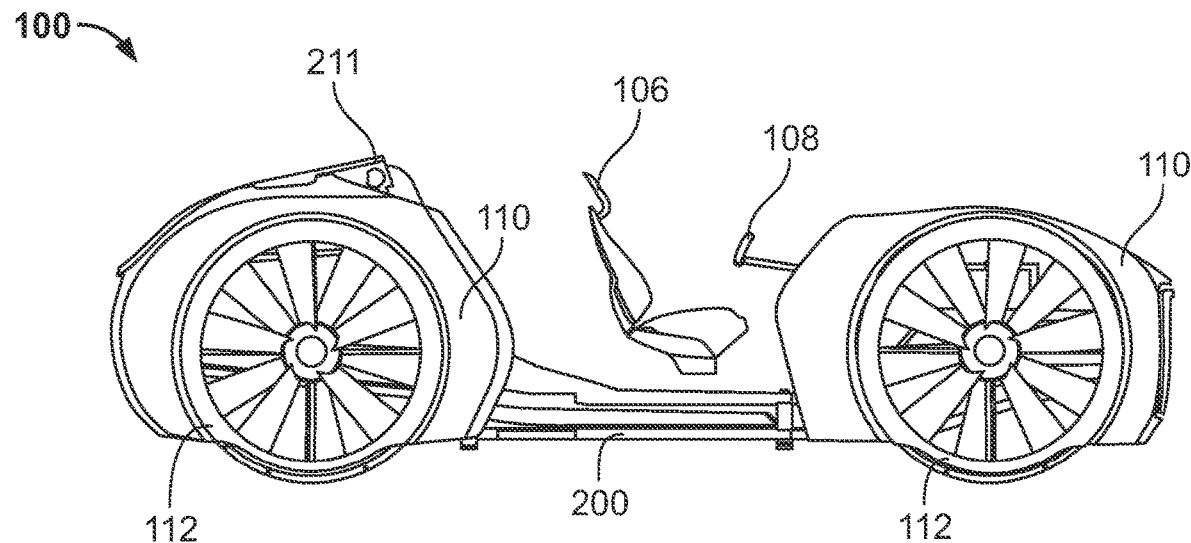
Figure 13E:
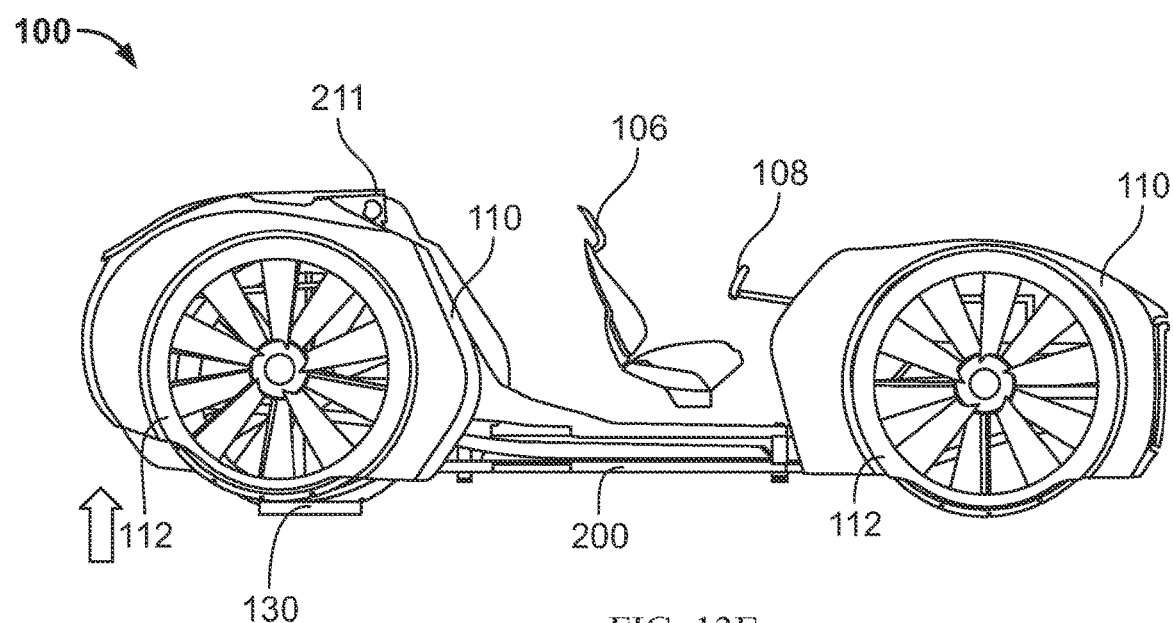

Referring to FIGS. 13D-13E, side perspective views of the vehicle 100 with the rear suspension in operation are depicted. FIGS. 13D and 13E depicts an example embodiment of the rear suspension outlining the way the rear suspension works to absorb uneven surface. FIG. 13D shows the vehicle 100 in drive mode on a flat surface. FIG. 13E shows the vehicle 100 traversing over an object 130. As the rear right wheel 102 of the vehicle 100 traverses over the object 130, the swing arm 215 is tilted several degrees upwards allowing the vertical movement of the right rear wheel 102 and its fender 110 to roll over an obstacle 130 and the right side of the spring-loaded mechanism 211 compresses to absorb the vertical movement. The vehicle 100 can be designed such that, when in drive mode, any combination of the wheel 102, the duct 112, and the fender 110 can move up and down vertically when traversing over objects 130/dips in the driving surface.

Figures 14A, 14B:
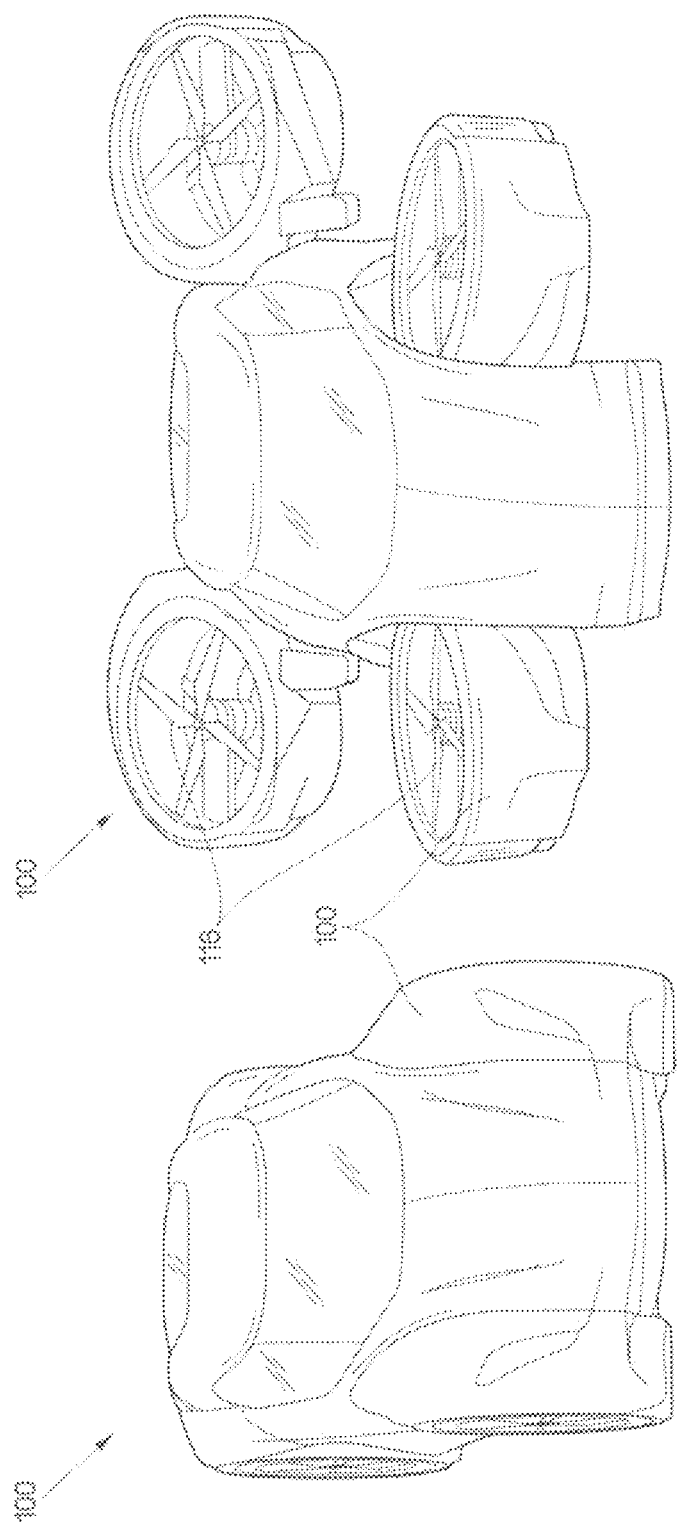
FIGS. 14A and 14B depict isometric views of example embodiments of a vehicle in drive mode and flight mode, in accordance with the present invention.

Referring to FIGS. 14A and 14B, in operation, the vehicle 100 can transition from a street legal automobile configured for conventional driving on a driving surface, as discussed herein, to a PIVITOL configured for flight. FIG. 14A shows a front isometric view of the vehicle 100 in drive mode while FIG. 8B shows a front isometric view of the vehicle 100 in flight mode. The transformation can be a fully automated and can be initiated by a press of a single button. This transformation can take place in approximately 30 seconds. In some embodiments, the vehicle 100 is designed for vertical takeoff and only requires a vertiport or large enough space (approximately 5 meters by 5 meters), to transform from a drive mode to flight mode.

Referring to FIGS. 17A and 17B, in some embodiments, the vehicle 100 is transformed from drive mode to flight mode using a unique combination of steps. FIGS. 17A-17C depict illustrative examples of the vehicle 100 at different phases of the transformation. FIG. 17A shows the vehicle 100 in drive mode with the wheels 102 in a vertical orientation. The first phase of the transformation can be initiated from drive mode after the vehicle 100 has come to a complete stop, as shown in FIG. 17A.

Figure 15:
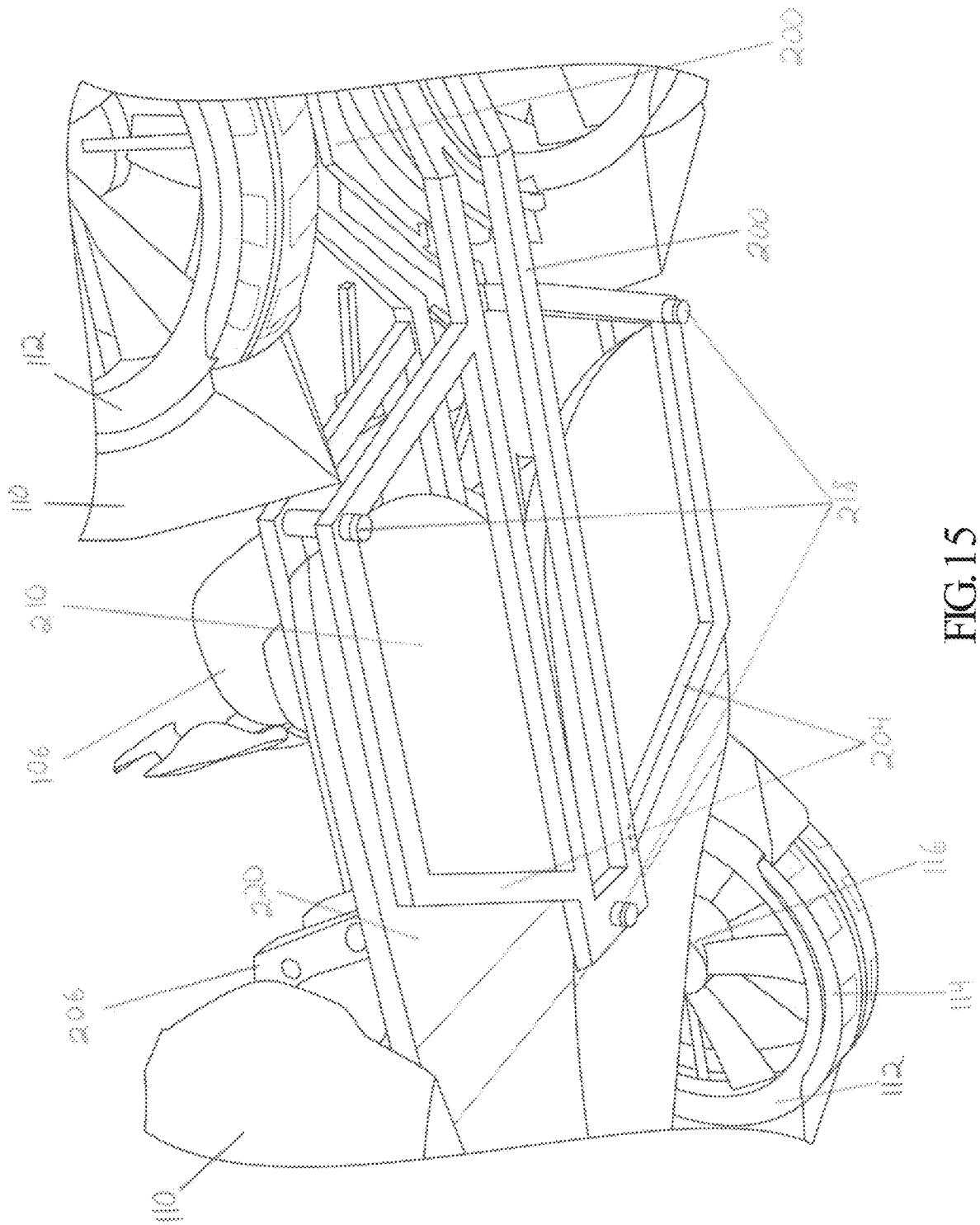
FIG. 15 depicts an isometric views of example embodiments for a lifting mechanism of the vehicle, in accordance with the present invention.

Referring to FIG. 15, once the vehicle 100 is stopped, the brakes 120 are secured and the vehicle 100 can be lifted approximately two inches of the ground by set of jack stands 218 (e.g., hydraulic lift stands). The use of the jack stands 218 allows for the wheels 102 to leave the ground and turn freely without any contact between the tires 114 and the ground. In some embodiments, the vehicle 100 can include three linear actuators operating the jack stands 218 located on the undercarriage of the vehicle 100 and operable for lifting the entire vehicle 100. The linear actuator can be mounted to the frame 200 by its casing and can be configured to allow extending jack stands 218 to travel vertically up and down.

The jack stands 218 can life the vehicle 100 to a sufficient height to allow the fenders 110 to rotate from a substantially vertical orientation to a substantially horizontal orientation, for example, approximately 2 inches above the ground. In some instances, the linear actuators can only be activated when the vehicle 100 has come to a full stop and transformation process has been activated after receiving this command from the driver via software and computer system. FIG. 15 depicts the vehicle 100 with the jack stands 218 fully retracted and positioning within the underside of the frame 200. The linear actuators can have sufficient force to lift the weight of the vehicle 100 and the jack stands 218 are constructed from a material sufficiently rigid to support the vehicle 100 when lifted.

Figure 16A:
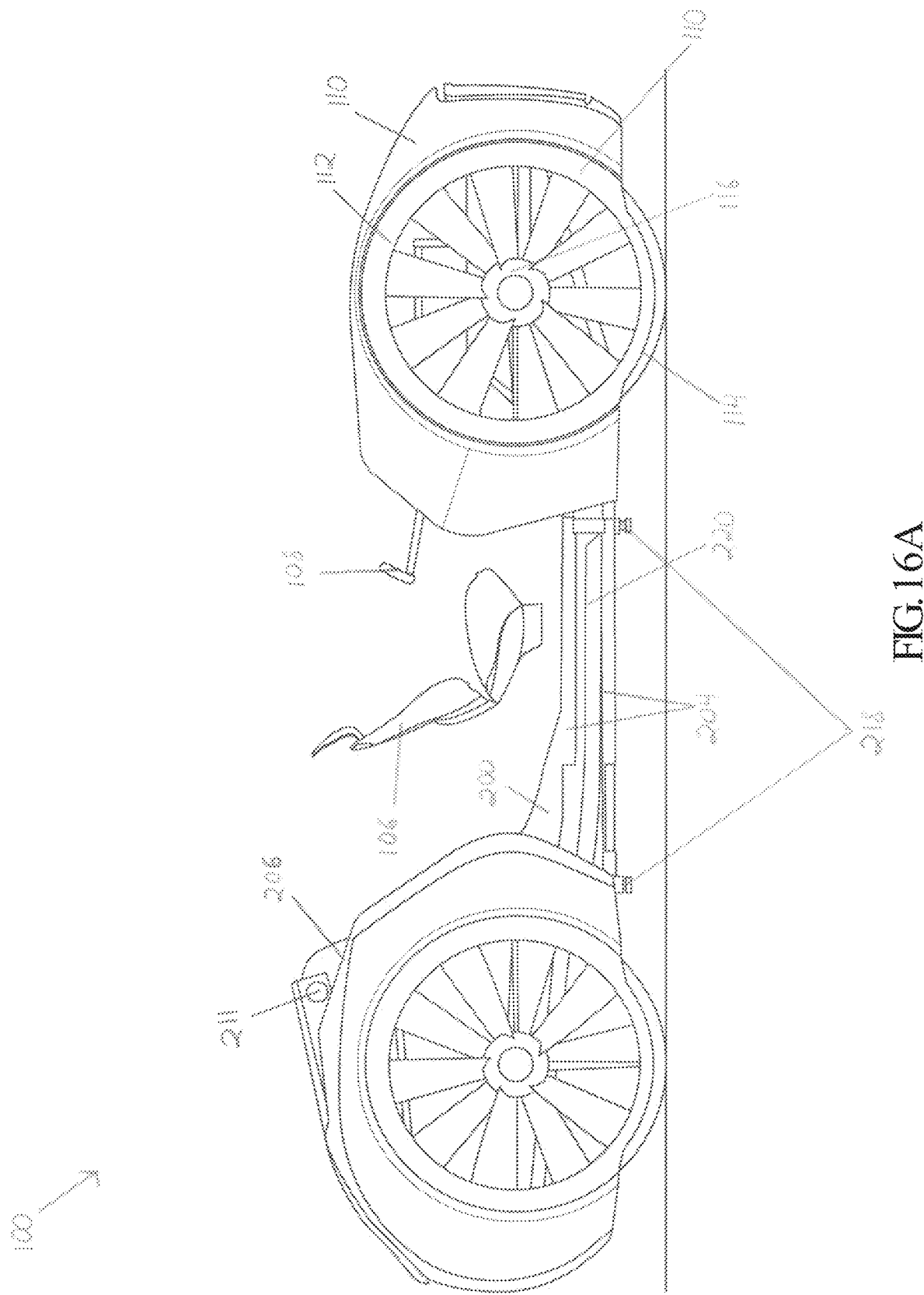
FIGS. 16A, 16B, and 16C depict isometric views of example embodiments for a lifting mechanism of the vehicle, in accordance with the present invention.
Figure 16B:
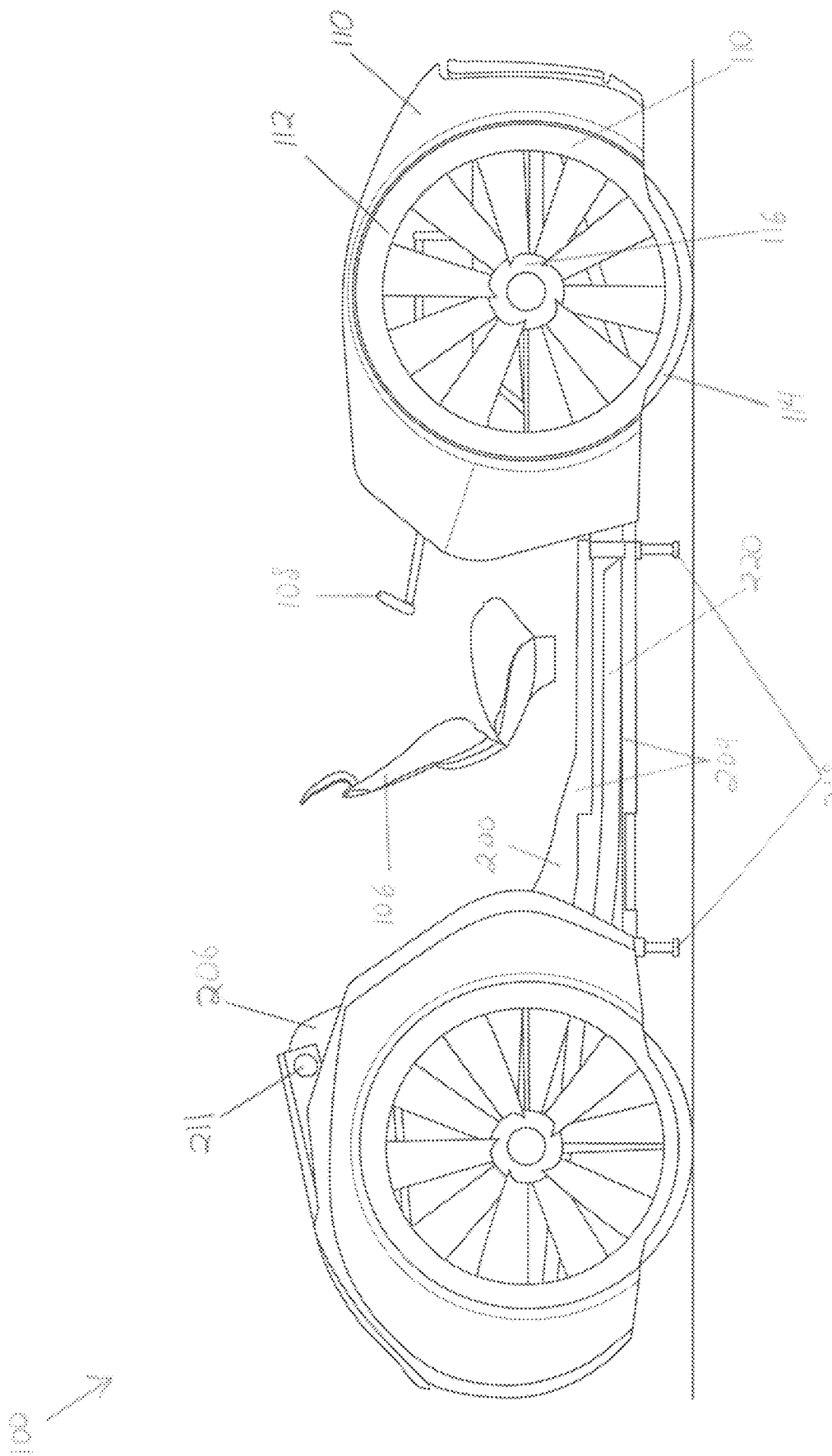
Figure 16C:
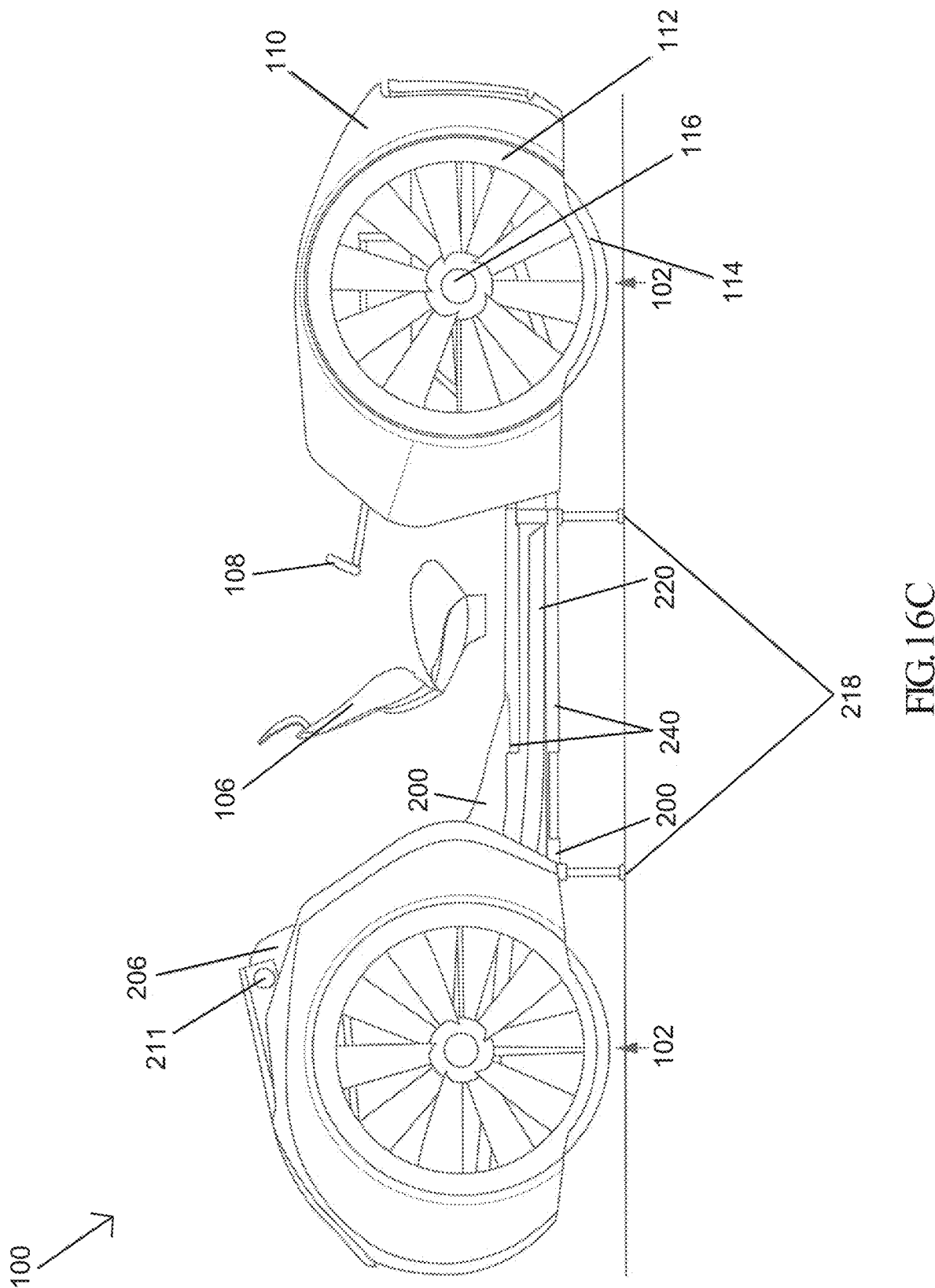

Referring to FIGS. 16A-16C, side perspective views of the vehicle 100 with the jack stands 218 in operation are depicted. FIG. 16A depicts the vehicle 100 with the jack stands 218 fully retracted, FIG. 16B depicts the vehicle 100 with the jack stands 218 partially extended, and FIG. 16C depicts the vehicle 100 with the jack stands 218 fully extended. As shown in FIG. 16C, the wheels 102 of the vehicle 100 are lifted off the ground when the jack stands 218 are fully extended.

Referring to FIGS. 17A-17C, during a second phase of the transformation, after the vehicle 100 is lifted off the ground, all the wheels 102 are hinged/rotated to turn outwards from a substantially vertical orientation to substantially horizontal orientation for a 90-degree rotation. For example, the hinged/rotated transformation of the wheels 102 from the drive to the flight mode can be provided by using small electric motor(s) and cogged wheel(s) installed inside a hinge mechanism allowing the wheel 102 to rotate/pivot (e.g., about pivots 208b, 208d shown in FIGS. 19A-20B). These electric motor(s) and cogged wheel(s) can be the same or different from the ones found in the motor casing 216 used for steering the wheels 102. FIG. 17B depicts and illustrative example of the vehicle 100 after the 90-degree rotation of the wheels 102.

After the wheels 102 are rotated substantially 90-degrees, the rear fenders 110 can be primed for flight. In some embodiments, the tire 114 along with the rim 112 are disengaged from the shaft 124 and the propeller(s) 116 (or turbines 152) can be engaged with the shaft such that the propeller(s) 116 (or turbines 152) can rotate freely within the fender 110. For example, the transformation of the utilization of the propellers 116 and/or turbines 152 from drive mode to flight mode can be controlled by a drive motor 118 embedded within the wheel 102 (e.g., as depicted in FIGS. 5 and 13). For example, the drive motor 118 can be a simple gear installed inside the drive shaft allowing the tire 114 along with the spokes of the rim 112 to be disconnected for a flight mode allowing a fan to spin freely as the tire becomes stationary. Similarly, the tires are disconnected from the shaft itself using a simple gear. In some embodiments, each wheel 102 can be equipped with two separate counter acting propellers 116 or a turbine 152. During a third phase of the transformation, the propellers 116 or turbines 152 can be disengaged with the rim 112 and start spinning freely, allowing the vehicle to be airborne. For example, the driving motors 118 within the wheels 102 or communicatively attached to the wheels 102 can provide rotational force to the propellers 116 or turbines 152 to cause rotation of the propellers 116 or turbines 152.

Once airborne and hovering, the vehicle 100 is ready for horizontal flight. In some embodiments, to increase the forward/reverse motion of the vehicle 100 during flight, the rear fenders 110 can be configured to tilt forward/backward providing forward/reverse thrust and, therefore, increased speed. FIG. 17C shows an illustrative example of the vehicle with the rear fenders 110 tilted to provide forward thrust.

FIGS. 18A-18C show isometric views of the vehicle 100 transformation process discussed with respect FIGS. 17A-17C. FIG. 18A shows the vehicle 100 in drive mode with the wheels 102 in a vertical orientation. FIG. 18B depicts and illustrative example of the vehicle 100 after the 90-degree rotation of the wheels 102. FIG. 18C shows an illustrative example of the vehicle with the rear wheels 102 tilted to provide forward thrust.

Referring to FIGS. 19A-19C, a front view of the vehicle 100 transforming from drive mode to flight mode is depicted. FIG. 19A depicts a front view of the vehicle 100 in drive mode, FIG. 19B depicts a front view of the vehicle 100 transitioning from drive mode to into flight mode (approximately half way through the transition), and FIG. 19C depicts a front view of the vehicle 100 fully transitioned from drive mode into the flight mode. As the vehicle 100 transitions the fenders 110 from a substantially vertical positioning (e.g., as shown in FIG. 19A) the lower wishbone arm 208a extends outward in relation to the upper wishbone arm 208b (as shown in FIG. 19B). During the transition, the upper wishbone arm 208b can remain stationary. This transition causes the fender 110, along with the duct 112, to pivot in a horizontal direction via the pivots 208b, 208d. When the transition is complete, the lower wishbone arm 208a can be located substantially adjacent to the upper wishbone arm 208b (as shown in FIG. 19C), thus transforming the vertical wheels into horizontal thrusters.

Figure 20A:
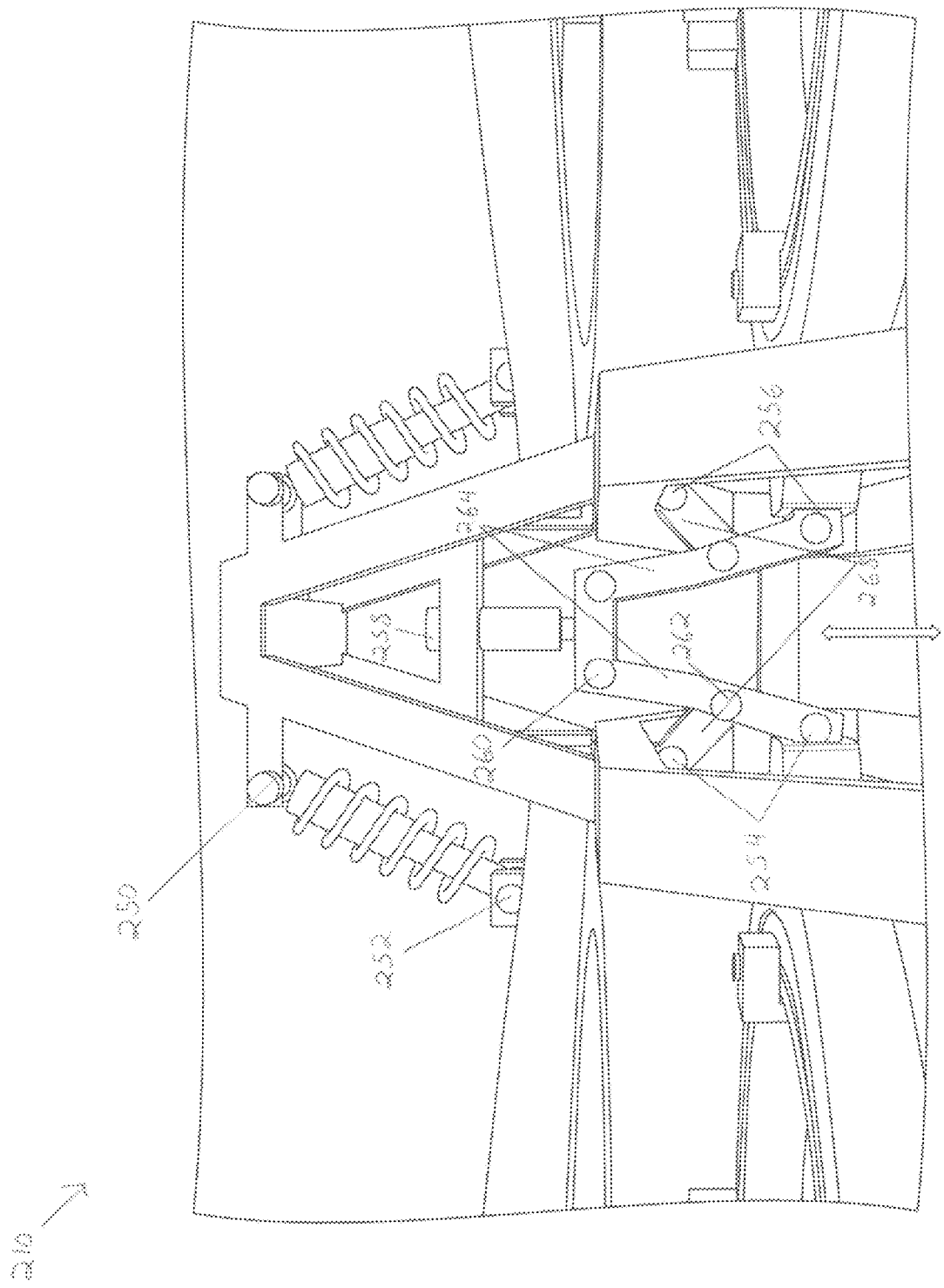
FIGS. 20A and 20B depict isometric views of example embodiments for a tilting and suspension mechanism of the vehicle, in accordance with the present invention.
Figure 20B:
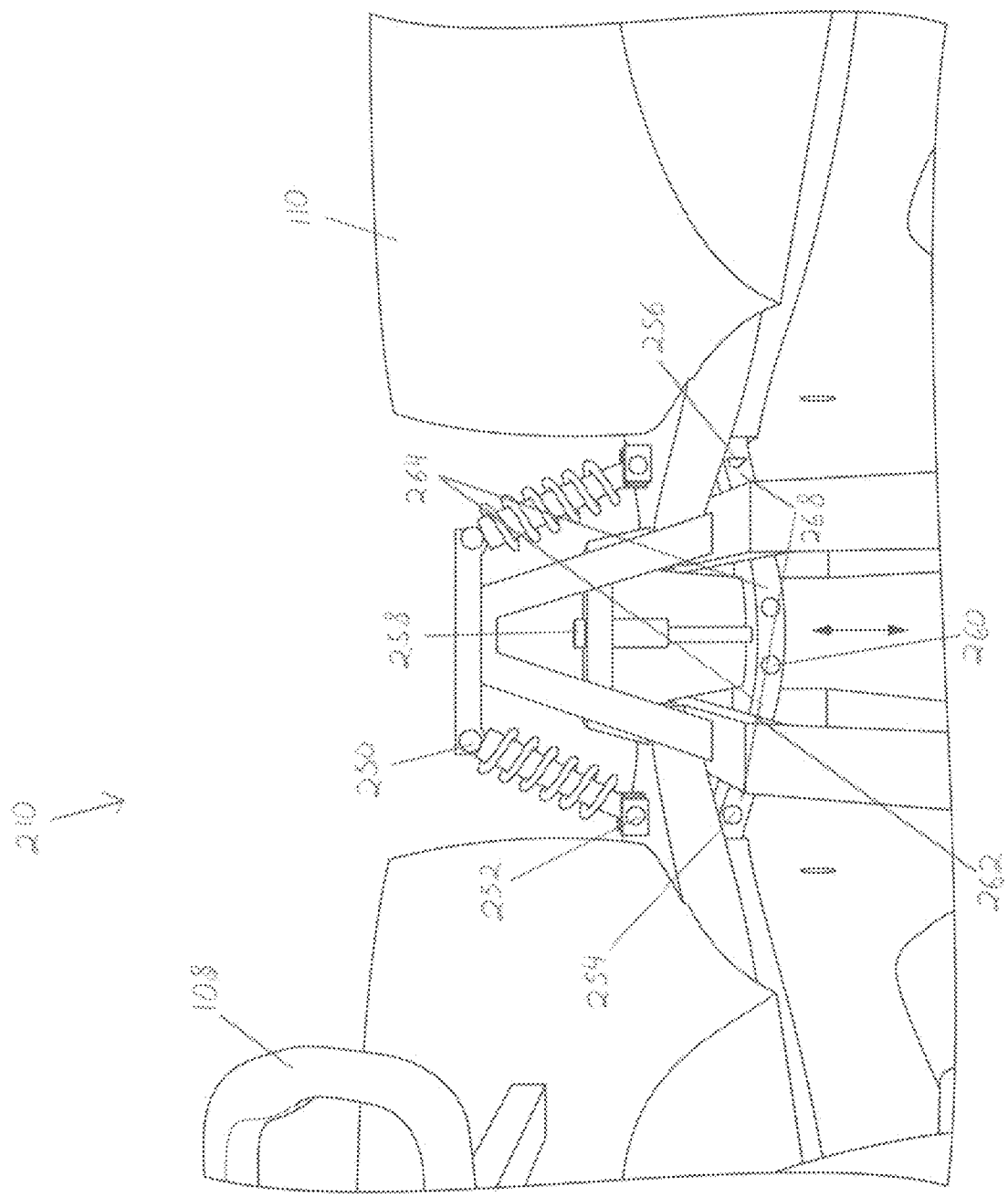

Referring to FIGS. 20A and 20B, the shock/tilt assembly 210 operating as a tilting mechanism for assisting in the transition from drive mode to flight mode is depicted. In some embodiments, the shock/tilt assembly 210 can include an upper mounting point 250) (at frame 200), a lower mounting point 252 (at upper wishbone arm), left rotational arm 266 pivot mounting points 254, right rotational arm 266 pivot mounting points 256, a linear actuator 258, a horizontal bracket pivot mounting point 260, and a main pushing and rotating arm lower pivot mounting point 262. The linear actuator 258 can include any combination of linear actuators 258, for example, linear electric actuator, hydraulic actuator, etc. The horizontal bracket 260 can be mounted between the left and right extension arms 264 corresponding to pivots 254, 256 and attached to the extending end of linear actuator 258. The linear actuator 258 can be designed to power the shock/tilt assembly 210 when transforming from drive mode into flight mode. The linear actuator 258 can be mounted to the frame 200 by its casing and can be configured to allow extending shaft to travel vertically up and down. The end of extension shaft of the linear actuator 258 can be mounted to the horizontal bracket 260 such that activation of the actuator 258 can activate the tilting mechanism of the shock/tilt assembly 210. In some embodiments, the ends of the jack stands 250) can be mounted to the horizontal bracket 260, which then activates the entire lifting and casing shock/tilt assembly 210 substantially simultaneously.

FIG. 20A depicts an example embodiment of the shock/tilt assembly 210, and the components 250, 252, 254, 256, 258, 260, 262 that make up the shock/tilt assembly 210, in drive mode position. In FIG. 20A, the horizontal bracket 260 is located in an upper position with shaft of the linear actuator 258 retracted.

FIG. 20B depicts an example embodiment of the shock/tilt assembly 210, and the components 250, 252, 254, 256, 258, 260, 262 that make up the shock/tilt assembly 210, in flight mode position. In some embodiments, the upper mounting point 250 and the lower mounting point do not change positions between drive and flight modes and remain stationary. In FIG. 20B, the horizontal bracket 260 is located in a lower position with the shaft of the linear actuator 258 with extended. In some embodiments, the linear actuator 258 can be activated when a signal is received from cockpit informing the system that vehicle 100 is ready to transition. During activation, the linear actuator 258 activates its shaft and pushes is downwards onto the horizontal bracket 260 and pushing the left and right extension arms 264 outward via their corresponding to pivots 254, 256. The simultaneously force the lower wishbone arms 208a to push outwards therefore initiating the tilting of the fenders 110 along with the duct 112. Due to the rotational movement of the fenders 110, the lower arm pivot mounting points 208b not only extend outwards but also rise upwards. To solve this effect the rotational arm 266 is installed on both sides of the shock/tilt assembly 210, allowing for complete desired movement of the fenders 110 from vertical to horizontal position. Furthermore, the mechanism allows for compact folding of the lower and upper wishbone arms 208c when is flight mode minimizing the drag of the air flowing beneath the front fenders 110.

Figure 21A:
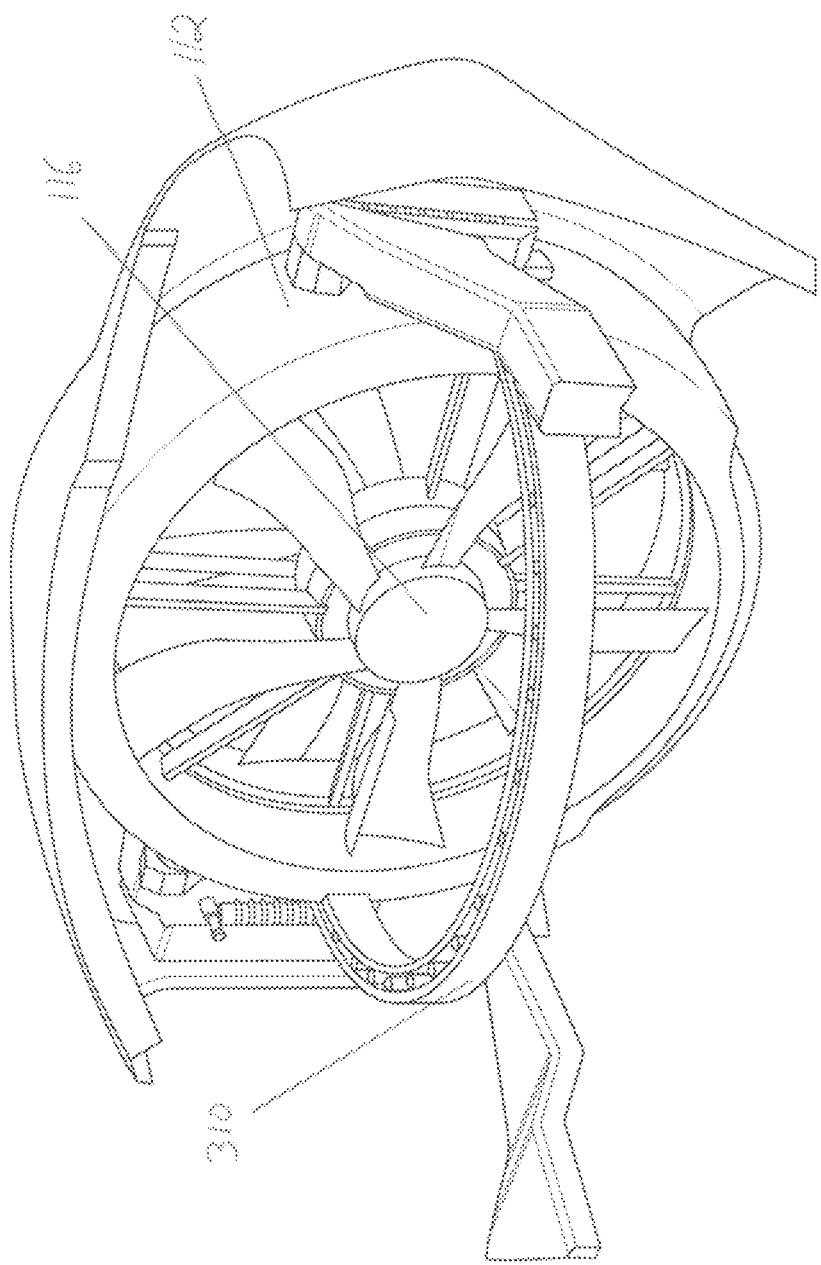
FIGS. 21A, 21B, and 21C depict isometric views of example embodiments of a front wheel for the vehicle transitioning from drive mode to flight mode, in accordance with the present invention.
Figure 21B:
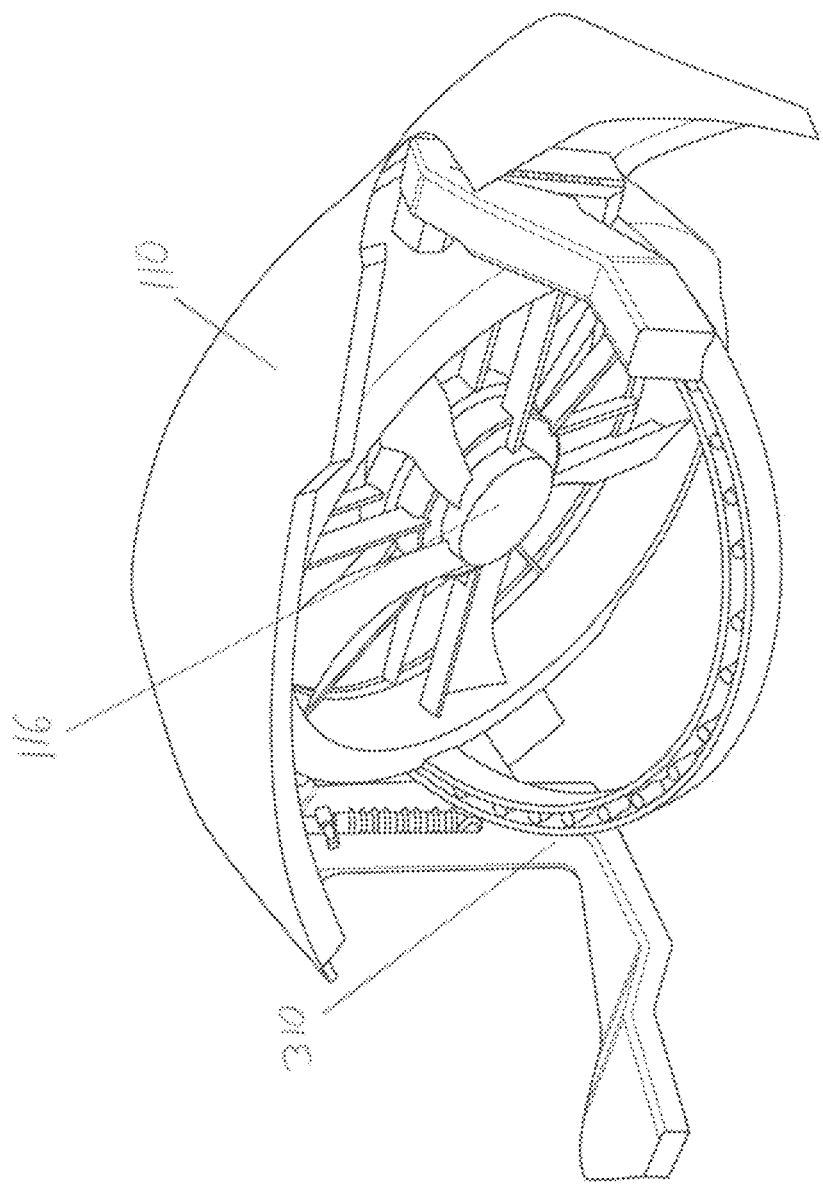
Figure 21C:
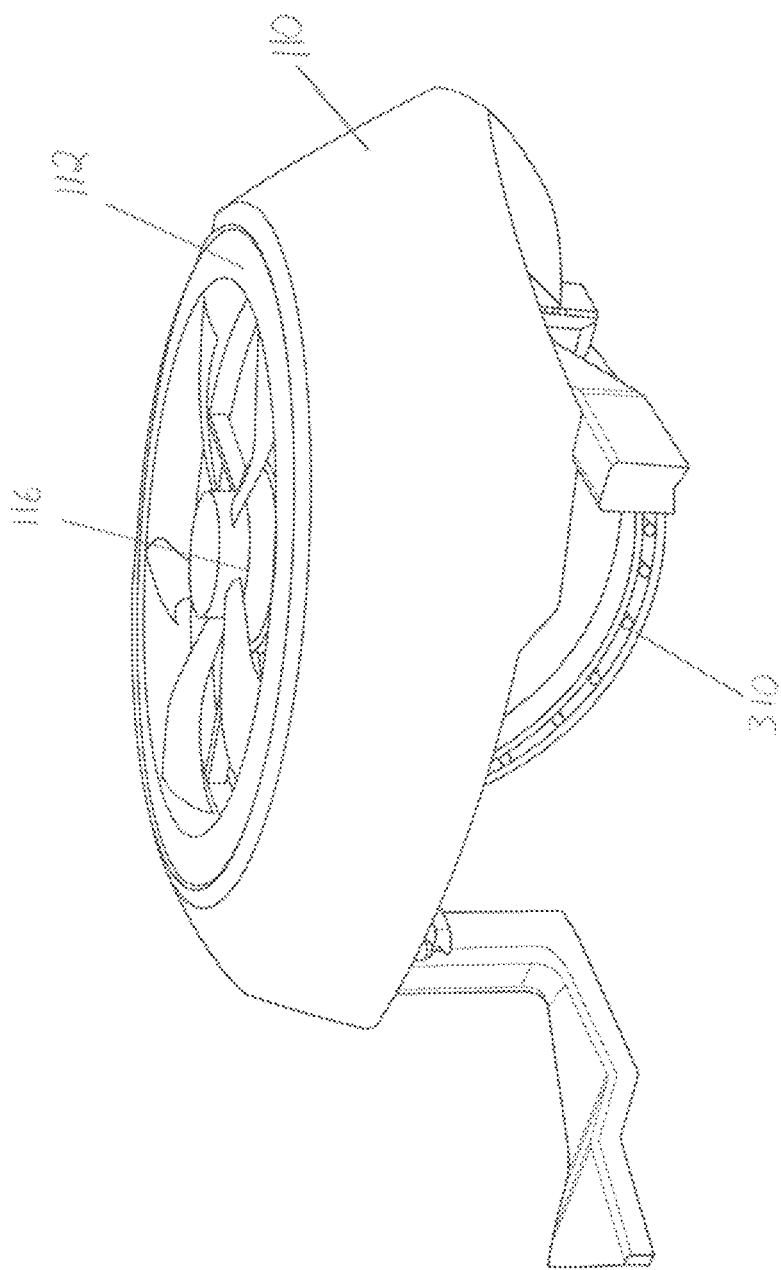
Figure 22A:
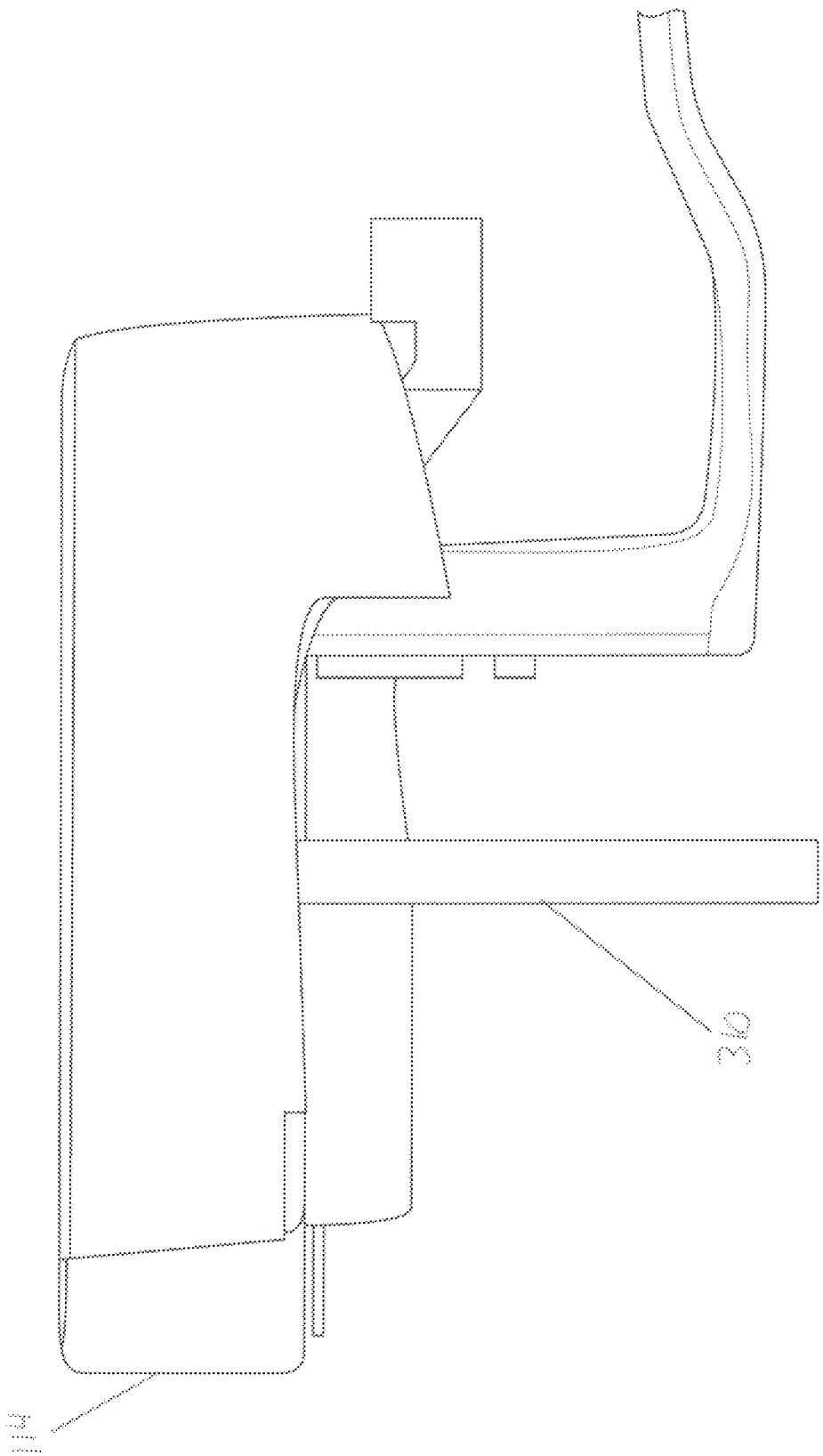
FIGS. 22A and 22B depict isometric views of example embodiments of a front wheel for the vehicle in a horizontal position for flight mode, in accordance with the present invention.
Figure 22B:
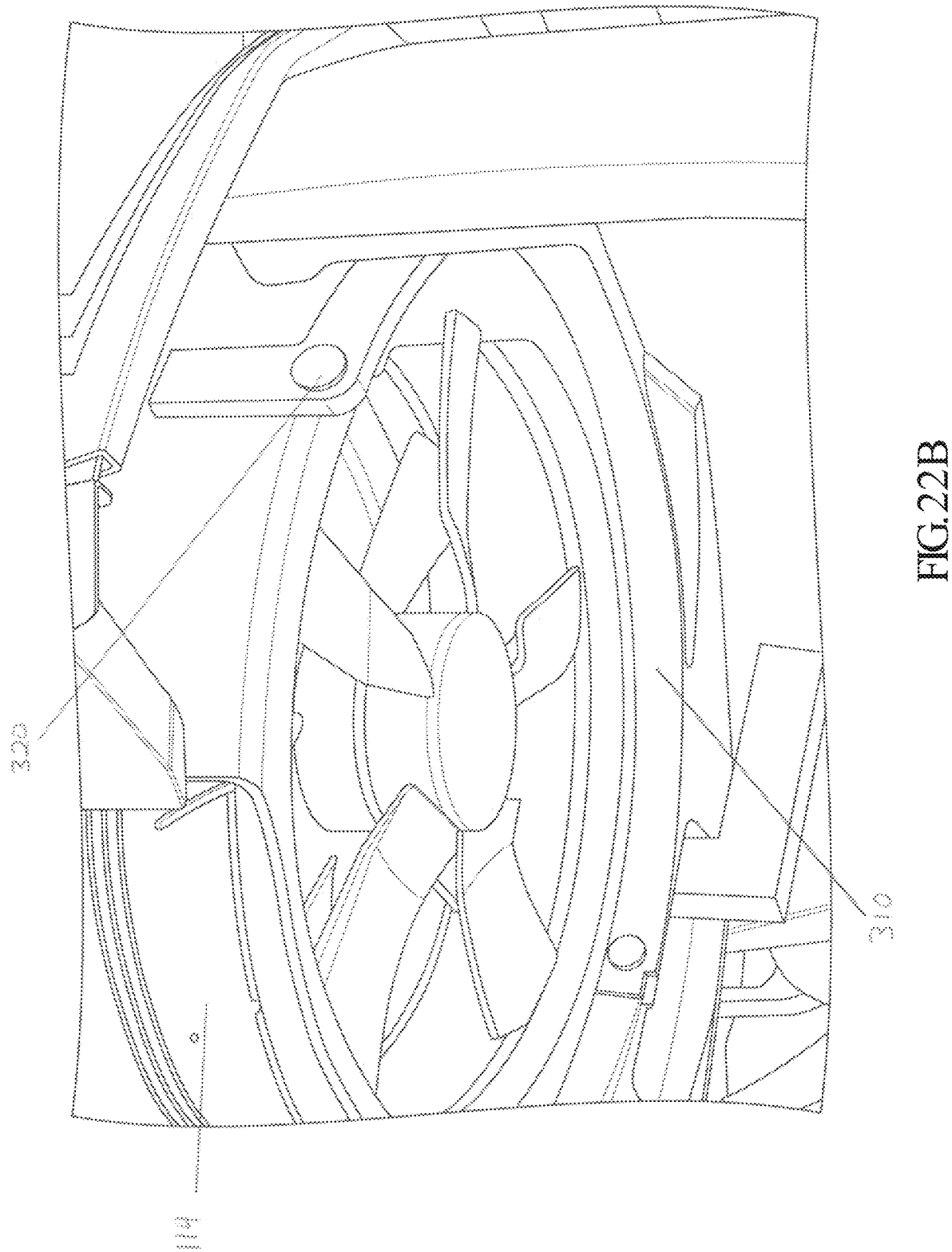

Referring to FIGS. 21A, 21B, and 21C in some embodiments of a front wheel for the vehicle transitioning from drive mode to flight mode are depicted. In some embodiments, the support mechanism 310 can also be coupled to the fender 110 by a pivot point 320 designed to allow the turning support mechanism 310 to rotate to a substantially horizontal orientation when the vehicle 100 transforms into flight mode, as discussed in greater detail herein. In some embodiments, a collapsible hinge can be designed to clear the space below the thruster so there is not obstruction of the airflow during flight mode. For example, the collapsible hinge can be activated by pulley or a cogged wheel mechanism rigged to the main hinge mechanism responsible for moving entire wheel 102 and/or thruster. Referring to FIGS. 22A and 22B in some embodiments of a front wheel for the vehicle in a horizontal position for flight mode are depicted.

Referring to FIGS. 23A and 23B, in some embodiments, the vehicle 100 can include a larger propeller 116a or turbine installed under the vehicle 100 to provide additional lift, as depicted in FIGS. 23A and 23B. For example, the larger propeller 116a can be a single large diameter propeller 116a (approximately 2 meters in diameter) installed under the floor of vehicle 100. The large diameter propeller 116a can be configured to provide the airflow necessary to create adequate thrust through channels and openings within the body of the vehicle 100 by capturing air from the front and back of the vehicle 100. In some embodiments, the larger propeller 116a on the undercarriage can be configured to provide more lift whilst the remaining four wheels can be configured to provide stabilization and propulsion of the vehicle 100.

Figure 24A:
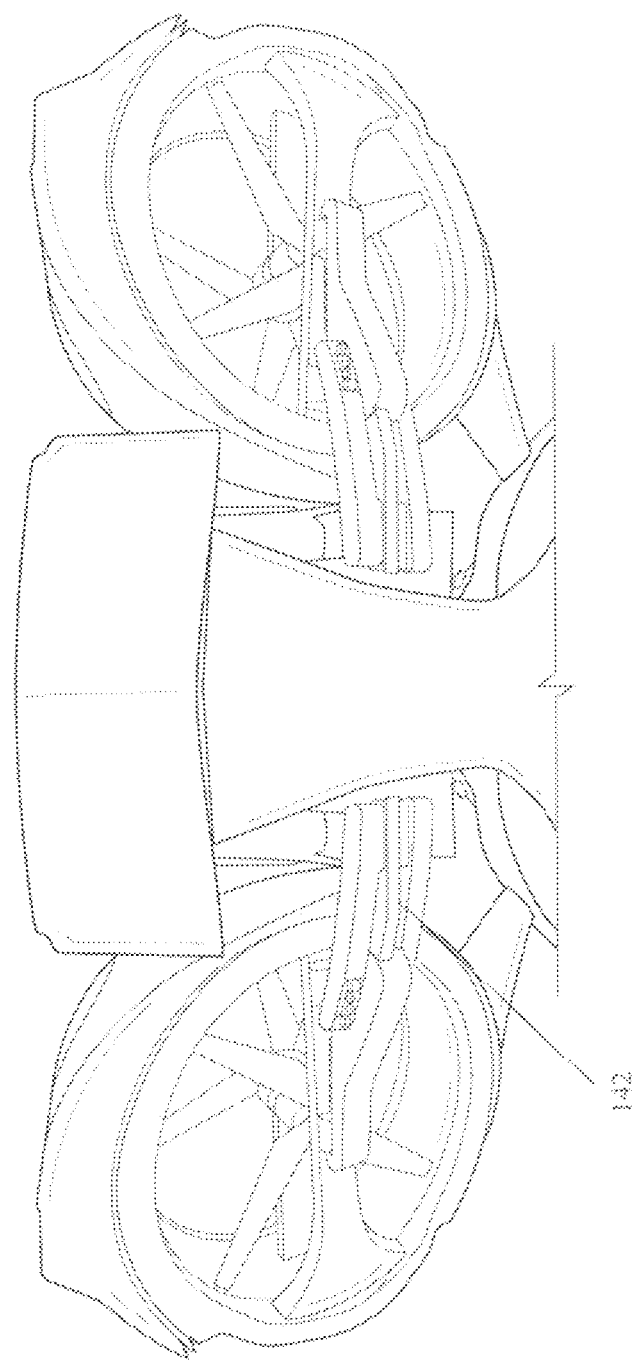
FIGS. 24A, 24B, and 24C depicts an isometric view of example embodiments of a wheel in flight mode, in accordance with the present invention.

Referring to FIG. 24A, in some embodiments, the vehicle 100 is configured with a hinge mechanism for pivoting the wheels 102. For the rear wheels 102, one pivot can operate the swing arm for suspension and wheel tilting while the other pivot can operate the wheel 102 from the vertical to horizontal position (and vice versa). Similarly, the front wheels 102 can be rotated using any combination of a single pivot or double pivot hinge mechanism. FIG. 12 depicts an illustrative example of the double pivot hinge mechanism that allows the wheels 102 to swing outward from a substantially vertical position to a substantially horizontal position to a substantially 90-degree or 45-degree angle for forward/reverse motion.

Figure 24B:
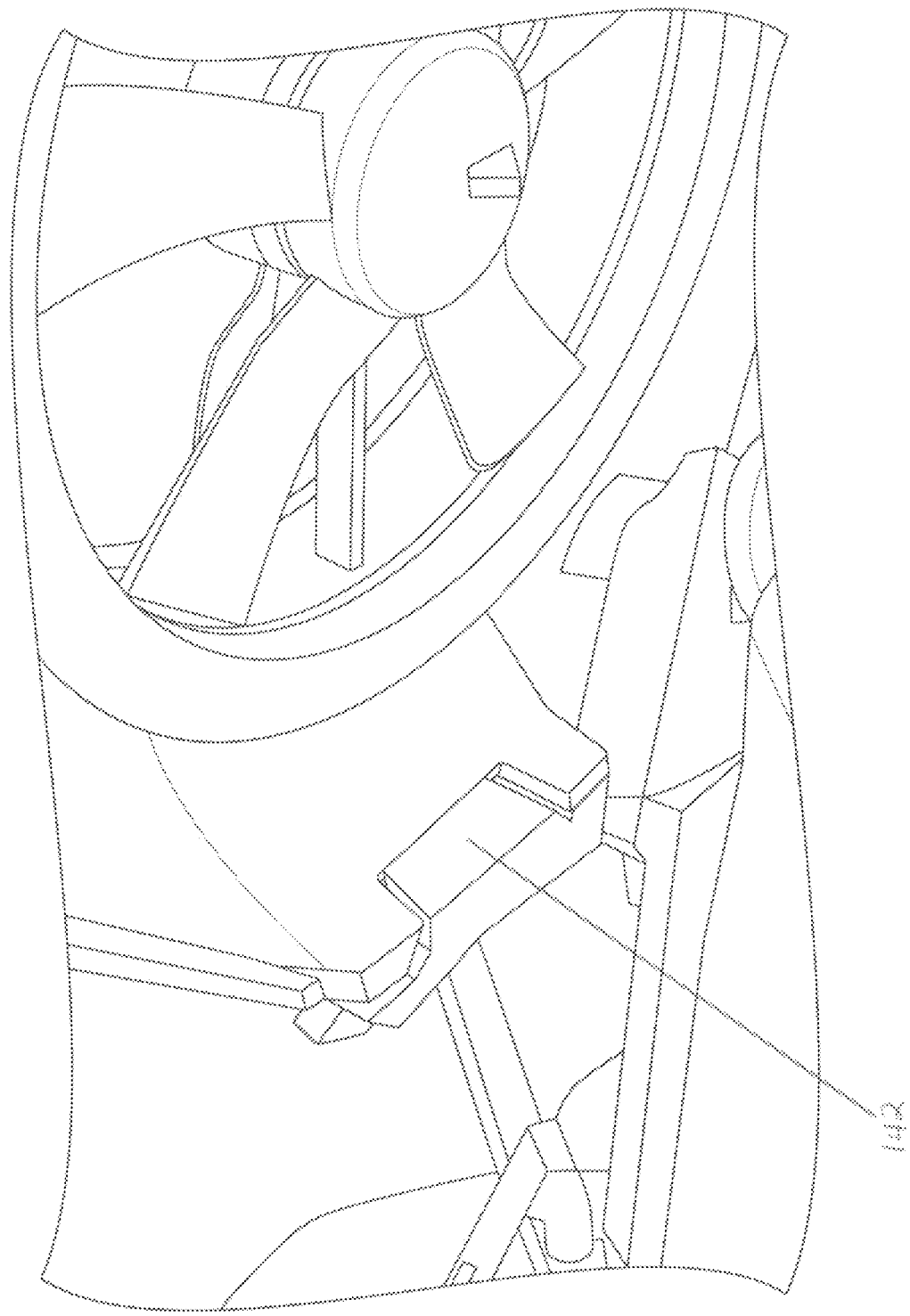
Figure 24C:
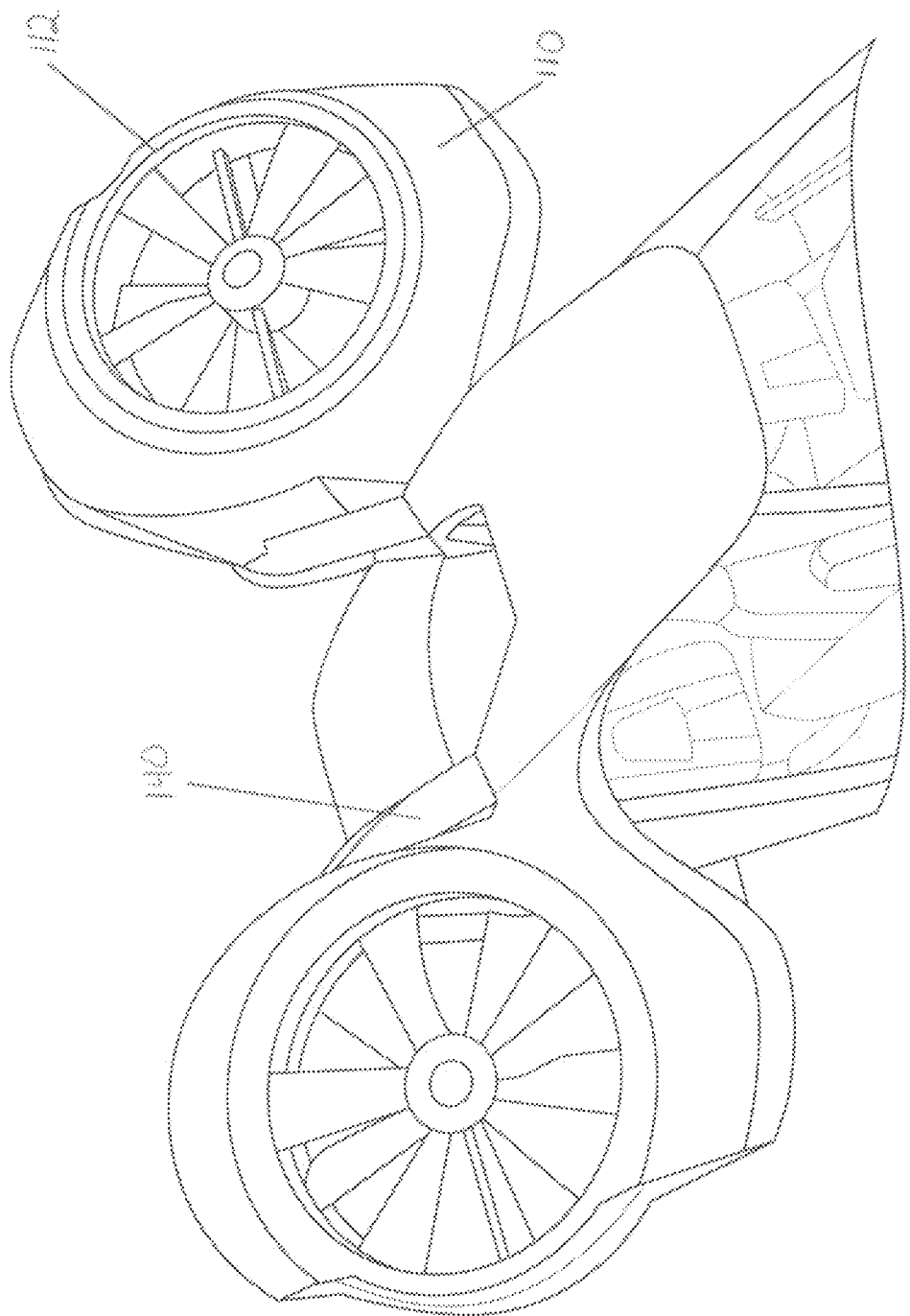
Figure 26A:
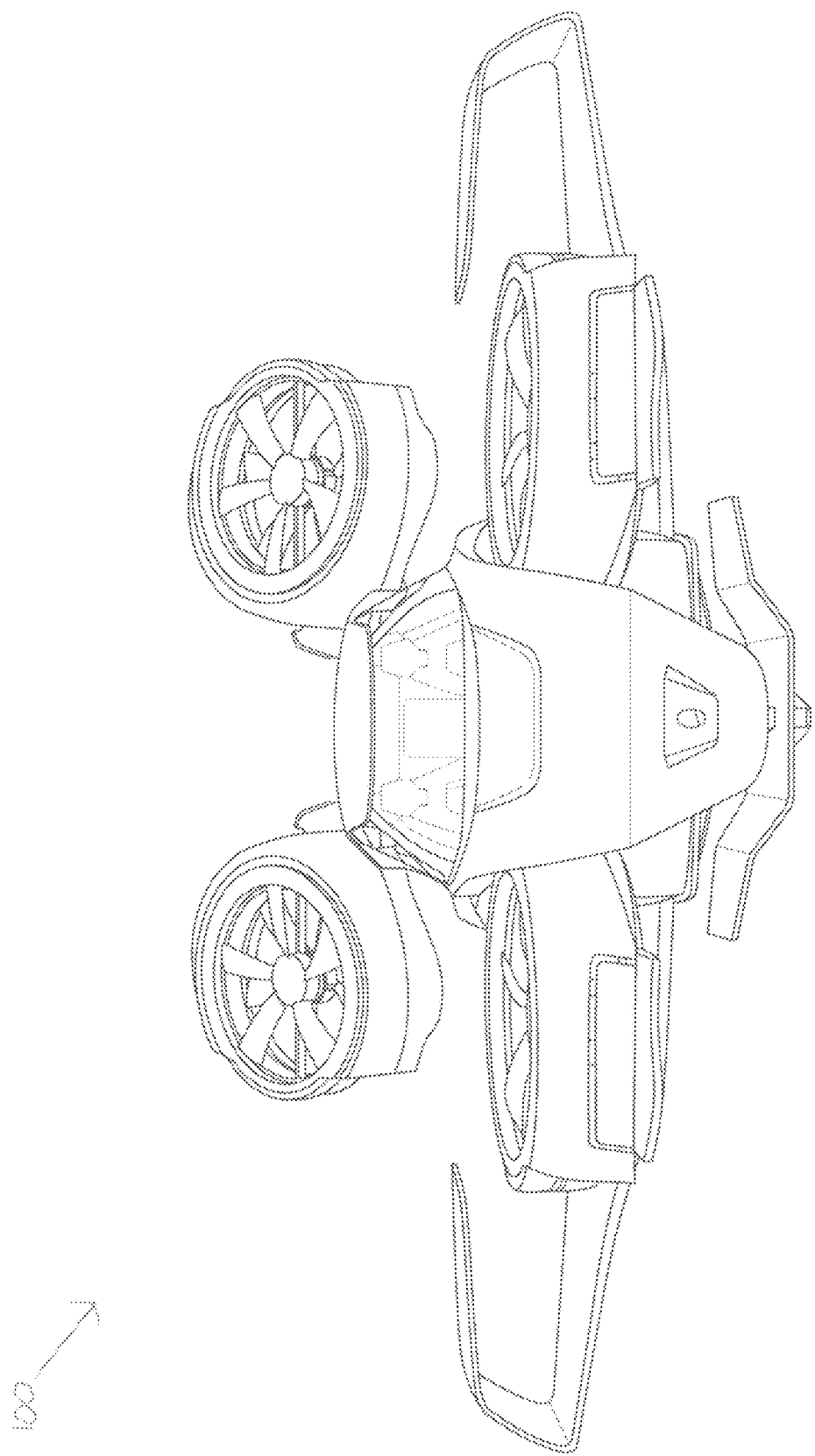
FIGS. 26A, 26B, 26C, 26D, 26E, and 26F depict isometric views of example embodiments of the vehicle with the wings deployed, in accordance with the present invention.
Figure 26B:
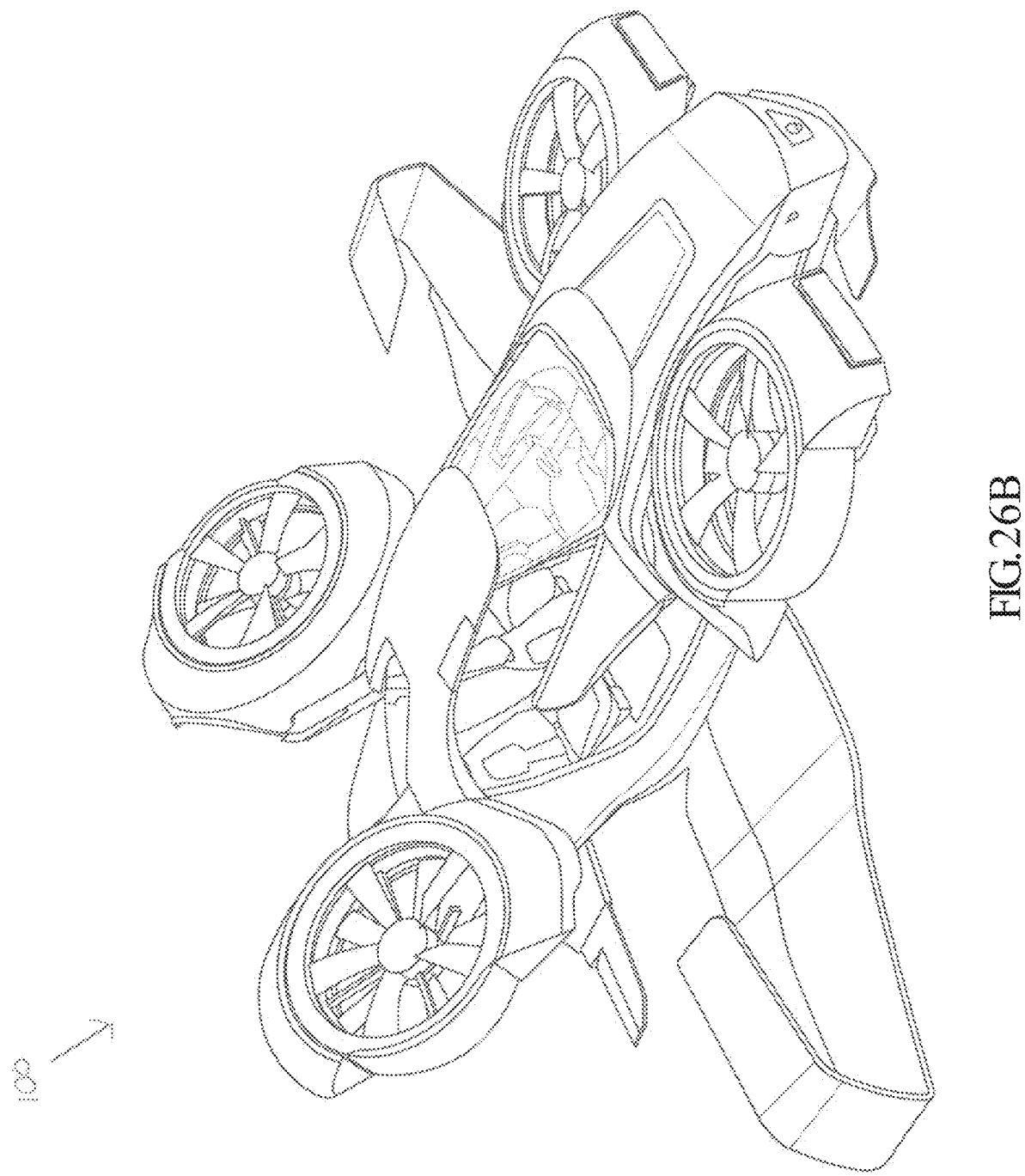
Figure 26C:
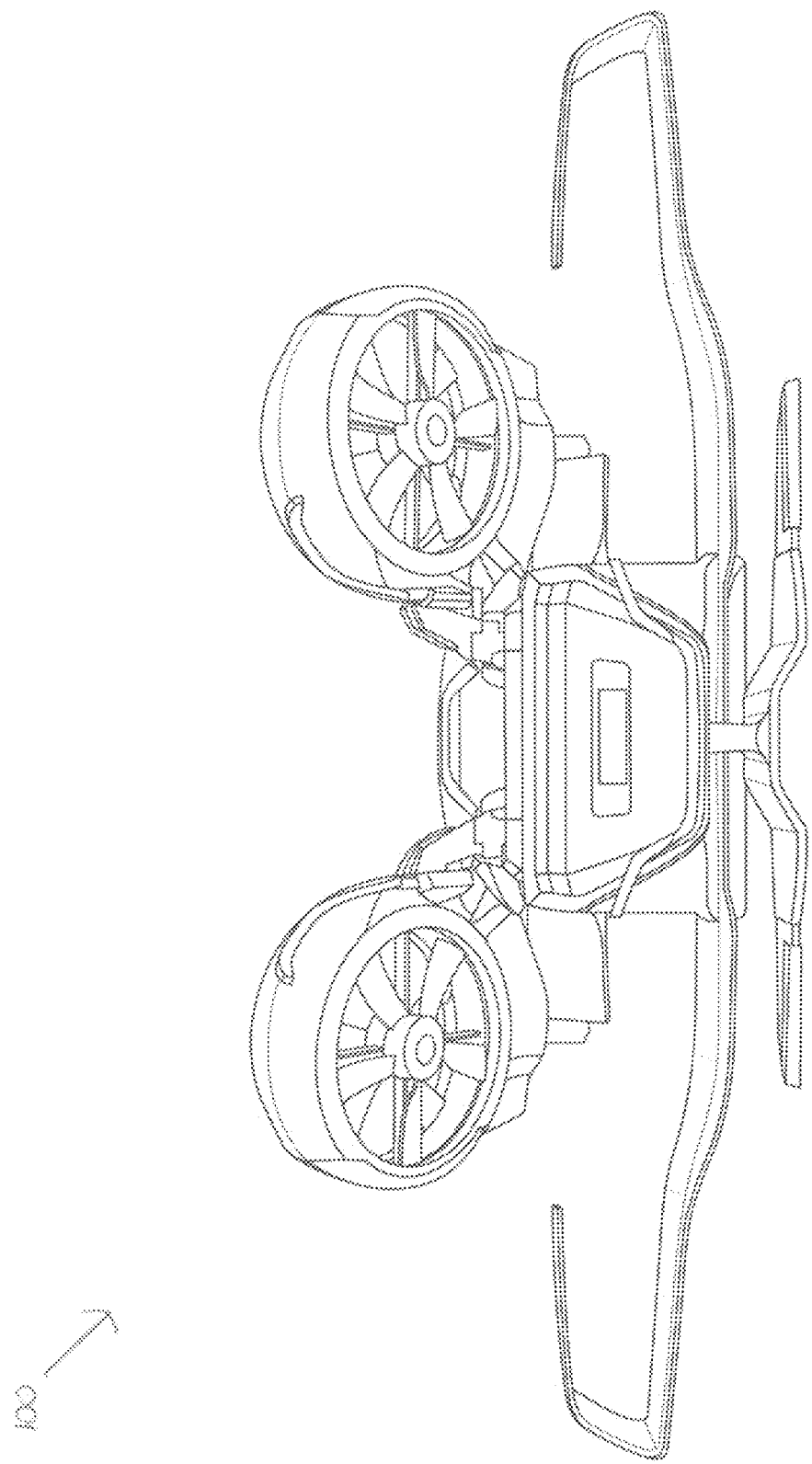
Figure 26D:
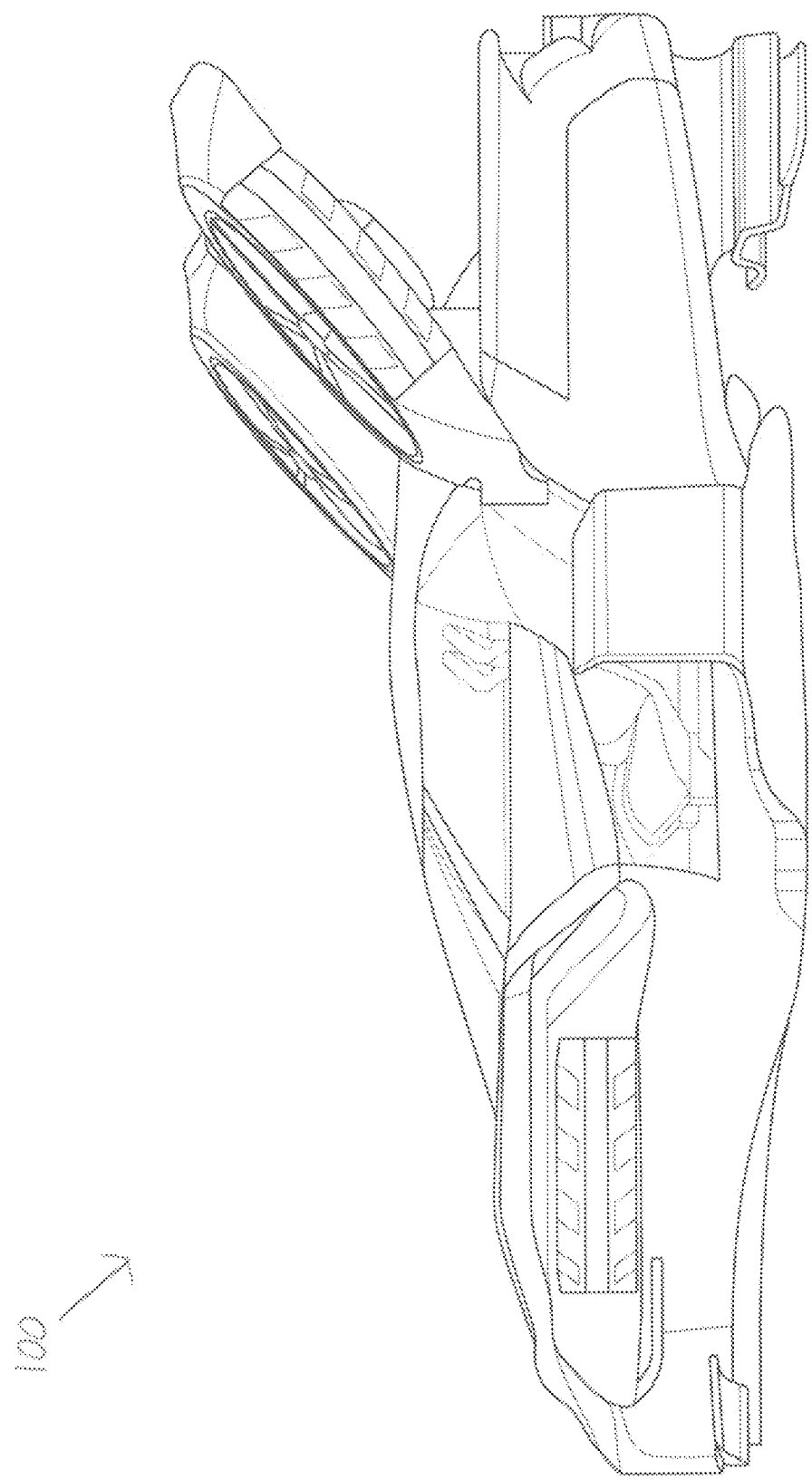
Figure 26E:
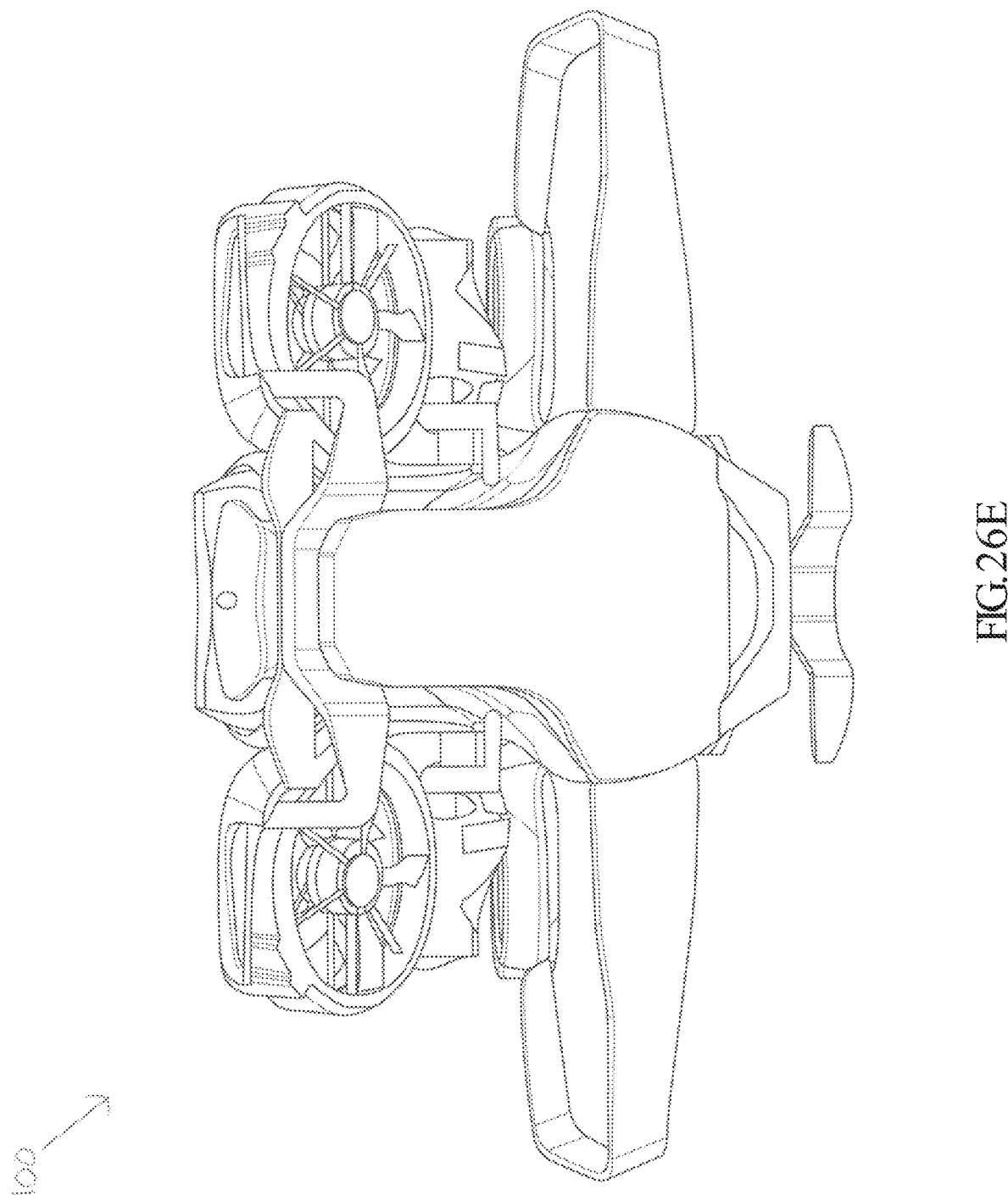
Figure 26F:
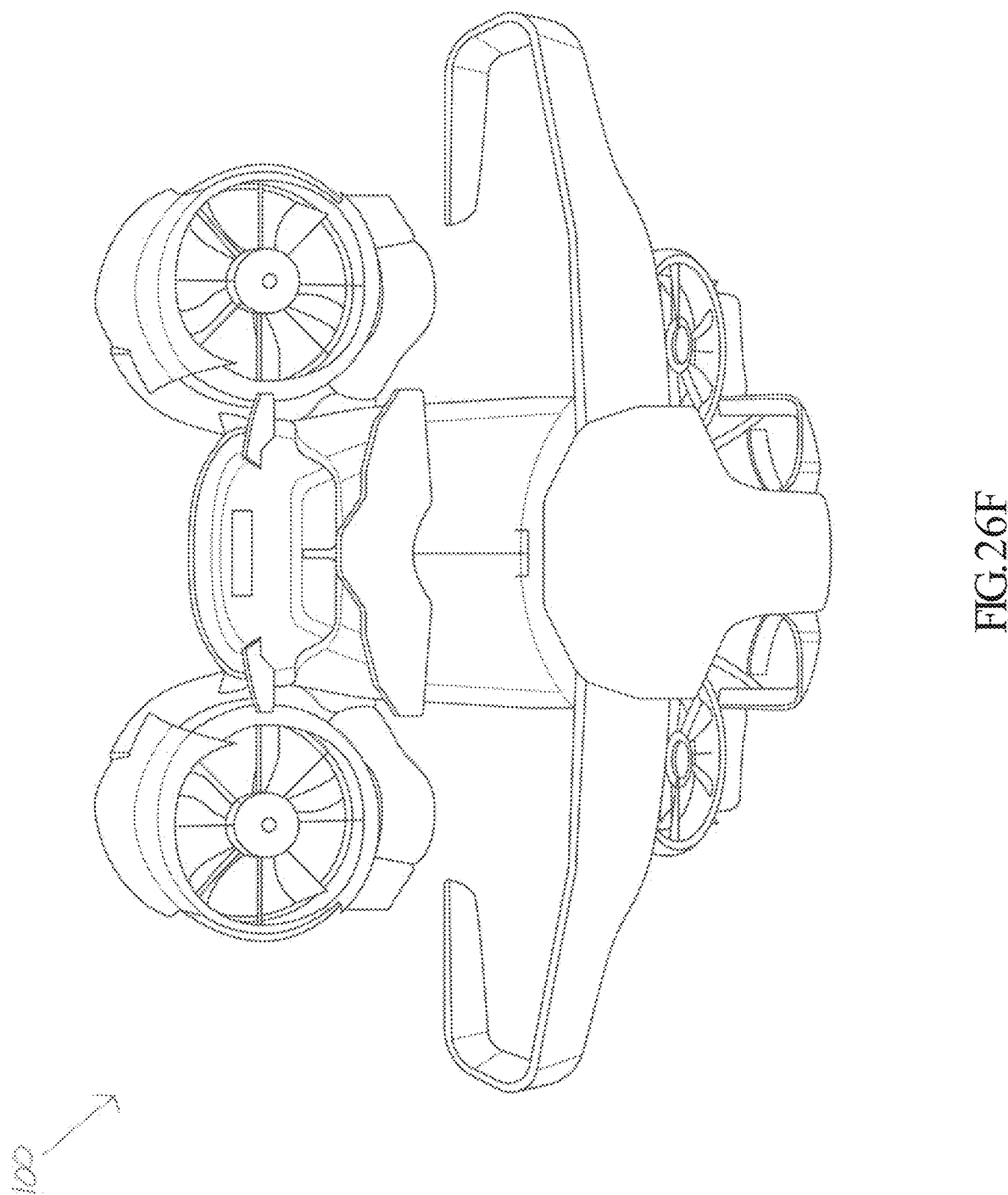

Referring to FIGS. 24B-24C, exemplary embodiments of rear wheels for the vehicle in a tilted position provided by a pivot point for flight mode are depicted. The wheel 102 can further include a spring-loaded hinge mechanism 140 and a hinge mechanism 142 enabling for suspension (drive mode) as well as forward tilting of the fans (flight mode). The hinge mechanism 142 can also enable transformation of the rear wheels from a vertical orientation into a horizontal orientation (e.g., from drive mode to flight mode). In some embodiments, the spring-loaded hinge mechanism 140 and the hinge mechanism 142 can be controlled by electric motor(s) (not depicted). In some embodiments, joint brackets can be mounted into the swing arm of the wheels 102 and can be attached in rotating spring-loaded axle into the fuselage. It can operate in drive mode under gravity based pressure to provide dampening and smoothing of uneven surface. For the flight mode, the bracket (swing arm) can be disconnected from the spring and can be activated the electric motors. The electric motors can also be activated when the vehicle 100 transforms from drive mode to flight mode. These same electric motors can later be used in the quadcopter mode to stabilize the flight using angle adjustment of the fenders 110.

In some embodiments, both rear suspension and rear fender 110 tilting hinge mechanism. 140 can be designed on a pivot point mounting to the rear fender 110 of the vehicle 100. In some embodiments, the mounted can be located on the duct 112 and/or the swing arm 215. The hinging operation for the hinge mechanism 140 can be controlled using electric hinge motors built into the hinge pivot point/joint 142. Using the hinge mechanism 140, the rear fender 110 can be rotated from a substantially vertical position (drive mode) to substantially horizontal position (flight mode). The pivot point 213 can be used to connect the swing arm 215 and the main frame 200 to the hinge mechanism 140. In some embodiments, the hinge pivot point 142 can include a spring loaded rotational mechanism that operates as suspension in drive mode (like motorcycle), and when in flight mode, the hinge pivot point 142 can disengage the spring for the hinge motor to tilt the fenders 110 forward. Similarly, in quadcopter mode, the hinge motors can also be used to move the fenders 110 slightly back and forth to steer and stabilize the vehicle 100 during flight. In other words, the hinge pivot point 142 allows for tilting the fenders 110 from a substantially vertical position (drive mode) to a substantially horizontal position (quadcopter mode) as well as work as suspension (drive mode).

FIG. 25 provides an example schematic view of the wheel 102 configured for flying mode. In particular, FIG. 25 depicts the fender 110, which can be fixedly attached to the main frame of the vehicle, including a housing for the driving motor 118, the propeller(s) 116 connected to the motors 118 and free from the rim 112 and a tire 114 wrapping the rim 112. This configuration allows the driving motor 118 to drive the propeller(s) 116 rotationally which then pulled airflow through the propellers 116 from a substantially horizontal orientation to generate lift and thrust for the vehicle 100 while flying.

In some embodiments, during flight mode, the orientation of the fenders 110 can be adjusted to enable different flight modes. For example, the fenders 110 can all be in substantially horizontal orientations (e.g., parallel to the ground) for take-off, landing, and/or to operate similar to a quadcopter. FIGS. 17B and 18B depict the examples of when the vehicle 100 is used for taking off and landing as well as traveling short distances as a quadcopter, for example, approximately 5 miles at lower speeds up to 0-60 mph within urban environment. The vehicle 100, in takeoff/landing mode, uses all four fenders 110 and the propellers 116 therein to propel as well as to maneuver, enabling a vertical takeoff. Utilizing a vertical takeoff and landing, the vehicle 100 can take off and land from various spaces including designated vertiports, large parking lots, driveways, and building rooftops.

In another example, the front fenders 110 can be in substantially horizontal orientations (e.g., parallel to the ground) and the rear fenders 110 can be titled to operate similar to a plane. FIGS. 17C and 18C depict the examples of when the vehicle 100 is used for flight over long distances as a plane, for example, approximately 100-400 miles at higher speeds up to 0)-60 mph within urban environment, depending on the power plant of the vehicle 100. The vehicle 100, in plane mode, the vehicle applies more power to the rear fenders 110 to propel the vehicle forward. For example, once the vehicle 100 is in plane mode, with the wings 220 fully deployed, it can reach speed above 80 knots and generates lift from the main wing 220 as well as the rear stabilizers 240. In this example configuration, the total available power can be distributed 80% to the driving motors 118 in the rear fenders 110 and 20% to the driving motors 118 in the front fenders 110. Once the vehicle 100 reaches speeds over 10 knots the driving motors 118 in the rear fenders 110 can be turned off. Also, when in the vehicle 100 is in plane mode, the driving motors 118 in the rear fenders 110 will only need to provide up to 300 KW of power to propel forward as most of the lift is generated by the wings 220.

FIGS. 17A and 18A depict the examples of when the vehicle 100 transforms from a flying vehicle 100 back into a driving vehicle 100. When in driving mode, all four fenders 110 of the vehicle 100 can be turned 90 degrees to vertical position and rest on the ground using tires built into the fenders 110. The tires are powered individually per each wheel. In driving mode, the vehicle 100 can travel on roads and streets as well as dirt roads as it is suspended as regular automobile. Front wheels can also be designed to turn left and right for normal ground operations.

In some embodiments, the vehicle 100 can include wings 220 and rear stabilizers 240. Referring to FIGS. 26A-26F, example isometric views of the vehicle 100, with deployed wings 220 are depicted. FIGS. 26A-26F depict the vehicle 100 is in flight mode with the wings 220 and rear stabilizers 240 fully deployed. The rear stabilizers 240 and mechanical flaps 242 can be used to provide stability when the vehicle 100 is in airplane mode. In some embodiments, when the vehicle 100 is in plane mode and is at speeds over 80 mph, the power to the front fenders 110 can be lowered significantly and possibly turned off when the vehicle 100 is flying at speeds over 150 mph as the wing 220 surfaces at these speeds can enable the vehicle 100 to glide and only be powered by rear fenders 110 which are tilted to vertical position providing forward thrust. This mode can be activated for traveling distances greater than 5 miles in open spaces and higher speeds.

Figure 27A:
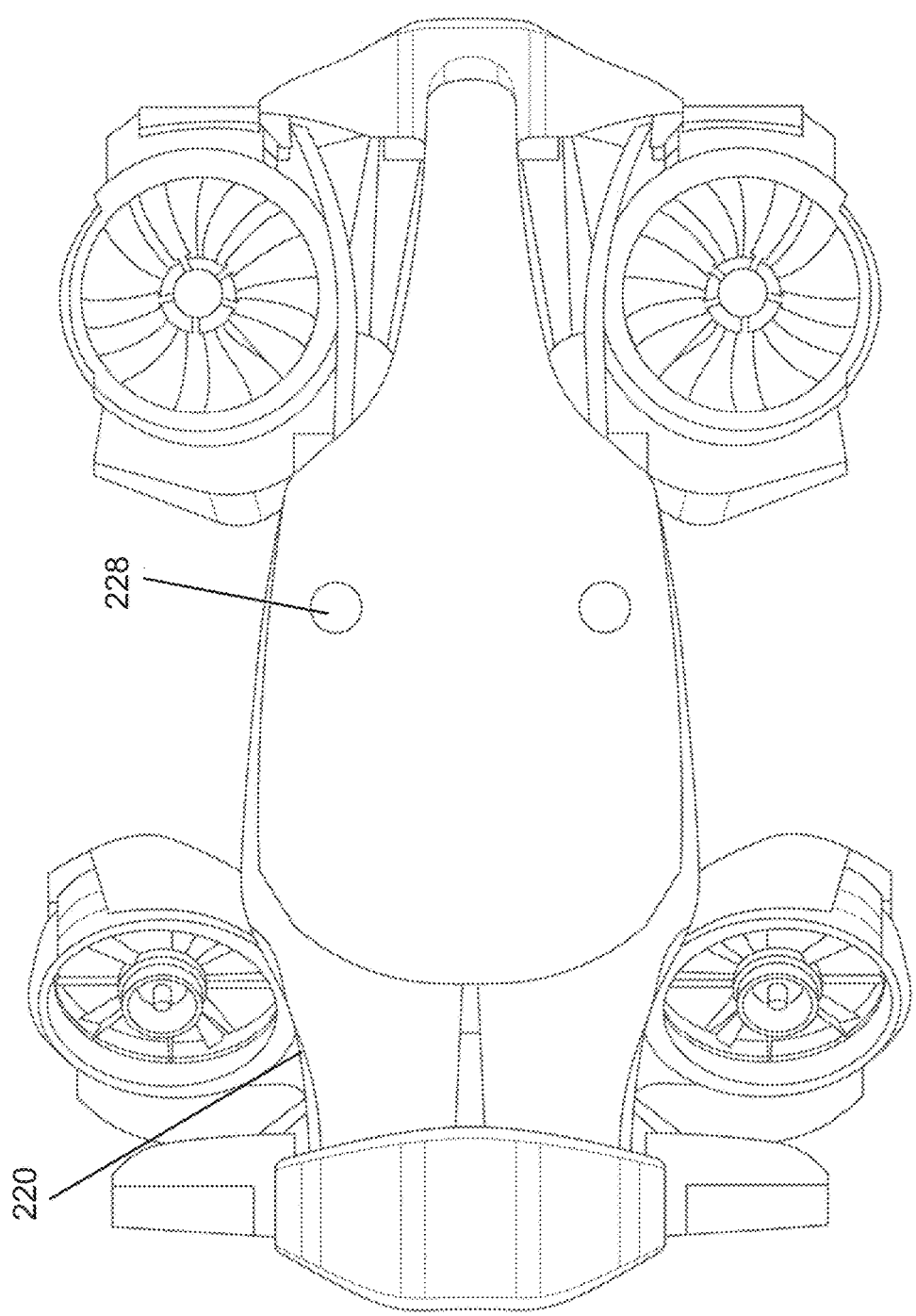
FIGS. 27A, 27B, and 27C depict isometric views of example embodiments of the underside of the vehicle with the wings deployed, in accordance with the present invention.
Figure 27B:
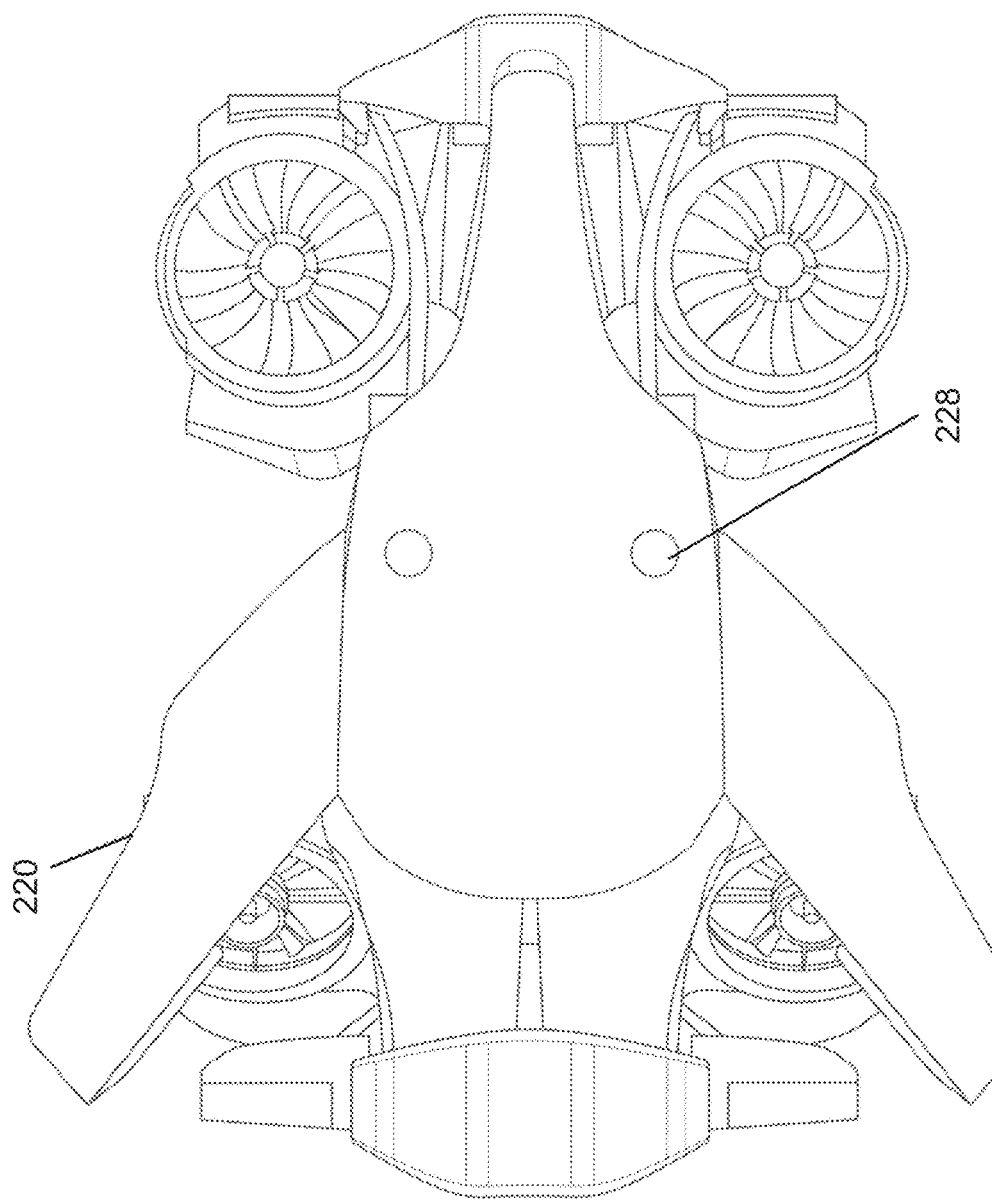
Figure 27C:
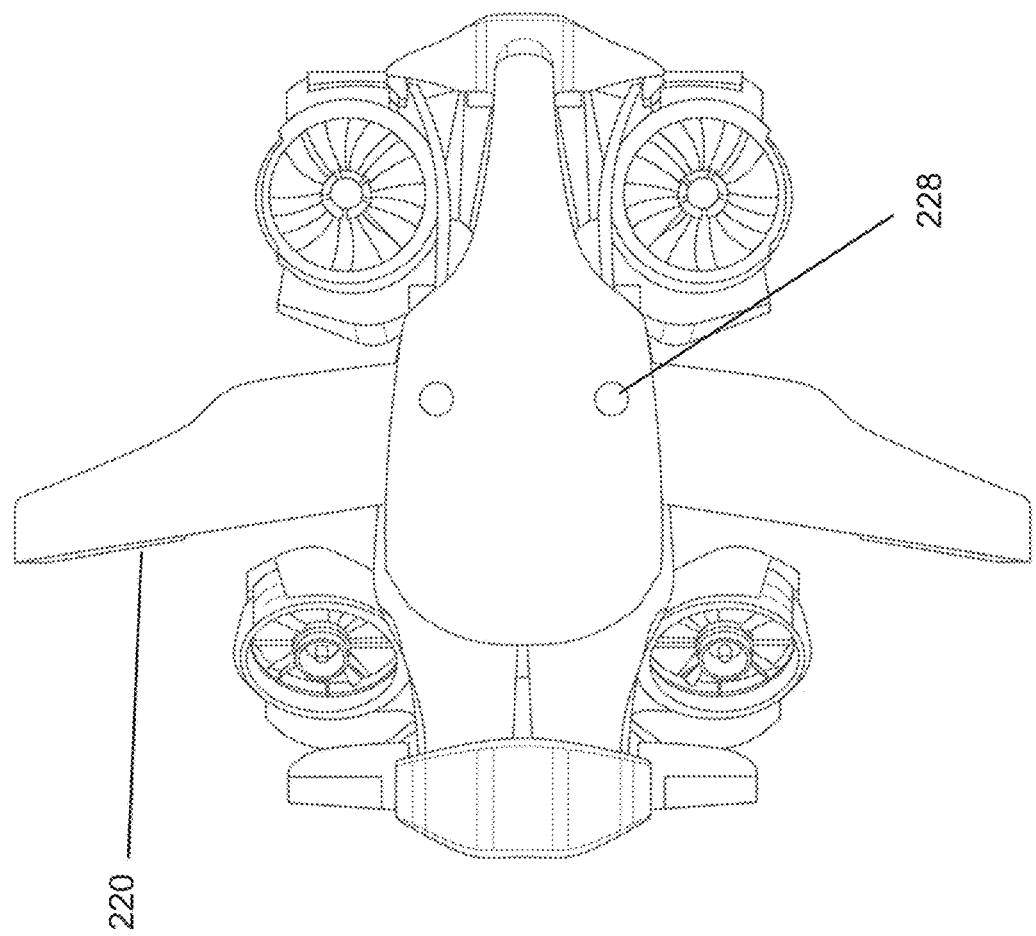

Referring to FIGS. 27A-27C, in some embodiments, the vehicle 100 can be equipped with retractable wings 220 for storage within the body of the vehicle 100 during drive mode and deployed during flight mode to assist during flight. For example, while the vehicle 100 is airborne and moving forward using just fenders 110 a semi-box wing 220 can be deployed by swivel motion with a pivot point 228 built into the fuselage floor. The use of wings 220 can enable the vehicle 100 to generate lift at speeds over 80 mph, extend range, and provide additional safety feature. FIGS. 26A-28C depict various implementations of wings 220 for the vehicle 100. The addition of the wings 220 can increase the performance of the vehicle 100 during flight. For example, the same vehicle 100 configuration without wings 220 may be used for flight with fenders 110 alone for five miles while with wings 220 it may be used for flight up to 50 miles.

Referring to FIGS. 27A-27C, a below view of the vehicle 100 with retractable wings 220 is provided. FIGS. 27A-27C show an example progression of the wings 220 being deployed about a hinge mechanism (pivot point) 228 is depicted. The hinge mechanism (pivot point) 228 enables the deployment of wings 220 from the main body of the vehicle 100. In some embodiments, the hinge mechanism can be powered by individual electric motors connected to the hinge mechanism 228 coupled to cogged wheels configured to turn against each other to cause the wings 220 to extend. The entire mechanism can also be installed on a slider moving in linear motion from front to the rear. This mechanism can be designed to maximize the length of the wing 220 under the fuselage and then allows them to position in the appropriate position after deployment. The wings 220 can be semi-box type wings 220 that can be designed to produce lift using its main surface as well as second horizontal extension. FIG. 27A depicts the wings 220 in a retracted state (e.g., during drive or quadcopter mode), FIG. 27B depicts the wings 220 in a partially deployed state 224 (e.g., transitioning from quadcopter into airplane mode), and FIG. 27C depicts the wings 220 in a fully deployed state 226 (e.g., during plane mode). In some embodiments, the wings 220 can be retracted to the undercarriage 100c of the vehicle 100, to a location within the body panels of the vehicle 100, within the frame 200 (e.g., between side support frames 204) of the vehicle, or a combination thereof.

Figure 28A:
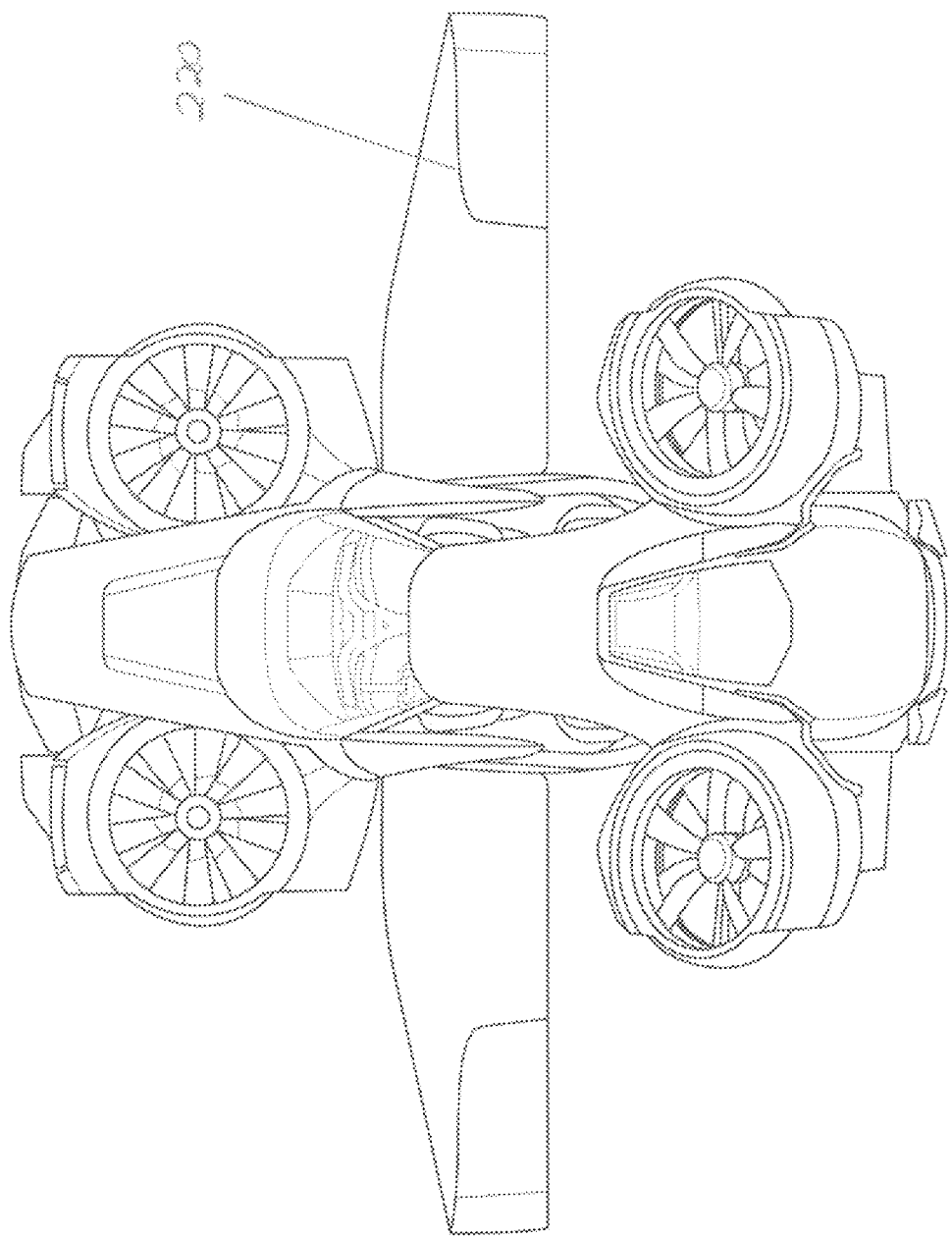
FIGS. 28A, 28B, and 28C depict isometric views of example embodiments of the topside of the vehicle with the wings deployed, in accordance with the present invention.
Figure 28B:
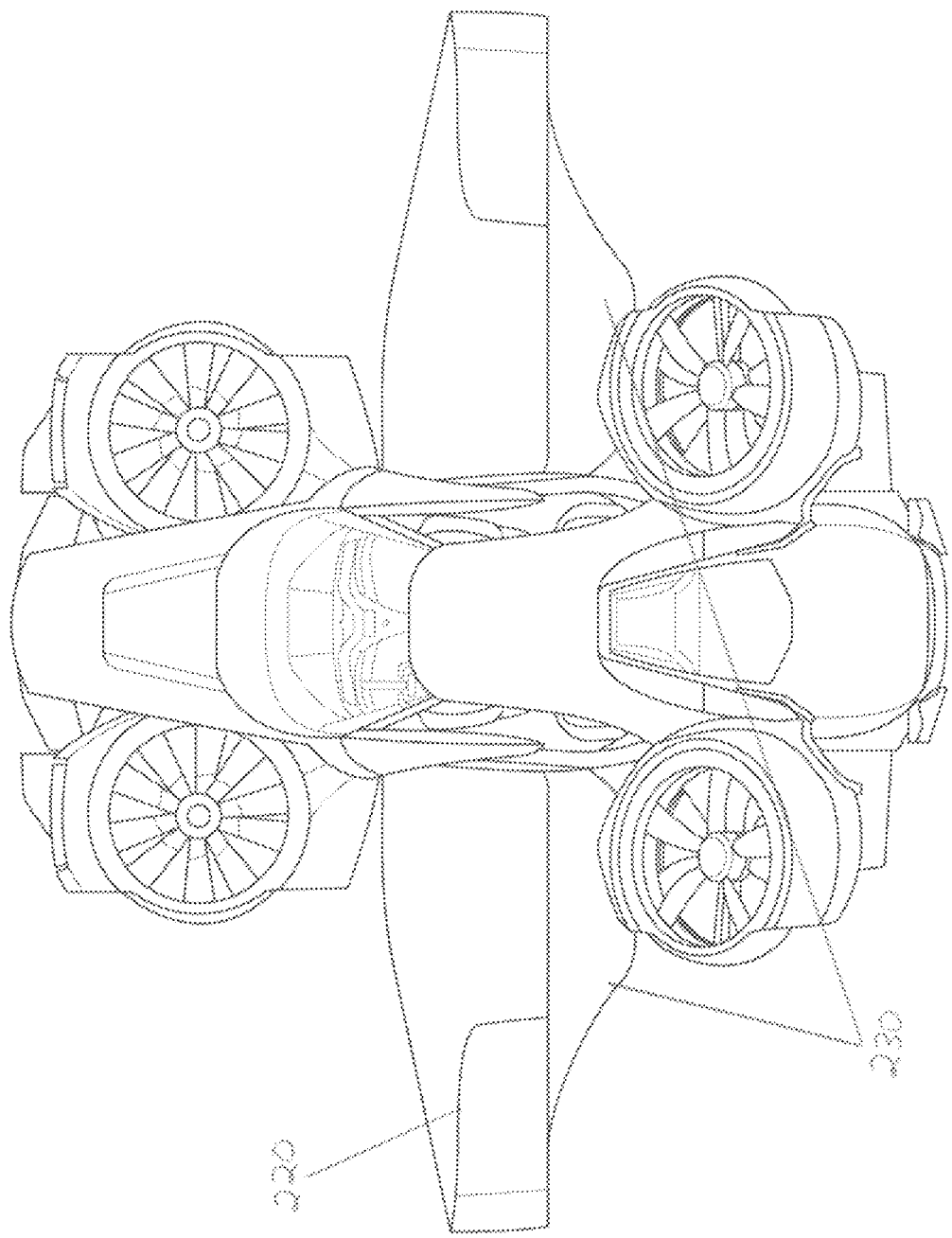
Figure 28C:
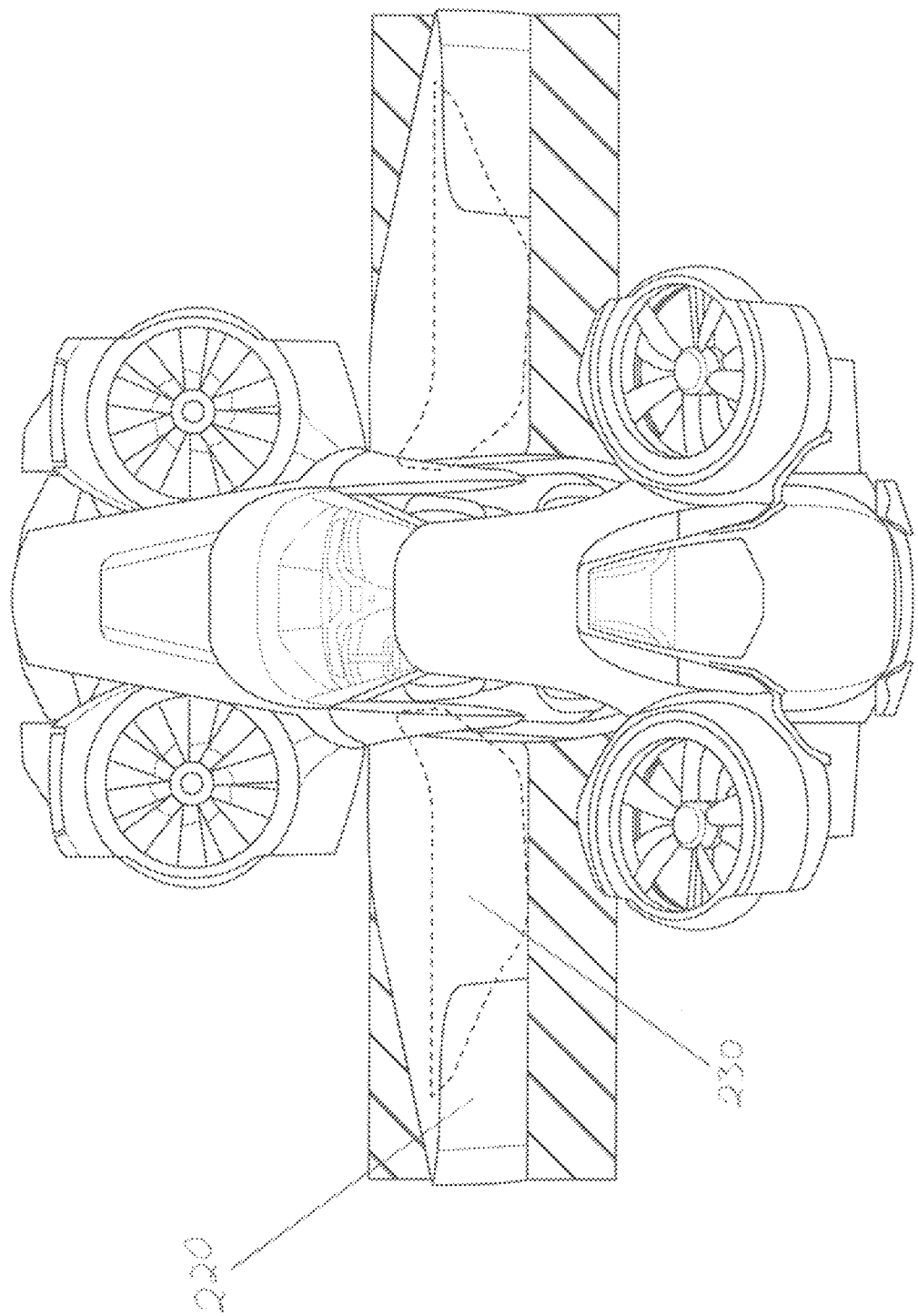

In some embodiments, referring to FIGS. 28A-28C, the wings 220 can include wing extensions 230 that are additional integral components of the main wing 220 and entirely housed within the main wing 220. The wings 220 and wing extensions 230 can be deployed differently during different modes of operation for the vehicle. For example, when the vehicle 100 is hovering is the quadcopter mode and is ready to transform into the plane mode, the wings 220 can being activated and the initiate rotating motion (e.g., about pivots 228) with their tips traveling outwards and forward. While the main wings 220 are being deployed the wing extensions 230 can also be activated at the same time using, for example, a simple pin and slide mechanism installed in the wing 220 which require no additional powering. The extensions 230 can be mounted onto linear sliders equipped with bearings for smooth linear movement. In some embodiments, a pin bracket built into the frame 200 allows the extensions 230 to be pulled out of the main wing 220 as the main wing rotates outwards 220. The wing extensions 230 can be designed to provide additional lift therefore enhancing flight characteristics as well as range.

Referring to FIG. 28A depicts an isometric embodiment of the top the vehicle 100 in airplane mode with wings 220 fully deployed with no extensions. FIG. 28B depicts an isometric embodiment of the top of the vehicle 100 in airplane mode with wings 220 fully deployed with extensions 230 fully deployed. FIG. 28C depicts an isometric embodiment of the top of the vehicle 100 in airplane mode, exemplifying the outline of the wing extension 230 located inside of the wing 220 prior to deployment. 187. The rectangle is shown to help measuring the distance the extension travel outwards and to calculate how much more lift, they can provide.

In some embodiments, the vehicle 100 can be equipped with rear stabilizers 240. The rear stabilizers 240 can be installed at the rear 100a bottom of the vehicle 100 and can be designed to further enhance the flight performance. While the vehicle 100 is driven the rear stabilizers 240 can serve as an outline panel visually framing the rear 100a of the vehicle 100. After transformation into flight mode, the rear stabilizers 240 can become fully functional rear stabilizers 240 with additional components deployed to the side consisting of mechanical flaps 242 capable of moving up and down vertically. Additionally, the rear stabilizers 240 can be designed to help stabilize the vehicle 100 in the air and work in conjunction with the fenders 110 for precise maneuvering.

Figure 29A:
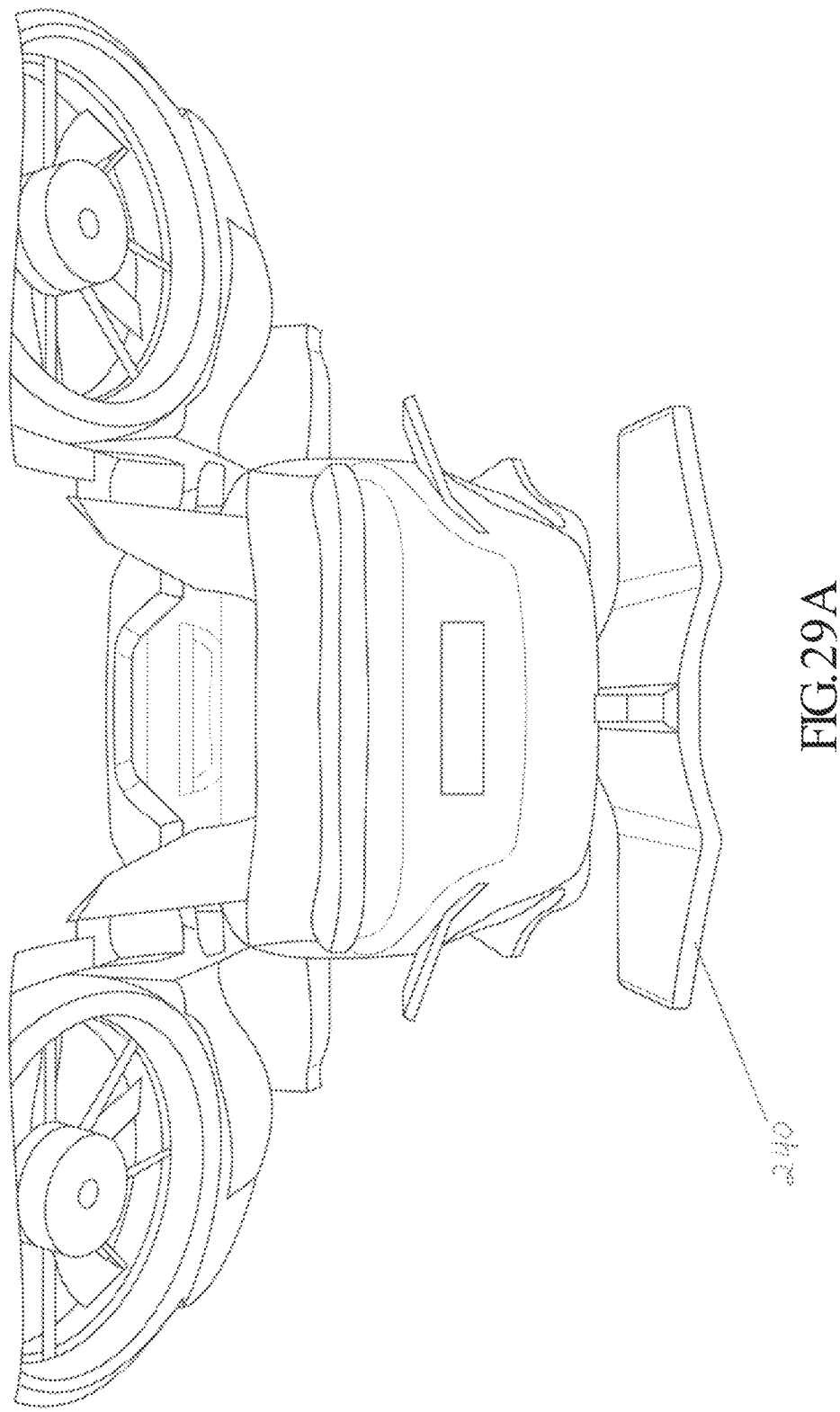
FIGS. 29A, 29B, and 29C depict an isometric view of example embodiments of the rear stabilizers and mechanical flaps of the vehicle, in accordance with the present invention.
Figure 29B:
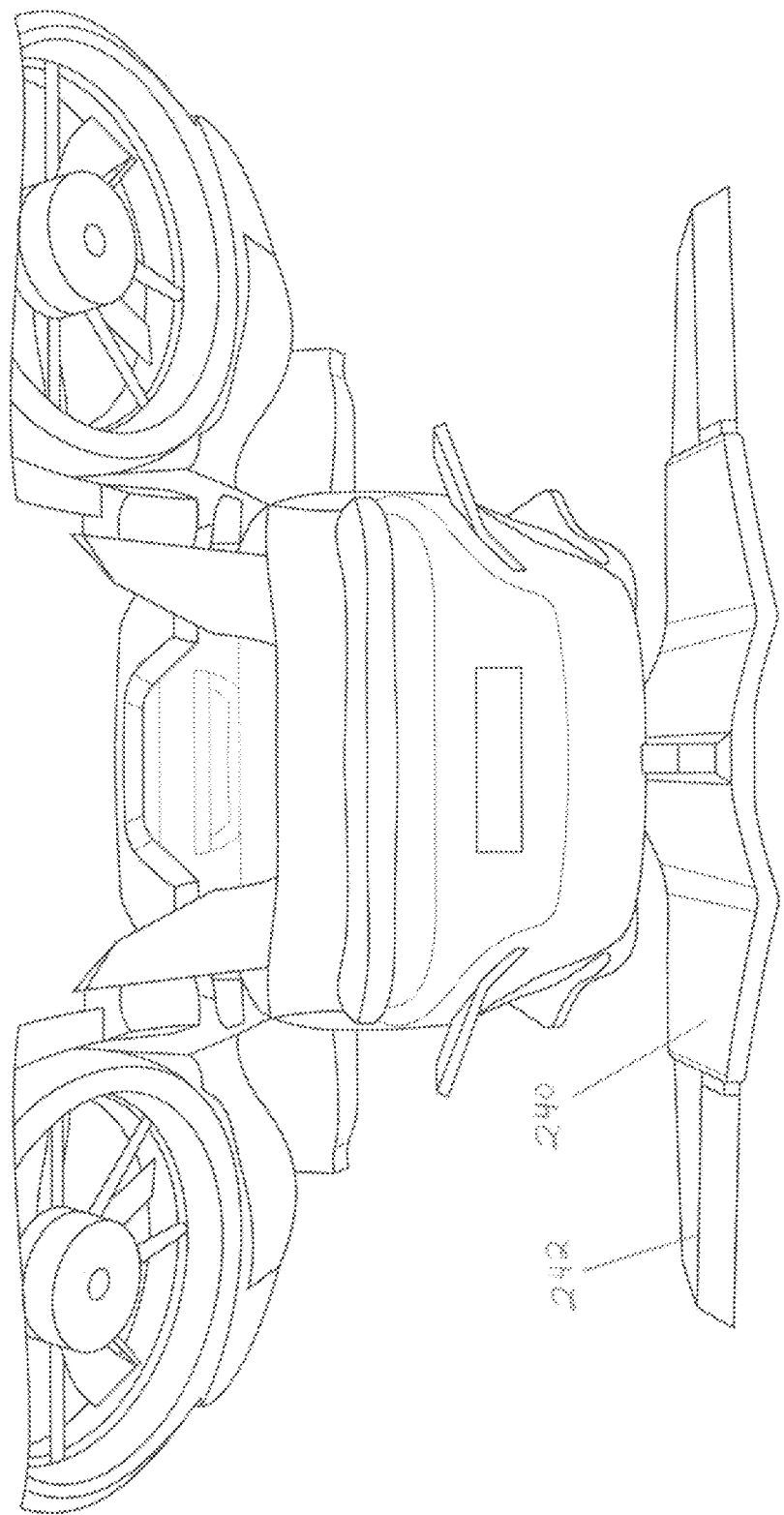
Figure 29C:
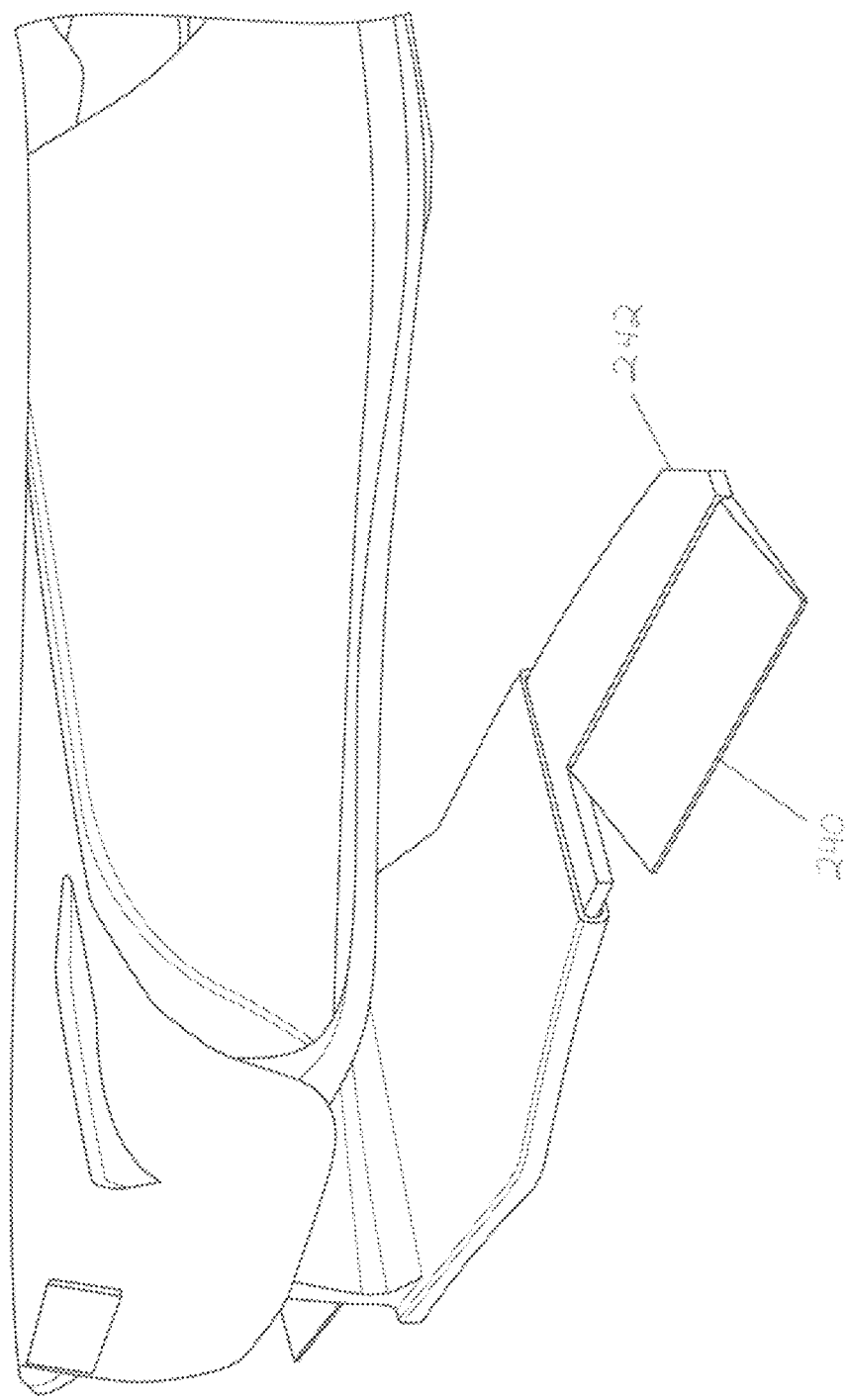

Referring to FIGS. 29A-29C, the components of an exemplary rear stabilizers 240) section is depicted. In some embodiments, the rear stabilizers 240 can include retractable mechanical flaps 242, as depicted in FIGS. 29B and 29C. In some embodiments, the mechanical flaps 242 can be part of retractable rear stabilizers 240 installed within the rear stabilizers 240. The rear stabilizers 240) and mechanical flaps 242 can be designed to slide in and out using linear actuators when the vehicle 100 is in the plane mode. The retractable rear stabilizers 240 can be deployed then the vehicle 100 transforms into a plane mode. The retractable rear stabilizers 240 can be also designed to provide additional lift at speeds over 80 mph.

In some embodiments, the vehicle 100 can include a centralized management system that can include specially developed software configured to co-ordinate all flight control mechanisms during flight mode. Depending on the selected length of trip, for example, the centralized managements system can determine the most efficient way to reach the destination and inform all mechanical units to act accordingly. In some embodiments, this can include selecting specific flight mode subroutines or operational modes, such as for example, a quadcopter mode or a plane mode. Each of the flight mode subroutines or operational modes can include specific combinations of operations for the vehicle 100, including but not limited to orientations of the wheels 102, height of flight, speed of flight, etc. The centralized managements system can also combine the subroutines or operational modes for a particular trip, for example, centralized managements system can initiate a quadcopter mode for take-off/landing followed by plane mode for traversing. Similarly, during the flight the centralized managements system can optimize at which safe height and speed to travel sending electronic signal to all mechanical components to optimize for efficiency and safety based on the environment, obstacles, weather, etc. In some embodiments, the centralized managements system can also determine the safest approach whilst descending the vertiport and co-ordinate by communicating with other crafts aiming at the same landing zone or port. The centralized managements system can adjust a plan based on information obtained from other crafts. For example, if a line for a particular landing zone seems to be too long, then the system can select next nearest zone to land.

In some embodiments, the vehicle 100 can be equipped with an automated driving mode with navigation system that is configured to operate in a conventional manner in drive mode and transform operation in flying mode. For example, the vehicle 100 can operate as a manually driven car and when it transforms into a flight mode it becomes fully autonomous. In automated flying mode, the vehicle 100 can be configured to utilize the existing GPS to follow a same route as the vehicle 100 was being driven on the street, except it will be flying up to approximately 500 feet above the ground at up to approximately 150 mph and because it can fly on several different levels there is no traffic nor traffic lights for approximately 100 miles.

In operation, the vehicle 100 can transform between drive and flight mode and to different variations within those modes (e.g., quadcopter mode and plane mode). When the vehicle 100 is operating in drive mode, the vehicle 100 can use electric power from battery storage, which can power driving motors 118 installed in each wheel fender 110. For manual acceleration and deceleration, the driver can use a set of pedals (accelerator pedal, brake pedal.) to drive the vehicle 100 on the ground. For a transmission, the vehicle 100 can operate using one gear forward and one gear in reverse or it can use a traditional multi-gear gearbox.

Although the present disclosure discusses using different combinations of motors, for example, electrical based motors and power, the vehicle 100 could use any combination of electrical and combustion based motors, engines, etc. without departing from the scope of the present disclosure. Additionally, the different motors, (e.g., driving motors 118, steering motors 212, hinge motors, etc.) can be the same type of motors or a different combination of motors. For example, the driving motors 118 can designed for using propulsion of wheels 102 and propellers 116 by using 11-inch diameter motors and the steering motors 212 can designed for drive mode steering only by using 2-inch diameter motors.

For example, the vehicle 100 can be an all-electric vehicle powered by solid state battery pack with a solar coating applied subsequently over the entire vehicle. In this configuration, the main battery pack can power eight electric driving motors at 100 Kw each. The eight electric driving motors can all produce approximately 800 Kw/1000 HP, which is the power required for take-off and landing. The amount of power required for drive mode can be approximately 400 HP. In this configuration, only four of the eight driving motors would be needed to deliver power to the tires. The amount of power required for plane mode can be approximately 300 HP because only the four driving motors in the rear fenders may be used to deliver the thrust. Alternatively, in hybrid example, the battery pack can power the same eight 100 kw driving motors for take-off and landing. For a hybrid, when transitioned from quadcopter mode into the plane mode, the power supply can be switched from the battery to 300 HP combustion motor. This configuration can ensure longer flight time for longer distances. Drive mode can be operated from both sources.

The vehicle 100 can use a combination of steering mechanisms, including any combination of mechanical and/or electrical steering (e.g., drive-by-wire). In some embodiments, the vehicle 100 can use an electrical steering mechanism to send signals to steering motors 212 for turning the fenders 110 in a desired direction, such that it does not require a traditional steering wheel and/or steering column. For example, the steering wheel 108 can be connected to set of switches with pressure points, which receive signals on the position of the steering wheel, as well as how much pressure has been used on the steering wheel by the driver for a maneuver. The operation of the steering wheel 108 can also be configured for ease of use, for example, limiting the rotation of the steering wheel 108 to 45-60 degrees in each direction from the center. Depending on the amount of pressure applied on the steering wheel 108 by the driver for a maneuver (small electric motors for steering) will receive signals via software and motor controls will translate this into amount of RPM required for this maneuver. e.g. when turning slowly into a parking spot, the (electric motors for steering) will spin much faster than when changing lanes on the highway because the wheels are required to make much tighter turn (e.g., how much the inner ring 214b will travel against outer ring 214a). In some embodiments, the steering mechanism can transform in form and function along with the transformation of the vehicle 100 itself. For example, the steering wheel 108 can be collapsible such that it will collapse into the dash when converting from drive mode to flight mode. Similarly, when vehicle is driven in a fully autonomous mode the vehicle can be operated automatically such that the steering wheel is disengaged and retracted into the dashboard.

During drive mode, the vehicle 100 can implement any combination of braking mechanisms to slow and/or stop movement of the vehicle 100 on a given surface. For example, the vehicle 100 can implement regenerative braking takes place when the vehicle 100 is cruising without applying acceleration and during regen braking, the driving motors 118 recharge the batteries. In another example, the vehicle 100 can implement mechanical braking that takes place when the driver presses the brake pedal and electromagnetic brakes built into the duct 112 create magnetic force used to slow down the ring to which the tire is mounted, thus stopping the tire from spinning and bringing the vehicle to stop.

A user can initiate the transformation process to transition the vehicle 100 from drive mode to flight mode using any combination of processes. For example, when at a safe location to transform the vehicle 100 for vertical takeoff (e.g., a vertiport), the vehicle can be placed in park and the user can enter a command to initiate the transformation, (e.g., by pressing a mechanical button or on-screen button). In response to receiving a command to initiate transformation, the vehicle 100 software can initiate all system in preparation for transformation. In some embodiments, before starting transformation, the vehicle 100 can verify that the vehicle 100 is at a safe location, can auto align the front wheels 102 into a straight orientation (e.g., via the motor casings 216), and the wheels 102 can be locked in place. The vehicle 100 software can perform a number of safety calculations prior to full transformation. For example, the software can calculate the current full weight of the vehicle 100 using built in sensors and determine its maximum takeoff weight, can calculate appropriate position of the vehicle using built in sensors and cameras, can download pre-flight information such as weather, flight paths, regulations, directions, etc. The drive can also input data (e.g., using a touch screen in the dash) for the software to use in the pre-flight calculations/determinations. For example, the driver can select an available destination (e.g., a destination vertiport) to travel to and the software can calculate the battery capacity/fuel tank capacity/other emerging alternate energy solutions (hybrid version) and assures that the distance between the destination can be completed without issue. The software can also take into account the weather, wind patterns, etc, when determining how much battery capacity will be needed.

Once the vehicle 100 software determines that it is safe for flight, the software can activate the jacks stands 218 to lift the wheels 102 of the vehicle 100 off the ground (e.g., approximately 2 inches). Once lifted the vehicle 100 can begin the transformation process by engaging with tilting mechanisms (e.g., shock/tilt assembly 210) for the front and the rear fender mounts 206, 208. For example, as discussed herein, the shock/tilt assembly 210 can be activated after the linear actuator 258 receives the signal form the vehicle software. The linear actuator 258 can then extend its shaft downwards forcing the main tilting arms 254, 256 of the front fenders 208 to push the lower wishbone arms 208a outward and upward using double motion hinge mechanism. This results in the front fenders 110 being rotated about 90 degrees from vertical wheels 102 to horizontal thrusters or propellers 116. At substantially the same time, the rear suspension mechanism can receive signals from the software and the steering motors 212, installed in swing arms of the rear fender mounts 206, power both left and right rear fenders 110 to rotate about 90 degrees from vertical wheels 102 to horizontal thrusters or propellers 116.

With all of the fenders 110 rotated to a substantially horizontal positioning (e.g., as shown in FIGS. 17B and 18B) all the tires 114 can be disengaged from the driving motors 118 using a shaft/clutch mechanism allowing all the driving motors 118 to dedicate their power exclusively into the counter acting propellers 116 located within the fenders 110. Once the propellers 116 have been brought up to the required RPM, the vehicle 100 can begin to lift off and transition into hovering mode. In hovering mode, the vehicle 100 relies entirely on the software system to provide the right location coordinates and select appropriate altitude and speed to reach the destination. In some embodiments, the software system can also determine if the destination is to be reached using only hover "(quadcopter mode") mode or the vehicle 100 needs to transform in the "plane mode". For example, when determining that destination is further away than 5 miles the software system can determine an optimum time, altitude and speed in which the vehicle 100 needs to travel and can initiate a command to transform form the" quadcopter mode" to the "airplane mode." For landing, the design of the vehicle 100 allows for an optional variable pitch propeller is to be used in which the acceleration and deceleration can be achieved by adjusting the RPM of the driving motors 118.

Once the system determined the vehicle 100 is ready for transformation from "quadcopter mode" to airplane mode the vehicle 100, using the driving motors 118 mounted in the pivotably joint between freewheel casing and swing arm tilts the rear thruster towards the front to provide forward thrust without necessity of tipping the nose of the vehicle 100 downwards to gain speed. The determination to transfer from quadcopter mode to plane mode can be based on a distance to a destination. For example, when planning the trip to destination greater than five miles, the system can develop a trajectory path, determine points of transition and time in each mode required, and when reaching a certain point established by the software, (e.g., altitude and speed) the vehicle 100 can transition midair from quadcopter mode to plane mode, maximizing on time and distance achieved At this point system sends electronic signal to wing deployment motors (not depicted) installed in the floor of the vehicle 100 at the pivot point of the main wings 220. The main wings 220 then deploys in turning motion forward, whilst deploying wing extensions 230 simultaneously. From this moment onwards, the vehicle 100 can operate in airplane mode. Whilst in airplane mode the vehicle 100 can continue to gain speed and when it reaches speed of approx. 80 knots the wing 220 is calculated to generate lift and this way the vehicle 100 can cruise using both lift from the wings 220 and rear stabilizers 240 as well as propulsion form the rear propellers 116 now tilted approx. 90 degrees forward with full forward thrust. Once speeds over 100-150 knots are achieved and the air vehicle 100 can rely fully on its wing 220 for lift, with the rear propellers 116 providing full forward thrust the vehicle 100. When in plane mode, the vehicle 100 can disengage the front propellers 116 and direct the majority of the power to rear propellers 116, thus saving a significant amount of power.

In some embodiments, a transportation vehicle configured for transforming between a drive mode and a flight mode is provided. The vehicle includes a chassis with a body coupled thereto and a plurality of fenders coupled to the body. Each of the fenders includes a rim having spokes and a tire configured to rotate during drive mode, a suspension configured to pivot the plurality of fenders from a substantially vertical orientation during drive mode to a substantially horizontal orientation during flight mode, a propulsion mechanism configured to rotate independently of the rim to generate lift during flight mode, and a motor configured to independently provide rotational force to a tire built into the rim during drive mode and rotational force to the propeller mechanism during flight mode. The plurality of fenders are substantially vertical during drive mode and substantially horizontal during flight mode. The propulsion mechanism can be at least one of a propeller or a turbine. The suspension can be configured to absorb impact in a vertical motion during drive mode. The suspension can be one of a front suspension or a rear suspension. The front suspension can provide support between the main frame and the wheel fenders 110. The rear suspension can include a swing arm configured to absorb the vertical impact in drive mode and tilt a position of the fender 110 in flight mode for forward or reverse propulsion. The vehicle can be designed to transform and operate in different modes, including drive mode, flight mode, quadcopter mode, and airplane mode.

Figure 30:
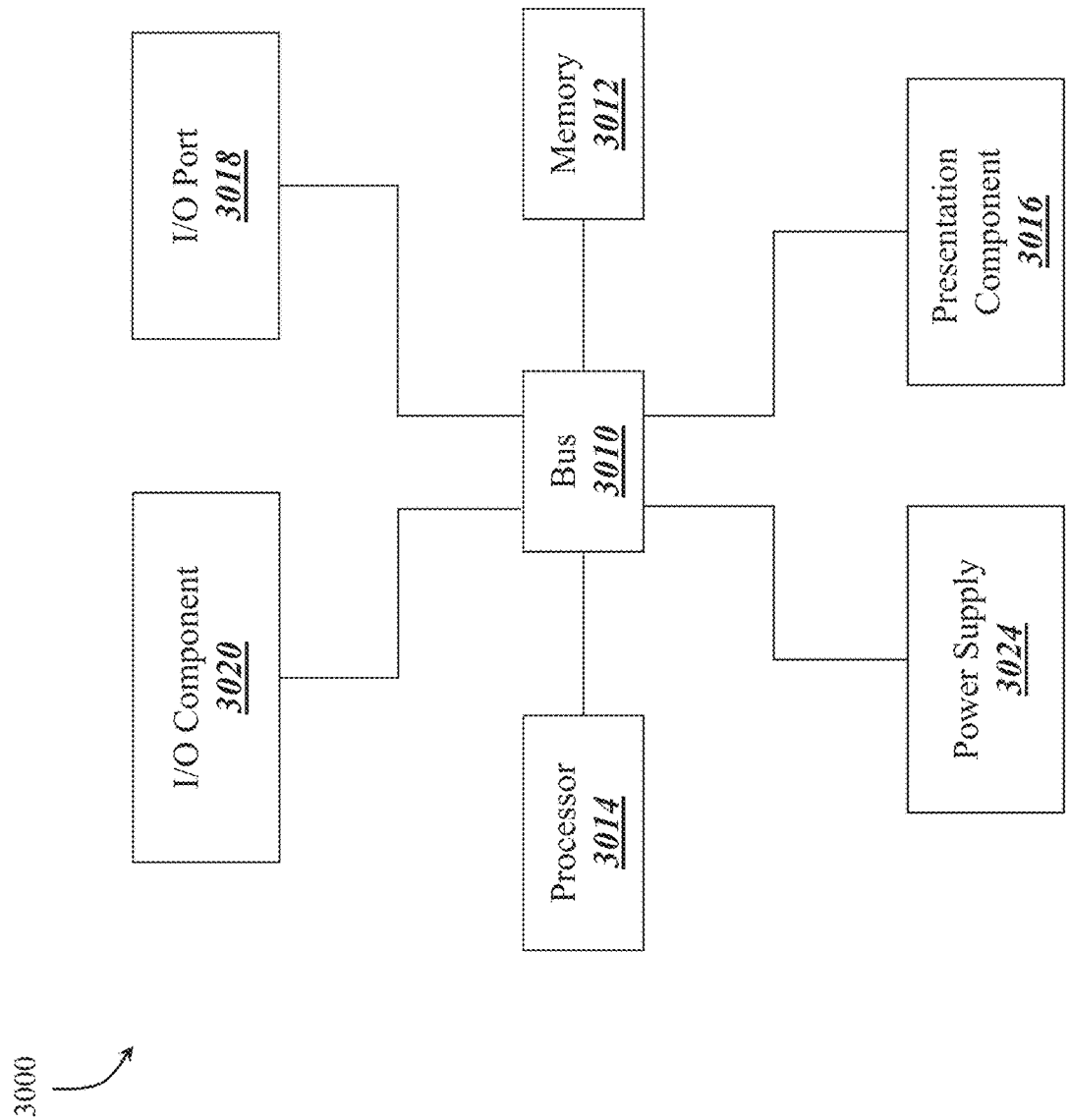
FIG. 30 depicts a diagrammatic illustration of a high-level architecture for implementing systems and processes, in accordance with aspects of the invention.

Any suitable computing device can be used to implement the computing devices and/or systems discussed herein and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 3000 is depicted in FIG. 30. The computing device 3000 is merely an illustrative example of a suitable computing environment and in no way, limits the scope of the present invention. A "computing device," as represented by FIG. 30, can include a "workstation," a "server," a "laptop," a "desktop," a "hand-held device," a "mobile device," a "tablet computer," or other computing devices, as would be understood by those of skill in the art. Given that the computing device 3000 is depicted for illustrative purposes, embodiments of the present invention may utilize any number of computing devices 3000 in any number of different ways to implement a single embodiment of the present invention. Accordingly, embodiments of the present invention are not limited to a single computing device 3000, as would be appreciated by one with skill in the art, nor are they limited to a single type of implementation or configuration of the example computing device 3000.

The computing device 3000 can include a bus 3010 that can be coupled to one or more of the following illustrative components, directly or indirectly: a memory 3012, one or more processors 3014, one or more presentation components 3016, input/output ports 3018, input/output components 3020, and a power supply 3024. One of skill in the art will appreciate that the bus 3010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 30 is merely illustrative of an exemplary computing device that can be used to implement one or more embodiments of the present invention, and in no way, limits the invention.

The computing device 3000 can include or interact with a variety of computer-readable media. For example, computer-readable media can include Random Access Memory (RAM): Read Only Memory (ROM): Electronically Erasable Programmable Read Only Memory (EEPROM): flash memory or other memory technologies: CD-ROM, digital versatile disks (DVD) or other optical or holographic media: magnetic cassettes, magnetic tape, magnetic disk storage or other magnetic storage devices that can be used to encode information and can be accessed by the computing device 3000.

The memory 3012 can include computer-storage media in the form of volatile and/or nonvolatile memory. The memory 3012 may be removable, non-removable, or any combination thereof. Exemplary hardware devices are devices such as hard drives, solid-state memory, optical-disc drives, and the like. The computing device 3000 can include one or more processors that read data from components such as the memory 3012, the various I/O components 3016, etc. Presentation component(s) 3016 present data indications to a user or other device. Exemplary presentation components include a display device, speaker, printing component, vibrating component, etc.

The I/O ports 3018 can enable the computing device 3000 to be logically coupled to other devices, such as I/O components 3020. Some of the I/O components 3020 can be built into the computing device 3000. Examples of such I/O components 3020 include a microphone, joystick, recording device, game pad, satellite dish, scanner, printer, wireless device, networking device, and the like.

Figure 32:
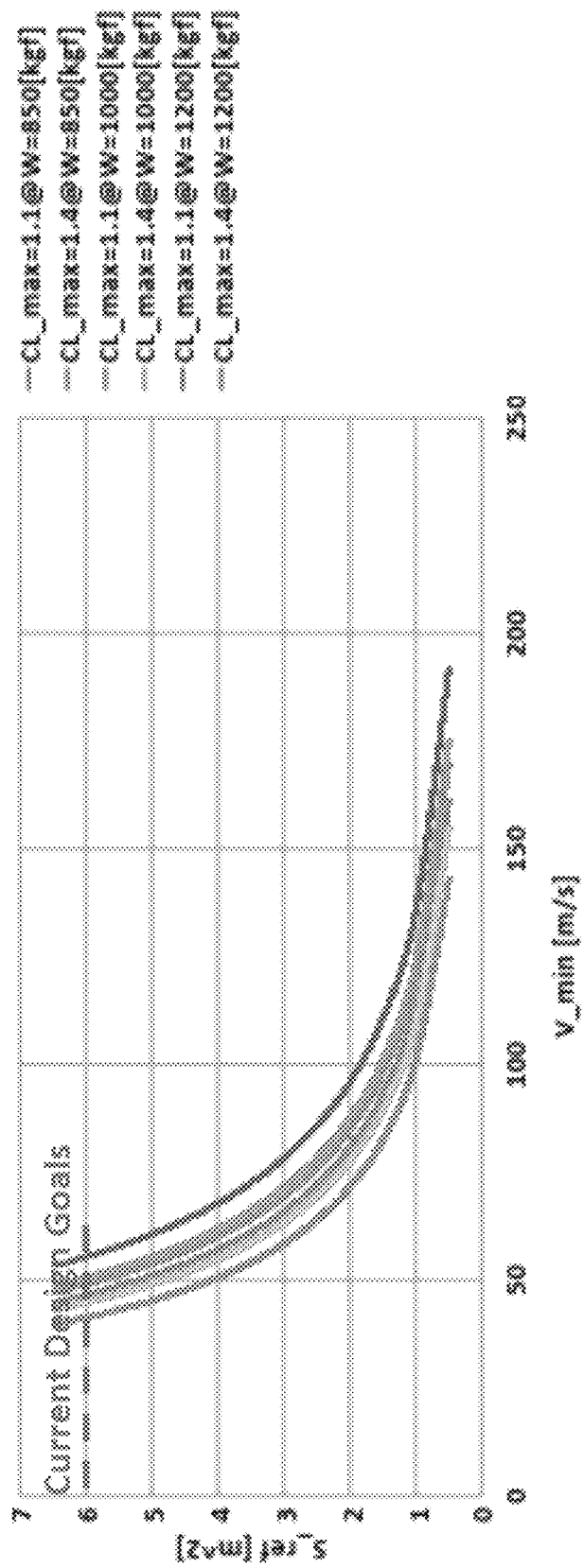
FIG. 32 depicts an exemplary chart for the minimum speed for the vehicle when transitioning from hovering mode to flight mode, in accordance with the present invention.
Figure 33:
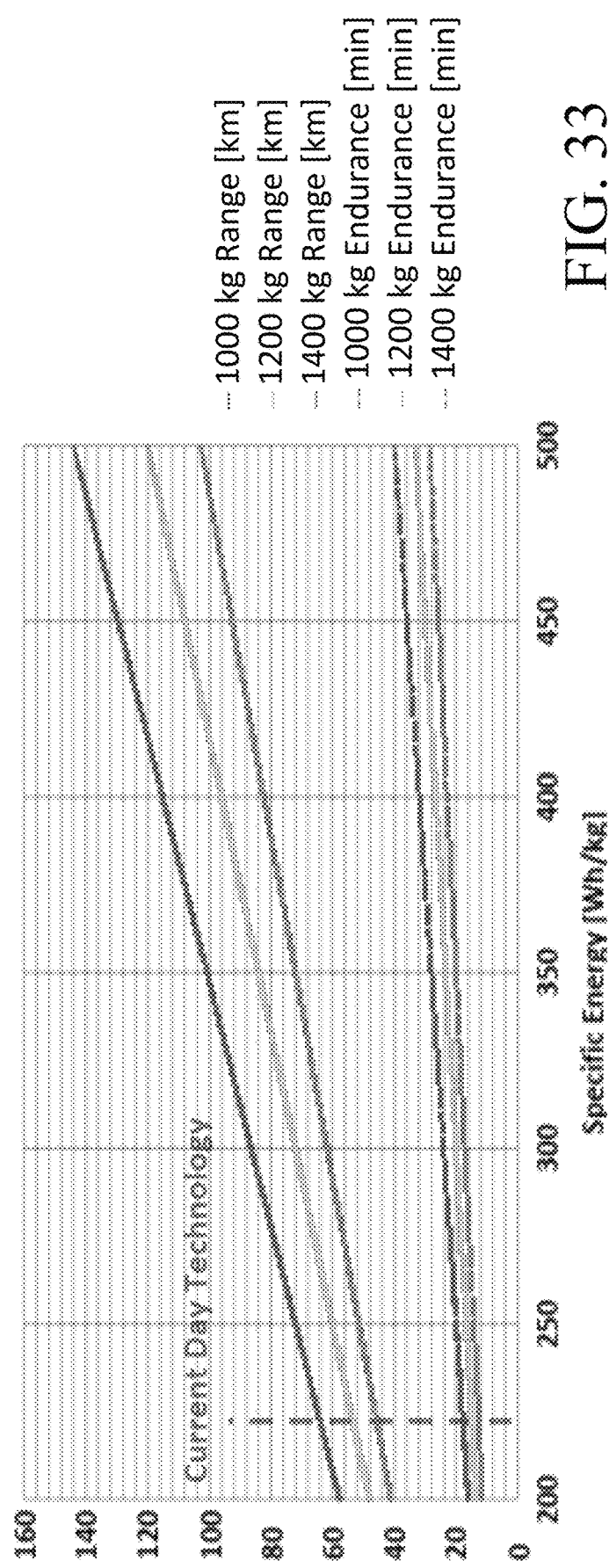
FIG. 33 depicts an exemplary chart for the maximum range and endurance for the vehicle while flaying without transitioning to hovering, in accordance with the present invention.
Figure 34:
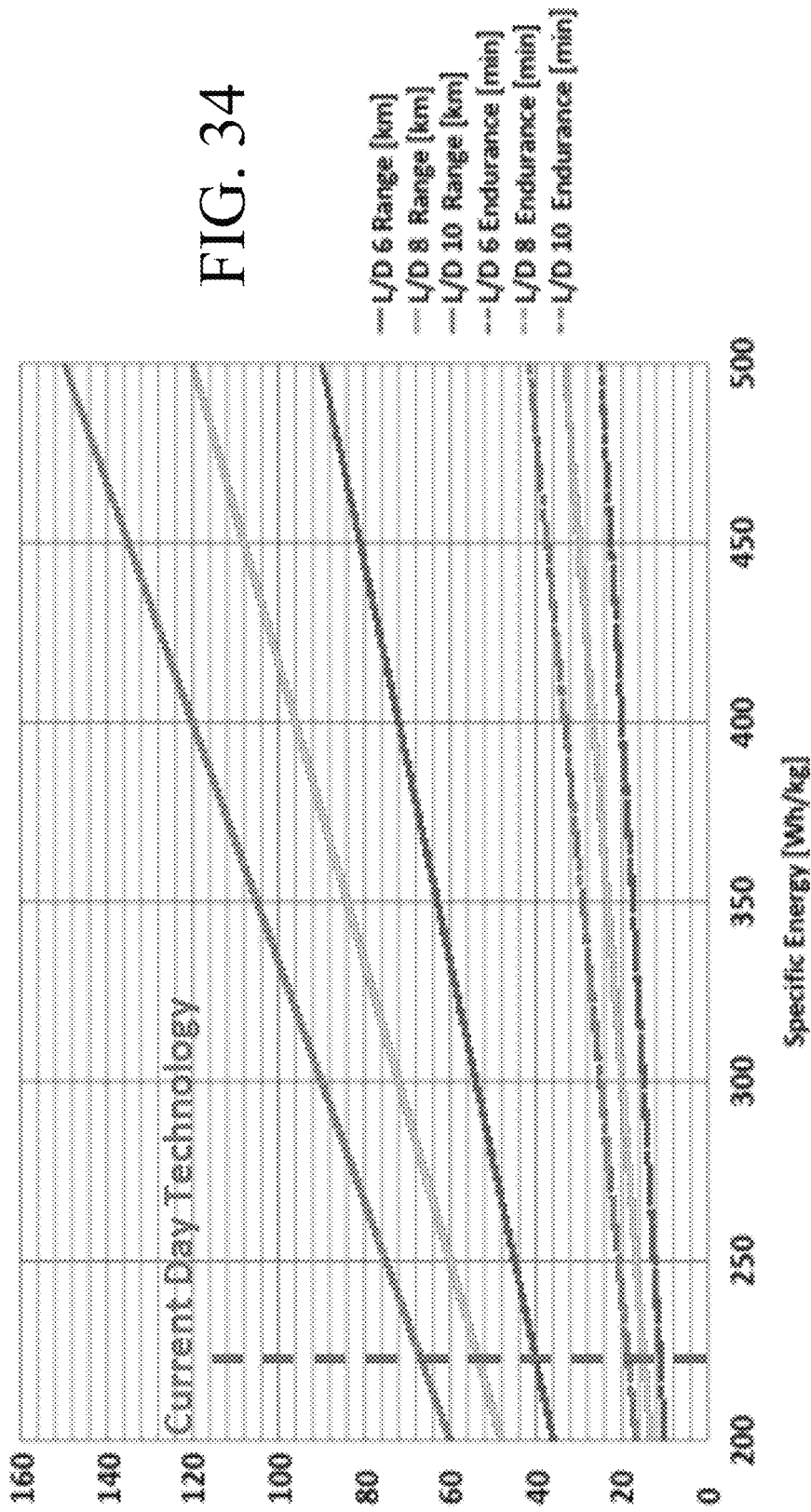
FIG. 34 depicts an exemplary chart for the light to drag ratio for the vehicle, with increasing the lift to drag ratio to increase performance, in accordance with the present invention.
Figure 35:
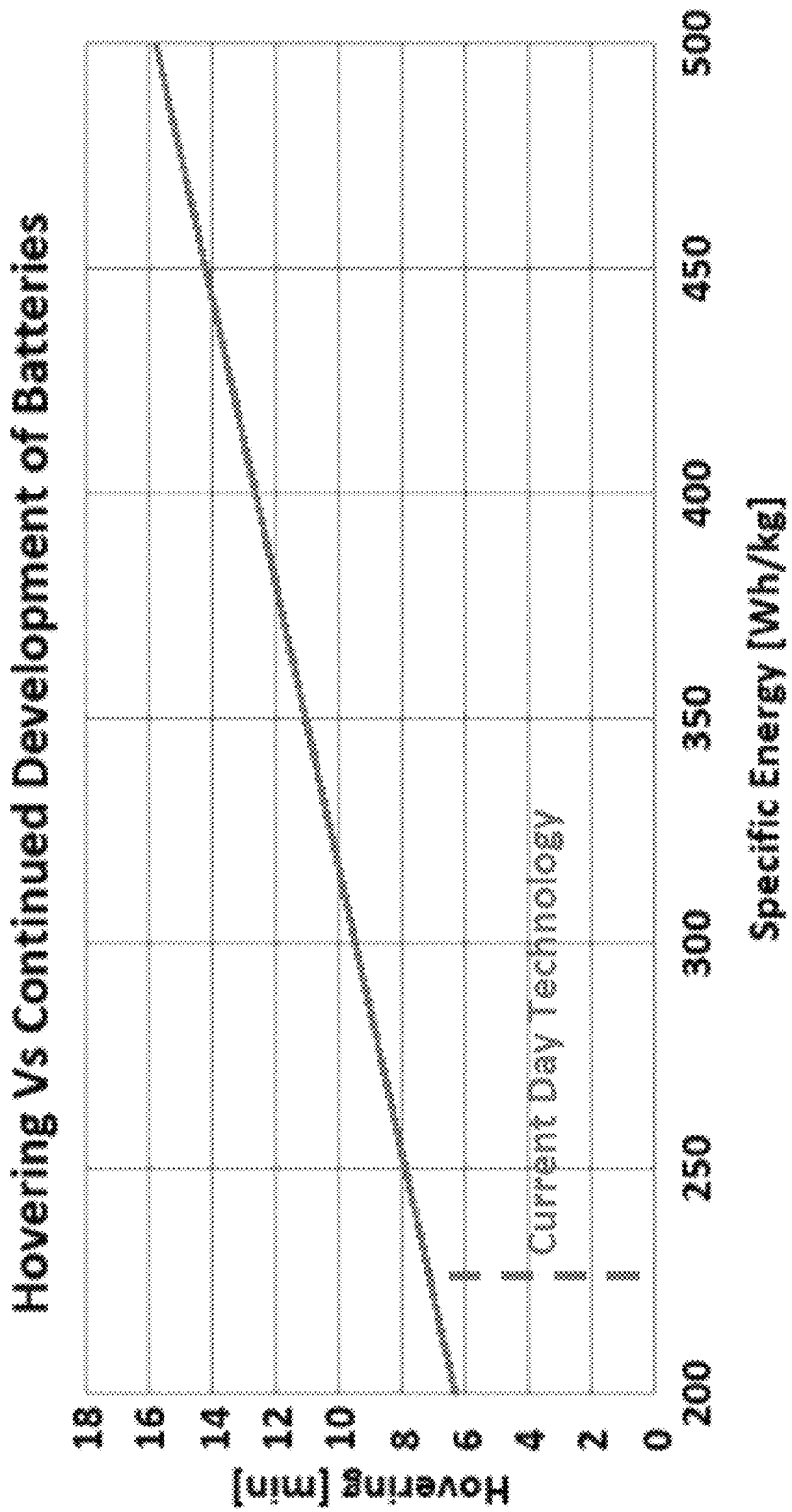
FIG. 35 depicts an exemplary chart for hovering time of the vehicle based on battery performance, in accordance with the present invention.
Figure 36:
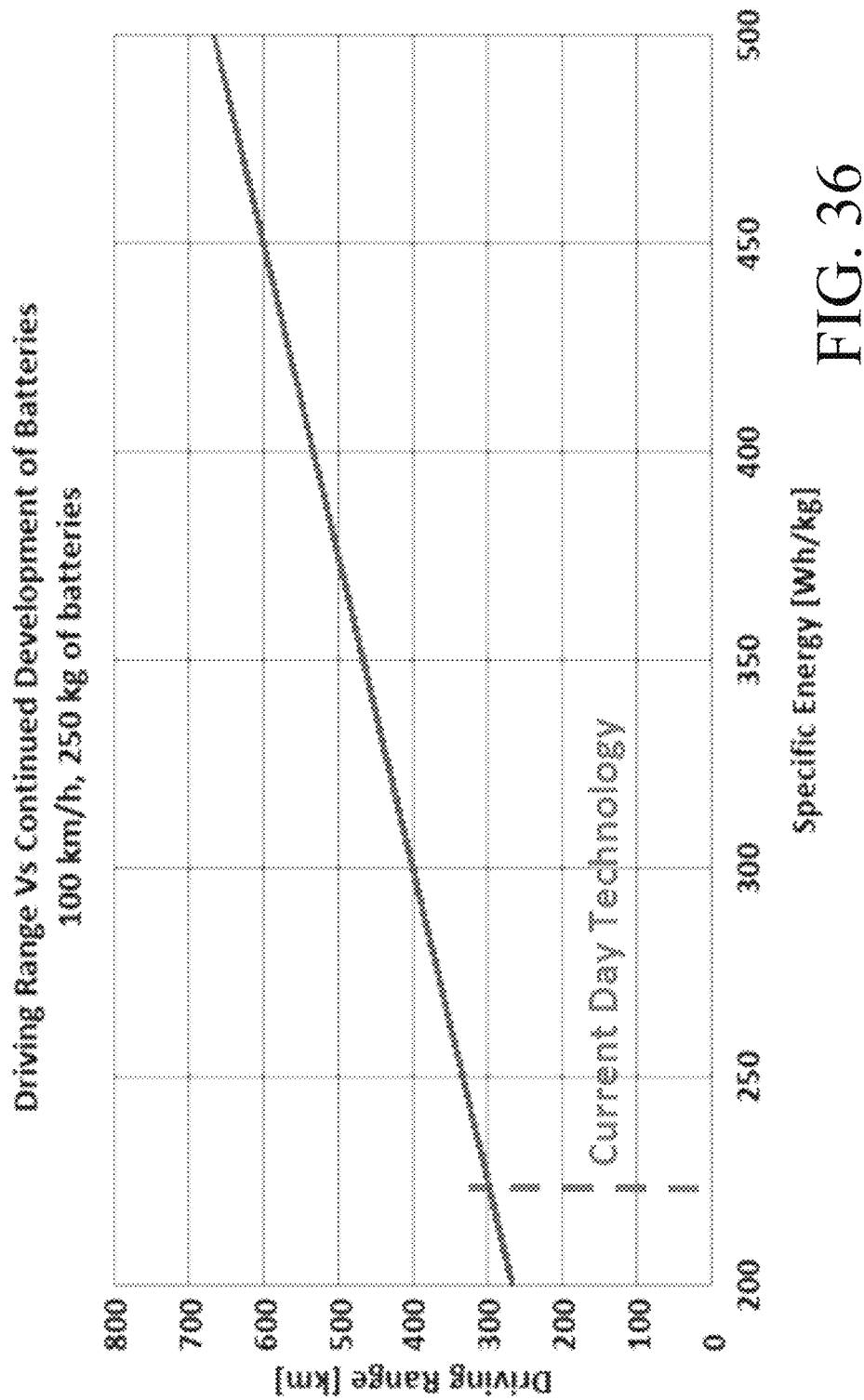
FIG. 36 depicts an exemplary chart for drive time of the vehicle based on battery performance, in accordance with the present invention.

FIG. 31 depicts initial weight goals and projected weight goals for the vehicle, in accordance with the present invention FIG. 32 depicts an exemplary chart for the minimum speed for the vehicle when transitioning from hovering mode to flight mode, in accordance with the present invention. FIG. 33 depicts an exemplary chart for the maximum range and endurance for the vehicle while flaying without transitioning to hovering, in accordance with the present invention. FIG. 34 depicts an exemplary chart for the light to drag ratio for the vehicle, with increasing the lift to drag ratio to increase performance, in accordance with the present invention. FIG. 35 depicts an exemplary chart for hovering time of the vehicle based on battery performance, in accordance with the present invention. FIG. 36 depicts an exemplary chart for drive time of the vehicle based on battery performance, in accordance with the present invention.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one skilled in the art in the relevant field to be included. As utilized herein, the term "substantially" refers to the complete or nearly complete extend or degree of an action, characteristic, property, state, structure, item, or result, as would be appreciated by one skilled in the art. For example, an object that is "substantially" circular would mean that the object is either completely a circle to mathematically determinable limits, or nearly a circle as would be recognized or understood by one skilled in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one skilled in the art.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification, embodiments have been described in a way which enables a clear and concise specification to be written, but it is intended and will be appreciated that embodiments may be variously combined or separated without parting from the scope of the present disclosure. It is intended that the present disclosure be limited only to the extent required by the appended claims and the applicable rules of law.

What is claimed is:

1. A vehicle, comprising:
(1) a chassis with a body coupled thereto, the chassis defining (a) a vehicle roll axis extending from a front of the chassis to a rear of the chassis, (b) a vehicle pitch axis extending from a first side of the chassis to a second side of the chassis, wherein the vehicle pitch axis is perpendicular to the vehicle roll axis, and (c) a vehicle yaw axis extending from a top of the chassis to a bottom of the chassis, wherein the vehicle yaw axis is perpendicular to the vehicle roll axis and is perpendicular to the vehicle pitch axis;
(2) at least two wheel assemblies coupled to the chassis, each of the wheel assemblies comprising:
(a) at least one wishbone having a central portion coupled to the chassis, a first free end extending away from the central portion in a first direction, and a second free end extending away from the central portion in a second direction opposite the first direction, the first free end of the at least one wishbone and the second free end of the at least one wishbone defining an axis of rotation;
wherein the at least one wishbone is configured to be movable with respect to the chassis between at least a first position and a second position so as to result in motion of the axis of rotation of the at least one wishbone with respect to the chassis between at least a first position and a second position,
wherein the axis of rotation in the first position is parallel to the axis of rotation in the second position and is perpendicular to the vehicle roll axis;
(b) a fender defining a wheel rotational axis, wherein the fender is attached to the at least one wishbone such that the fender is configured to be rotatable about the axis of rotation of the at least one wishbone and such that the axis of rotation of the at least one wishbone is perpendicular to the wheel rotational axis;
wherein the fender is configured such that, when the wishbone is moved between the first position and the second position, the fender is caused to correspondingly rotate about the axis of rotation of the at least one of the at least one wishbone between a first orientation and a second orientation,
wherein the wheel rotational axis is parallel to the vehicle pitch axis when the fender is in the first orientation,
wherein the wheel rotational axis is parallel to the vehicle yaw axis when the fender is in the second orientation,
(c) a rim positioned within the fender and rotatable with respect to the fender about the wheel rotational axis,
wherein the rim is configured to rotate with the fender when the fender rotates about the axis of rotation of the at least one wishbone,
(d) a tire secured to the rim,
wherein the tire is configured to rotate with the fender when the fender rotates about the axis of rotation of the at least one wishbone,
wherein, when the fender is positioned in the first orientation such that the wheel rotational axis is parallel to the vehicle pitch axis, the tire is positioned so as to contact a road surface such that rotation of the tire about the wheel rotational axis drives the vehicle along the road surface;
(e) a drive element positioned within the fender and rotatable with respect to the fender about the wheel rotational axis,
wherein the drive element is configured to rotate with the fender when the fender rotates about the axis of rotation of the at least one wishbone,
wherein the drive element is configured to be selectively operable in a selected one of:

(1) a drive mode in which the drive element is engaged with the rim such that rotation of the drive element about the wheel rotational axis drives corresponding rotation of the rim and of the tire about the wheel rotational axis, and
(2) a flight mode in which rotation of the drive element about the wheel rotational axis generates a thrust along the wheel rotational axis, and
wherein the drive element is configured to operate in the drive mode when the fender is in the first orientation and to operate in the flight mode when the fender is in the second orientation;
(f) a motor configured to drive rotation of the drive element about the wheel rotational axis.

2. The vehicle of claim 1, wherein the drive element includes at least one of a propeller or a turbine.

3. The vehicle of claim 1, wherein the vehicle further comprises a suspension configured to absorb impact when the at least one wishbone of each of the at least two wheel assemblies is positioned in the first position of the at least one wishbone.

4. The vehicle of claim 3, wherein the suspension includes at least one of a front suspension, a rear suspension, or both.

5. The vehicle of claim 1,
wherein at least one of the at least two wheel assemblies is a rear wheel assembly,
wherein, when the fender of the rear wheel assembly is oriented in the second orientation and the drive element of the rear wheel assembly is operating in the flight mode, the rear wheel assembly is configured to be selectively rotated about the vehicle pitch axis between at least (1) a hover orientation, wherein the thrust generated by the drive element of the rear wheel assembly is directed along the vehicle yaw axis, and (2) a forward thrust orientation, wherein the thrust generated by the drive element of the rear wheel assembly is directed at least partially toward the rear of the chassis so as to propel the vehicle in a forward direction.

6. The vehicle of claim 1, wherein the at least one wishbone of each of the at last two wheel assemblies includes a first wishbone and a second wishbone,
wherein the second wishbone is movable with respect to the first wishbone and with respect to the chassis between at least a first position and a second position, and
wherein the fender is configured such that, when the second wishbone is moved between the first position and the second position, the fender is caused to correspondingly rotate about the second axis of rotation between the first orientation and the second orientation.

7. The vehicle of claim 1, wherein the at least one wishbone of at least one of the at least two wheel assemblies includes an outer ring and an inner ring,
wherein the at least one of the at least two wheel assemblies includes a duct positioned within the fender, wherein the duct is rotatable with respect to the fender about the vehicle yaw axis, and wherein, when the duct is rotated with respect to the fender about the vehicle yaw axis, the rim and the tire are caused to rotate correspondingly with respect to the fender about the vehicle yaw axis,
wherein the outer ring is coupled to the fender of the at least one of the at two wheel assemblies,
wherein the inner ring is coupled to the duct of the at least one of the at least two wheel assemblies,
wherein, when the fender of the at least one of the at least two wheel assemblies is oriented in the first orientation and the drive element of the at least one of the at least two wheel assemblies is operating in the drive mode, the inner ring is rotatable with respect to the outer ring about the vehicle yaw axis so as to rotate (1) the duct of the at least one of the at least two wheel assemblies, (2) the rim of the at least one of the at least two wheel assemblies, and (3) the tire of the at least one of the at least two wheel assemblies about the vehicle yaw axis, thereby enabling the vehicle to be steered.

8. A vehicle, comprising:
(1) a chassis with a body coupled thereto, the chassis defining (a) a vehicle roll axis extending from a front of the chassis to a rear of the chassis, (b) a vehicle pitch axis extending from a first side of the chassis to a second side of the chassis, wherein the vehicle pitch axis is perpendicular to the vehicle roll axis, and (c) a vehicle yaw axis extending from a top of the chassis to a bottom of the chassis, wherein the vehicle yaw axis is perpendicular to the vehicle roll axis and is perpendicular to the vehicle pitch axis;
(2) a plurality of assemblies coupled to the chassis, each of the wheel assemblies comprising:
(a) a first wishbone having a central portion coupled to the chassis, a first free end extending away from the central portion in a first direction, and a second free end extending away from the central portion in a second direction opposite the first direction, the first free end of the at least one wishbone and the second free end of the at least one wishbone defining a first axis of rotation;
wherein the axis of rotation is perpendicular to the vehicle roll axis;
(b) a second wishbone having a central portion coupled to the chassis, a first free end extending away from the central portion in a first direction, and a second free end extending away from the central portion in a second direction opposite the first direction, the first free end of the at least one wishbone and the second free end of the at least one wishbone defining a second axis of rotation;
wherein the second wishbone is configured to be movable with respect to the chassis and with respect to the first wishbone between at least a first position and a second position so as to result in motion of the second axis of rotation with respect to the chassis between at least a first position and a second position,
wherein the second axis of rotation in the first position is parallel to (i) the second axis of rotation in the second position, (ii) the first axis of rotation, and (iii) the vehicle roll axis;
(c) a fender defining a wheel rotational axis, wherein the fender is attached to the first wishbone and to the second wishbone such that the fender is (i) configured to be rotatable about the first axis of rotation, (ii) configured to be rotatable about the second axis of rotation, and (iii) configured such that the wheel rotational axis is perpendicular to the first axis of rotation and to the second axis of rotation;
wherein the fender is configured such that, when the second wishbone is moved between the first position and the second position, the fender is caused to correspondingly rotate about the second axis of rotation between a first orientation and a second orientation, wherein the wheel rotational axis is parallel to the vehicle pitch axis when the fender is in the first orientation, wherein the wheel rotational axis is parallel to the vehicle yaw axis when the fender is in the second orientation, (d) a rim positioned within the fender and rotatable with respect to the fender about the wheel rotational axis, wherein the rim is configured to rotate with the fender when the fender rotates about the second axis of rotation, (e) a tire secured to the rim, wherein the tire is configured to rotate with the fender when the fender rotates about the second axis of rotation, wherein, when the fender is positioned in the first orientation such that the wheel rotational axis is parallel to the vehicle pitch axis, the tire is positioned so as to contact a road surface such that rotation of the tire about the wheel rotational axis drives the vehicle along the road surface;

(f) a drive element positioned within the fender and rotatable with respect to the fender about the wheel rotational axis, wherein the drive element is configured to rotate with the fender when the fender rotates about the second axis of rotation, wherein the drive element is configured to be selectively operable in a selected one of:

(1) a drive mode in which the drive element is engaged with the rim such that rotation of the drive element about the wheel rotational axis drives corresponding rotation of the rim and of the tire about the wheel rotational axis, and (2) a flight mode in which rotation of the drive element about the wheel rotational axis generates a thrust along the wheel rotational axis, and wherein the drive element is configured to operate in the drive mode when the fender is in the first orientation and to operate in the flight mode when the fender is in the second orientation;

(g) a motor configured to drive rotation of the drive element about the wheel rotational axis.

* * * * *